United States Patent [19]
Panditji et al.

[11] Patent Number: 5,574,888
[45] Date of Patent: Nov. 12, 1996

[54] A METHOD AND APPARATUS FOR ESTABLISHING COMPATIBILITY BETWEEN COMMUNICATION APPLICATIONS PRODUCING AT COMMANDS AND A TELEPHONY APPLICATION PROGRAMMING INTERFACE

[75] Inventors: Marjorie J. M. Panditji, Beaverton; Jeremy Gaylord, Portland, both of Oreg.

[73] Assignee: Intel Corporation, Santa Clara, Calif.

[21] Appl. No.: 175,321

[22] Filed: Dec. 28, 1993

[51] Int. Cl.$^6$ .................................................. G06F 5/00
[52] U.S. Cl. .................... 395/500; 395/650; 364/DIG. 1; 364/280; 364/281.3; 364/222.2
[58] Field of Search ...................................... 395/650, 700, 395/500

[56] References Cited

U.S. PATENT DOCUMENTS 5,202,899  4/1993  Walsh ............................................ 375/8

OTHER PUBLICATIONS

Charles Mirho and Andrew Raffman, "Reach Out and Touch Someone's PC: The Windows™ Telephony API" *Microsoft Systems Journal* (vol. 8, No. 12), pp. 15–44, Dec. 1993.

Strom, David, "IBM and ROLM to integrate voice, data product lines: ROLM phone PC leads series of joint projects", PC Week v4 n19 p. C1(2), May 12, 1987.

Elliott, Elaine X., "Northern Telecom and Intel to provide telephony gateway; industry giants unite to develop translator between Telephony API and TSAPI", Computer Shopper v14 n11 p. 522(2), Nov. 1994.

*Primary Examiner*—Kevin A. Kriess
*Attorney, Agent, or Firm*—Blakely, Sokoloff, Taylor & Zafman

[57] ABSTRACT

An interface for enabling data communication software applications previously sold in the commercial marketplace to utilize a Telephony Application Programming Interface ("TAPI") within the Windows™ Open System Architecture in order to support AT command set processing.

20 Claims, 5 Drawing Sheets

A METHOD AND APPARATUS FOR ESTABLISHING COMPATIBILITY BETWEEN COMMUNICATION APPLICATIONS PRODUCING AT COMMANDS AND A TELEPHONY APPLICATION PROGRAMMING INTERFACE

BACKGROUND OF THE INVENTION

1. Field of the Invention

The present invention relates to an interface which enables data communication for a computer system using a Windows™ operating system ("Windows™"). More particularly, the present invention relates to an apparatus and method for enabling communication software applications currently sold in the commercial marketplace, to utilize a Telephony Application Programming Interface ("TAPI"), a Windows™ Open System Architecture component, in order to support AT command set processing.

2. Background of the Invention

Data communication schemes primarily utilize conventional modems in combination with communication software applications ("communication applications") in order to transfer information between two sources, typically two computer systems. Being an embedded system, the conventional modem commonly features a non-programmable hardware chip set (e.g., a Rockwell chip set) which generally determines its functional aspects.

The procedure for transferring information begins with a user selecting a specific communication operation to occur, such as dialing a phone number or answering a telephone call. These and other communication operations are currently being supported by current communication applications such as ProComm, Crosstalk and the like. In response to the selection, the communication application generates a command, namely an AT command, corresponding to the selected communication operation. The AT command is a character string comprising at least an AT command identifier which identifies a particular operation selected by a user. Examples of such AT command identifiers include, but are not limited to, ATD (i.e., dial the phone), ATA (i.e., answer the phone), ATL (i.e., control speaker volume) and the like. The AT command identifier, forming the initial characters of the AT command, is usually followed by a string of characters used to engage or disengage phone line connections, to induce signal connection delays or to provide various telephony features. The AT command is terminated by any predetermined end-of-line ("EOL") character.

Referring to FIG. 1, a detailed diagram of a conventional prior art communication scheme is illustrated in which specific telephony operations between a computer system 1 and a second source 10 are performed. In order to perform the specific telephony operation between the two sources 1 and 10, the communication application 2 first generates a particular AT command 3, corresponding to the specific operation. The AT command 3 is then inputted into a communication port 4. The communication port 4 is a standard interface between a host 5 and an input/output ("I/O") board 6 (e.g., a modem card, fax card, digital signal processor cards, etc.) to enable communication therebetween. The communication port 4 passes the AT command 3 to a conventional communication task 7 which controls and performs the specific operation required from the I/O board 6.

In general, a "task" is application level code within an operating system for managing hardware by reading information from one device, processing the information and sending the information to another device. Here, the conventional communication task 7 is a combination of software and hardware, generally comprising a non-programmable hardware chip set, which receives the AT command 3 as an input. Based on the nature of the AT command 3, the conventional communication task 7 directly performs the specific operation to be sent over analog public phone lines 9a–9n to accomplish the specific operation.

As illustrated in FIG. 1, the conventional communication scheme is bi-directional, allowing status codes commonly used in the art to be sent from the conventional communication task 7 through the communication port 4 and into the communication application 2, resulting in a subsequent operation being performed or a display message to occur.

Recently, however, in a joint-venture between Intel™ Corporation and Microsoft™ Corporation, these companies created a Telephony Application Programming Interface (hereinafter referred to as "TAPI"). TAPI is a high level programming interface for Windows™ which supports many types of telephony operations associated with conventional analog public phone lines, digital medium such as digital Public Branch Exchange ("PBX") phone lines, ISDN phone lines and eventually wireless medium. As a result, TAPI allows a communication application to support numerous telephony operations through a variety of mediums by simply making a function call to TAPI which will drive the hardware (fax/modem card, DSP card, network to switch and then like) coupled thereto. An article in December's issues of *Microsoft Systems Journal* describes the operation of TAPI in great detail.

In view of the overwhelming endorsements of TAPI by the telecommunication market, it is quite likely that many communication applications will be created to utilize TAPI. However, no communication scheme has been created, or even contemplated, to enable previously designed communication applications to be compatible with TAPI. Moreover, no communication scheme has been designed to allow DOS-based communication applications to use TAPI because TAPI exclusively operates in Windows™.

BRIEF SUMMARY OF THE INVENTION

In light of the foregoing, it is appreciated that there exists a need to design and develop a communication scheme which would enable numerous communication applications, including DOS-based applications, to use TAPI services without modifying the source code of these applications. Thus, it would be a great advantage and is therefore an object of the present invention to provide a data communication interface which would operate as an intermediary between TAPI and the non-TAPI communication applications.

The present invention relates to an apparatus and method for providing a communication scheme which supports AT command set processing to enable off-the-shelf conventional communication applications developed concurrently and prior to TAPI, to be TAPI compatible. The apparatus includes a communication task which identifies an AT command and passes a control message to an application operating transparent to the user (i.e., the "Daemon" application). The Daemon application reads the control message and logically maps the control message into a TAPI function call which is transmitted to TAPI. The apparatus operates in a bi-directional manner so that the Daemon application also receives TAPI result code messages and thereafter, translates the TAPI result code messages into status messages readable by the communication task. Upon receipt of the status messages, the communication task converts the messages into conventional status codes which are sent to the conventional communication application.

BRIEF DESCRIPTION OF THE DRAWINGS

The objects, features and advantages of the present invention will become apparent from the following detailed description of the present invention in which.

DETAILED DESCRIPTION OF THE INVENTION

A communication scheme is described for enabling existing data communication applications to use TAPI in order to support AT command set processing. In the following detailed description, numerous specific details are set forth, such as a specific configuration of the data communication scheme. It is apparent, however, to one skilled in the art that the present invention may be practiced without incorporating this specific configuration.

The present invention need not be limited for use in connection with an external I/O board, but may be alternatively used with a virtual device driver for Windows™, wherein the virtual device driver would intercept an AT command generated from a communication application so that all necessary translations are performed on the host. Moreover, it should be noted that there exist some instances where well-known circuits, process steps and the like are not set forth in detail in order to avoid unnecessarily obscuring the present invention. Instead, a specific example has been created for the sole purpose of illustrating the operation of the present invention, but is in no way a limitation on the scope of the present invention.

Figure 1:
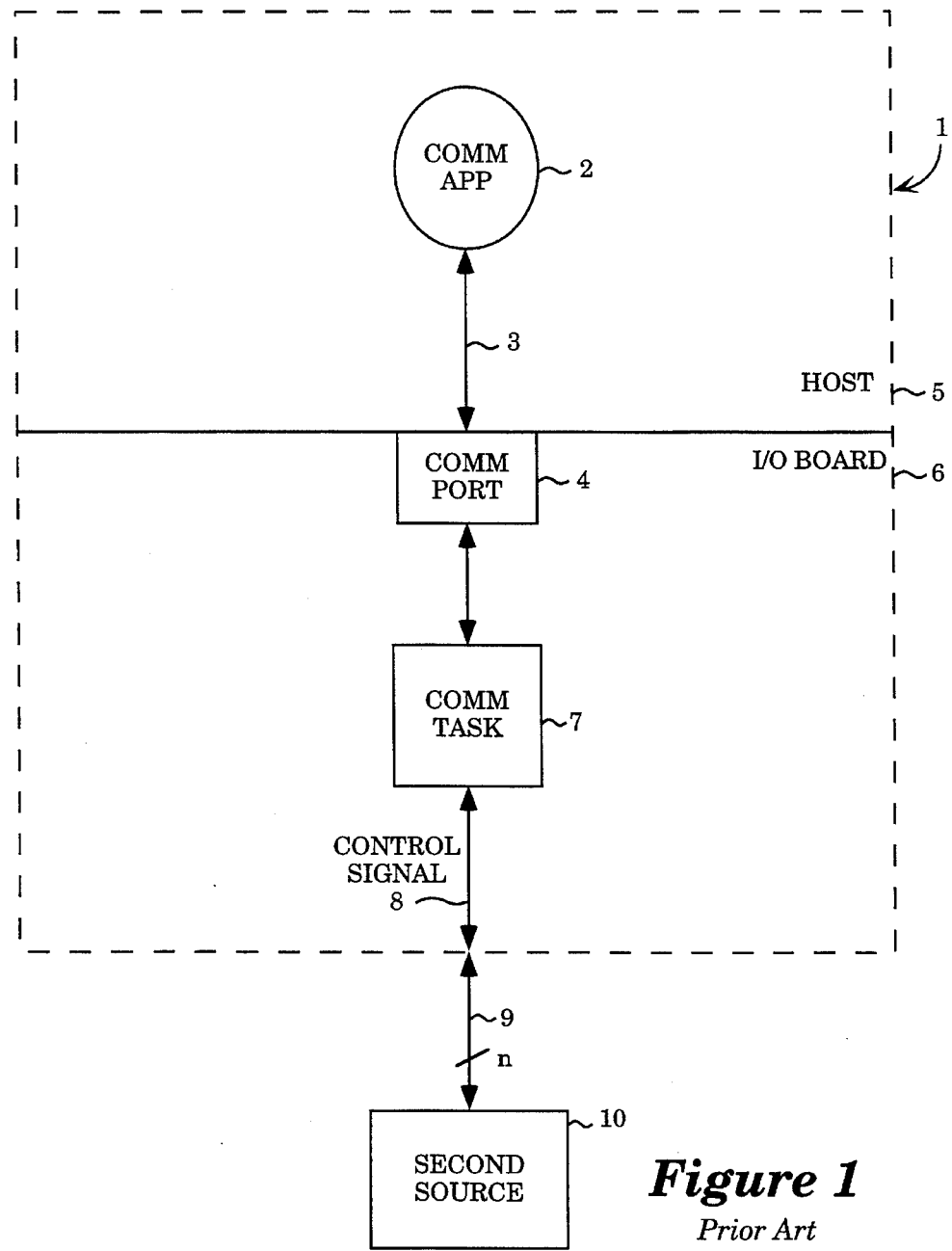
FIG. 1 is a block diagram of a conventional data communication scheme.
Figure 2:
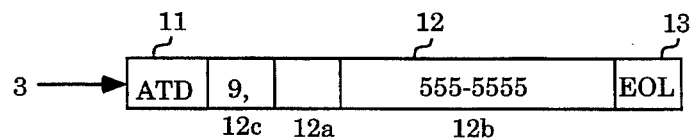
FIG. 2 is a block diagram of one embodiment of an AT command.

As previously discussed herein, FIG. 1 illustrates the conventional communication scheme used to establish a communication link between the computer system 1 and a second sources 10 through conventional analog public telephone lines 9a–9n. Upon request by the user, the communication application 2, being controlled by Windows™ on the host 5, generates an AT command 3 corresponding to a specific telephony operation. The AT command 3, as previously defined, includes an AT command identifier 11 followed by the data string 12 having a plurality of characters as shown in FIG. 2. For example, if the specific telephony operation was directed toward dialing a phone in order to make a phone call, the AT command 3 would include an AT command identifier 11 "ATD" (i.e., an AT command corresponding to a dial request) followed by the data string 12; namely, a plurality of characters indicating a destination of the phone call (i.e., international or local area codes, if either is applicable) 12a, a phone number 12b, as well as other information (e.g., characters imposing delay information, access request characters to establish a connection with the public phone lines, etc.) necessary to establish a proper phone line connection. The AT command 3 is terminated by the end-of-line ("EOL") character 13. The data string shown in FIG. 2 will be used for illustrative purposes later in the application.

Referring back to FIG. 1, the AT command 3 is inputted into the conventional communication task 7 through the communication port 4. The conventional communication task 7 performs necessary operations to achieve the specific telephony operation. For example, taking the "dialing" example as an illustration, the conventional communication task 7 would be required to generate audible dial tones to establish a telephone connection over the analog public telephone lines 9a–9n. The communication scheme of the present invention is substantially different from this conventional communication scheme as illustrated in FIG. 3.

Figure 3:
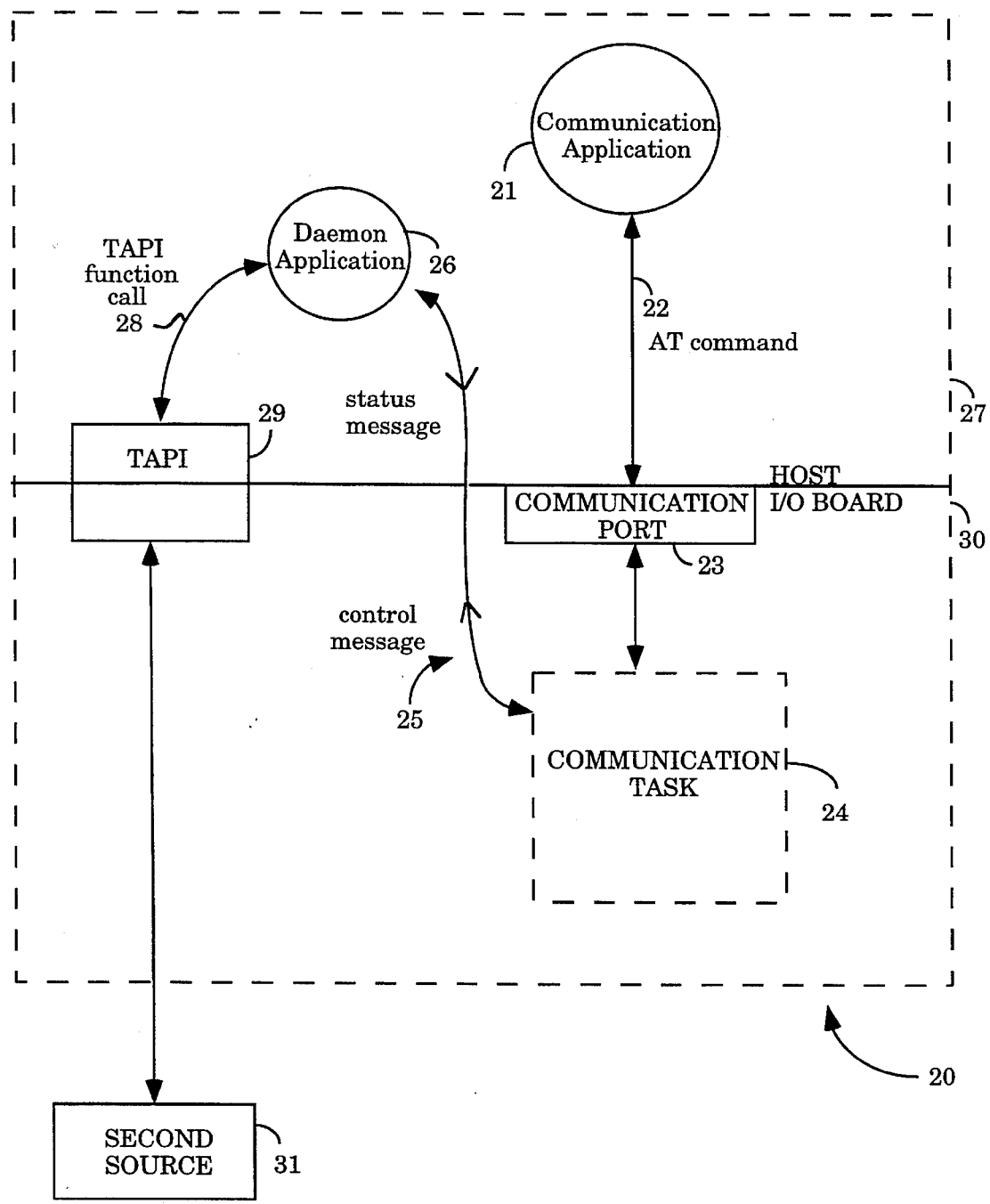
FIG. 3 is a block diagram of the present invention providing a communication data path between a communication application and TAPI.

In FIG. 3, a block diagram of the present invention is illustrated. As previously discussed, the purpose of the present invention is to enable communication applications currently in the marketplace to utilize TAPI services. As similarly shown in FIGS. 1–2, when a specific telephony operation is desired between at least two sources, namely a computer system 20 and a second device 31, a communication application 21 running in Windows™, DOS™ and the like on the host 27 sends an AT command 22 corresponding to the specific telephony operation into the communication port 23, being an interface between the host 27 and a I/O board 30. The communication port 23 relays the AT command 22 into a communication task 24 operating in a standard real time operating system, such as SPOX™ which provides an infra-structure to support tasks and mailboxes.

However, contrary to the operations of the conventional communication task 7 in FIG. 1 which directly performs the specific operation, the communication task 24 intercepts the AT command 22 and generates a corresponding control message to be passed into an application 26 executable in the host 27. The application (hereinafter referred to as the "Daemon" application) 26 operates in Windows™ in a manner undetected by the communication application 21 and the user. After receipt of the control message 25 from the communication task 24, the Daemon application 26 logically maps the control message 25 into corresponding TAPI function calls 28 and passes the TAPI function call into the TAPI interface 29. Upon receipt of the corresponding TAPI function call 28, the TAPI interface 29 passes information within the TAPI function call 28 to an associated device driver to assist the I/O board 30 or another hardware device to perform the specific telephony operation.

Figure 4:
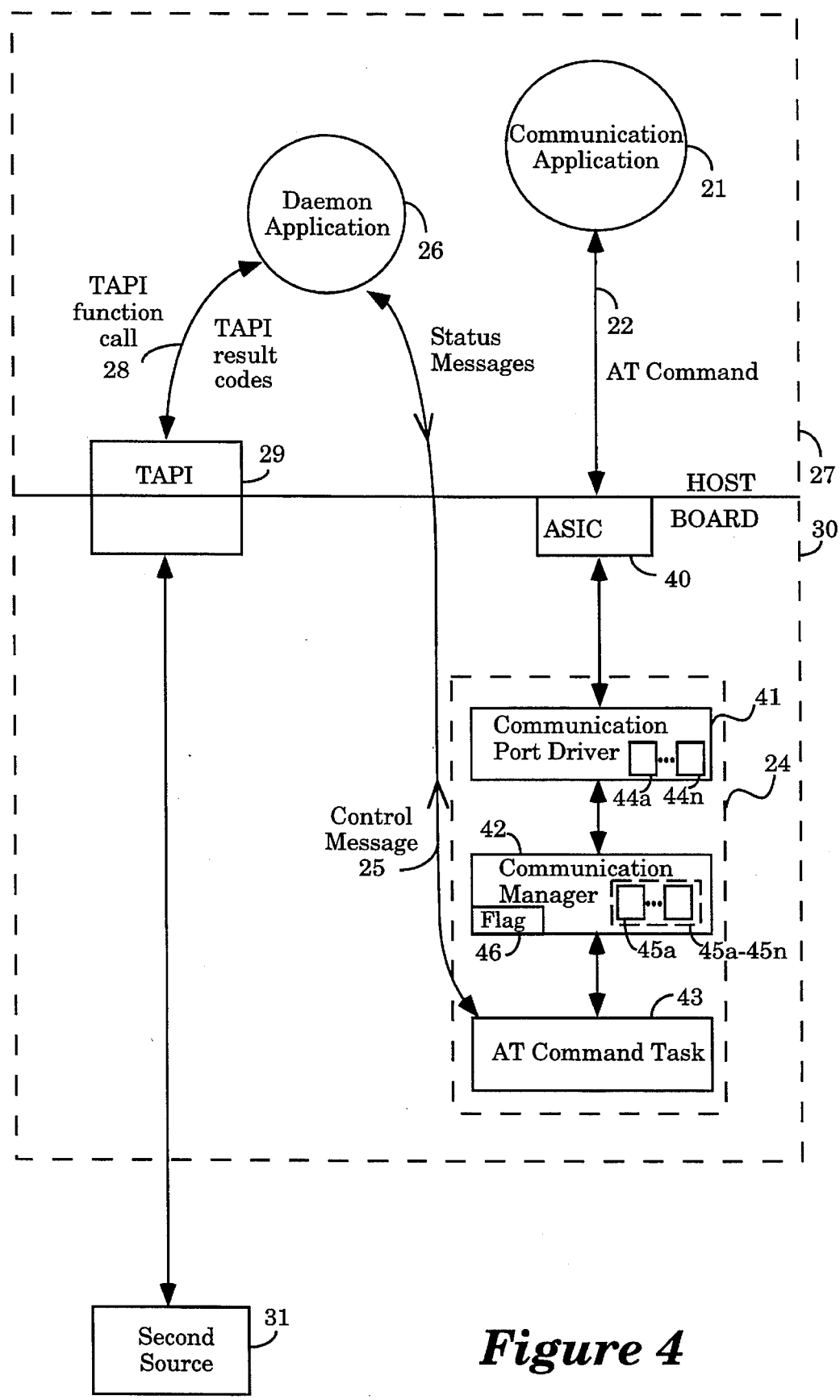
FIG. 4 is a block diagram of the present invention which provides specific detail of the elements of the present invention passing the information in search of an AT command.
Figure 5:
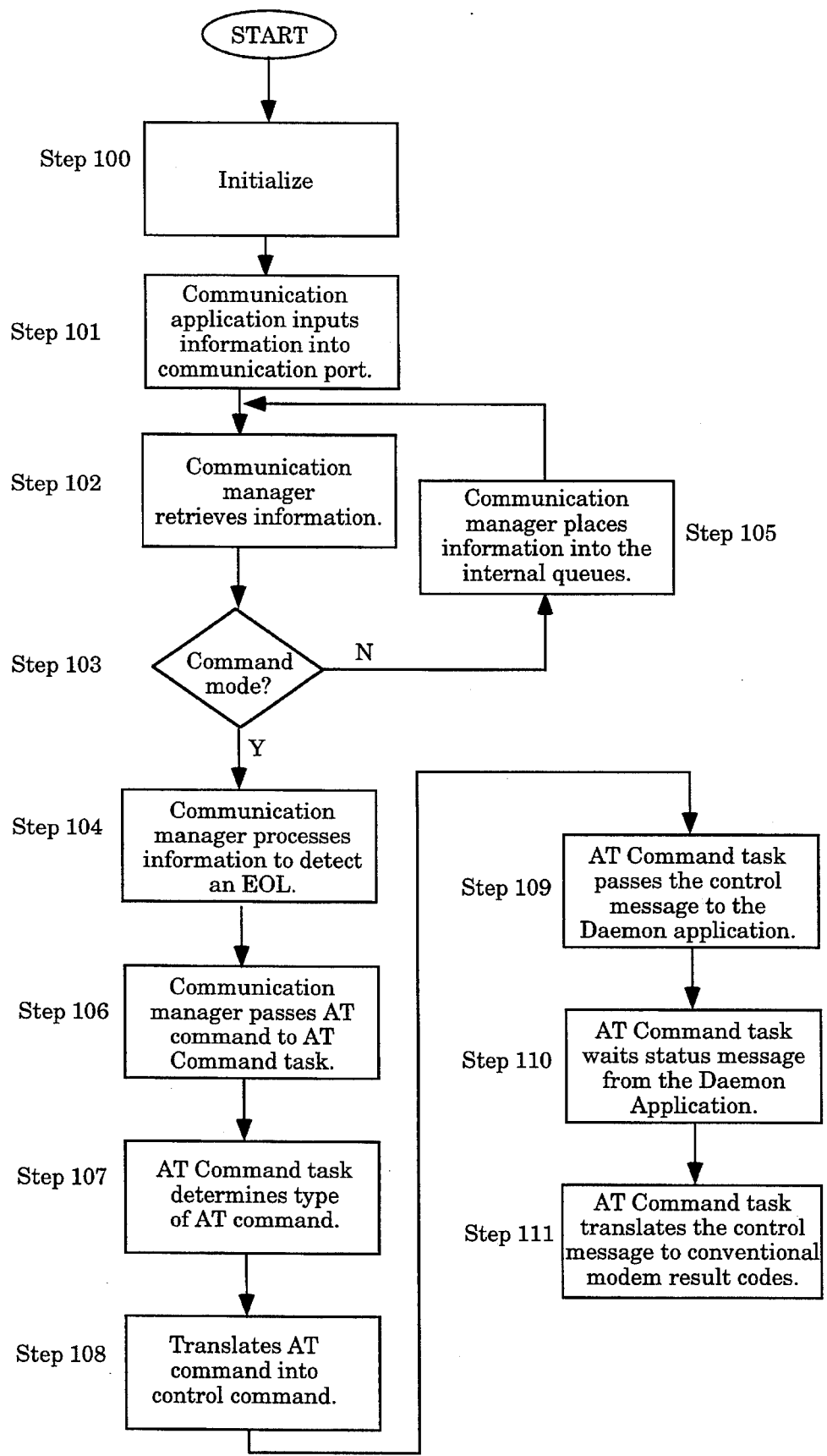
FIG. 5 is a flowchart of the execution process by the AT Command task.

Referring to FIG. 4, a more detailed block diagram of certain data processing elements of the present invention is illustrated; namely, the communication port 23 and the communication task 24. The communication port 23 and the communication task 24 are shown in more detail in order to provide a better understanding of the translation of the AT commands 22, which are generated by the communication application 21, into the control messages 25 being outputted to the Daemon application 26. In addition, source code pertaining to the operations of the communication task 24 (Appendices B & C) and the Daemon Application 26

(Appendix D) are included in order to provide better understanding of their operations. However, it is contemplated that a person skilled in the art could modify the source code in order to provide similar functionality so that such code should not be interpreted as a limitation on the present invention.

As stated above, the communication application 21 sends the AT command 22 into the communication port 23. Unlike the conventional communication scheme, the communication port 23 in the present invention is an Application Specific Integrated Circuit ("ASIC") 40 designed to provide an interface identical to a serial UART, generally a 16550 UART which is a standard interface used by a majority of the conventional modems. The ASIC 40 is driven by a communication port driver 41 which supports digital signal processing functions so that the communication port driver 41 and the ASIC 40 function in combination as a device similar to the 16550 UART.

The communication driver 41 is a streaming driver which is responsible for retrieving information from the ASIC 40 and for providing such information to a Communication Port Manager task (hereinafter referred to as "Communication Manager") 42 in order to allow AT command set processing while on-line with a remote modem. As information is transferred from the communication application 21 into the communication port driver 41 through the ASIC 40, the information is stored in a plurality of buffers 44a–44n referenced by the communication driver 41 through pointers. Thereafter, the pointers referencing the stored information can either be passed to the Communication Manager 42 or to queues for subsequent data transfers.

The Communication Manager 42 is a task which performs ASIC communication port management including, but is not limited to, processing and editing data, translating messages from and to an AT Command task 43 and the like. This management is accomplished through sequential operation of various routine calls, wherein the nature of the routine calls is dependent on whether the Communication Manager 42 is operating in "command" mode or "data" mode. The Communication Manager 42 operates in command mode when certain telephony operations are being requested, unlike "data" mode which is the case when it is desirable to transfer data from one source to another.

The Communication Manager 42 operates in a continuous main task loop in order to repeatedly process information in the form of a plurality of characters, being transmitted from the communication application 21 into at least one of the plurality of buffers 44a–44n referenced by the communication port driver 41. The main task procedural loop entitled "comMgrTask()" is illustrated at lines 817–900 of the Communication Manager source code entitled "com_mgr.c" in Appendix B. The Communication Manager 42 periodically requests the communication port driver 41 to download characters (i.e., pass the pointer referencing the at least one of the plurality of buffers 44a–44n) into one of a plurality of internal buffers 45a–45n, for example a first internal buffer 45a, within the Communication Manager 42, in accordance with processCmdInput() in lines 1216–1293 of the "com_mgr.c" source code which makes routine calls to processCmdChars() and doCmdInCopy() pursuant to lines 1419–1448 and 1574–1651 of com_mgr.c in Appendix B.

Concurrently, the Communication Manager 42 monitors each downloaded character in an effort to detect an end-of-line ("EOL") character since an AT command is designated as a string of characters preceded by an "ATx" and terminated by the EOL character, such as, for example, a carriage return. (See doCmdInCopy(), lines 1638–1648). If the EOL character is detected, the character string is potentially an AT command. As a result, the Communication Manager 42 transmits the contents of the first internal buffer 45a into the AT Command task 43 in accordance with the sendData() routine on lines 1654–1678 of Appendix B. Thereafter, the Communication Manager 42 asserts a flag 46 within the first internal buffer 45a to prevent writing over its contents until it can be saved in another buffer within the AT Command task 43.

If the present invention is in the "data" mode, the main task loop calls a processData() routine (lines 1142–1158) of the com_mgr.c source code to process data (if any) inputted from the communication application and output such data into internal queues to be later processed by unrelated modem code. During such processing, however, the Communication Manager 42 scans the data for a time independent escape sequence in case an AT command is embedded within the data as illustrated in scanData() in lines 1450–1572 of com_mgr.c of Appendix B. If the time independent escape sequence is uncovered, the Communication Manager 42 changes states and begins processing the information into its internal registers 45a–45n.

Upon receipt of the contents of the first internal buffer 45a, the AT Command task 43 generates an internal copy of the characters within the first internal buffer 45a and sends it back to the Communication Manager 42, causing the Communication Manager 42 to deassert the flag 46. The AT Command task 43 then does the necessary lexical analysis needed to ascertain the nature of the AT command and thereafter, sends a control command followed by a data string (i.e., collectively referred to as the "control message") into the Daemon application 26. Upon receipt of the control message, the Daemon application 26 reads the control command and logically maps a corresponding TAPI function call to request TAPI services.

Table 1 illustrates logical mapping between the AT command inputted into the AT Command task 43 and the control command outputted from the AT Common task 43 into the Daemon application 26. The number of control commands employed is a designer's choice, and therefore should not be construed as a limitation to the scope of the invention. The source code in Appendix C entitled "mt1hwut1.c" translate ATMx, ATLx and ATHx commands respectively. The marginal notes provide sufficient description of the translation process used by the AT Command task 43 so as to emulate such translations for other AT commands, including ATD and ATA.

TABLE 1

CONTROL COMMANDS FROM THE AT COMMAND
TASK TO THE DAEMON APPLICATION

| Control Command | Description |
|---|---|
| AT_DIAL | Dial phone (in response to ATD). The number string to dial is available in the task-to-Daemon data string. |
| AT_ANSWER | Answer the phone (in response to ATA). |
| AT_ONHOOK | Hang-up the line. |
| AT_SPEAKER_VOL | Set speaker volume (in response to ATLx where x = 0 . . . 3. If x = 0, the speaker is at its lowest volume and if x = 3, the speaker is at its highest volume. |

TABLE 1-continued

CONTROL COMMANDS FROM THE AT COMMAND TASK TO THE DAEMON APPLICATION

| Control Command | Description |
| --- | --- |
| AT_ANSWER_RINGS | Set the number of rings on which TAPI is to answer the phone. The first message structure argument indicates the number of rings on which to answer. |
| AT_COMMA_DELAY | Set the amount of delay TAPI inserts for each comma in a dialing string. The first message structure argument is the number of seconds to delay. The AT Command task always sends this message at startup. |
| AT_DIAL_DELAY | Set the number of seconds TAPI delays before blind dailing. The AT Command task always sends this message at startup. |
| AT_DIAL_SPEED | Set the number of milliseconds for each dialed digit. The AT Command task always sends this message at startup. |
| AT_SPEAKER | Turn speaker on/off. If the first message structure argument is 0, turn the speaker off. Otherwise, turn the speaker on. |

Table 2 illustrates logical mapping between the Daemon application 26 and TAPI 29 in the form of function calls. For clarity sake, only the first three control commands listed in Table 1 are shown in view of the fact that a person skilled in the art could deduce additional mapping from the information given.

TABLE 2

FUNCTION CALLS FROM THE DAEMON APPLICATION TO TAPI

| TAPI Function Calls | Description |
| --- | --- |
| lineMakeCall () | Dial phone (in response to AT_DIAL). The number string to dial is set in a parameter of the function. |
| lineAnswer () | Answer the phone (in response to AT_ANSWER). |
| lineDrop () | Hang-up the line (in response to AT_ONHOOK). |

The source code within Daemon application 26 to perform logical mapping of AT_DIAL, AT_ANSWER and AT_ONHOOK into the corresponding function calls set forth in Table 2 is illustrated in source code entitled "modemdmn.c" "dial.c", "answer.c" and "dispatch.c" in Appendix D. It is contemplated that the source code could be structured in a variety of ways, and therefore the present structure should not be construed as the only structure to perform the present invention.

The operation of the present invention may best be understood by continuing the "dialing request" example previously in reference to FIG. 2. As previously mentioned herein, this specific example lends itself to explaining the operation of the present invention and in no way should be construed as a limitation on the scope of the invention.

The example will focus on a desired operation to dial a local phone number (e.g., 555-5555) in order to connect the computer system to another computer system. In the present example, as prevalent in many business telephone systems, in order to establish a connection with public analog telephone lines when making a local call, a number "9" must be dialed first before the telephone number is dialed.

First, a user would activate the desired communication application which would initialize the present invention and place it in command mode. The user would select a specific operation required from the communication application, which, in this case, is a request to dial a phone. The communication application will then generate a corresponding AT command having the AT command identifier ("ATD") followed by a data string; namely "9, 555-5555". The comma being associated with a specific time delay in order to allow a connection to be established between the computer system and the analog telephone lines after the "9" has been dialed, but before dialing the phone number.

The AT command 22 is sent to the communication port 40 and is sequentially stored a character at a time in one of the plurality of registers 44a or FIFO registers (depending on the ASIC 40 configuration). The Communication Manager 42 retrieves the AT command, along with other information within the register 44a or FIFO and inputs the information into an internal buffer 45a–45n. Upon detecting an End of Line ("EOL") character, the Communication Manager 42 transmits the AT command into the AT Command task 43. The AT Command task 43 then determines that there exists an "ATD" command followed by a dial string and thus, sends a control message (i.e., "AT_DIAL 9, 555-5555") to the Daemon application 26.

The above example differs from the operation of the conventional communication scheme in that the conventional communication task reads the AT command 11 sent and generates dialing tones associated with the contents of the data strings in order to perform the requisite dialing. This limits the conventional communication scheme to analog telephone systems. The conventional scheme will not operate with digital PBX systems since AT command set processing is inadequate for advanced telephony environments.

The Daemon application 26 receives the control message from the AT Command task 43. Thereafter, the Daemon application 26 calls a procedure to logically map the control message "AT_DIAL 9, 555-5555" into a function call to TAPI with lineMakeCall() incorporating the data string within its parameters. TAPI then drives the I/O board 30 or another board to make the requested phone call.

Since the communication scheme is bi-directional, the TAPI 29 also returns status information concerning a prior TAPI function call through a TAPI result code message, examples of which are shown in Table 3. The Daemon application 26 then logically maps the TAPI result code message into a corresponding status message readable by the AT Command task 43 as shown in Table 4. The status message is input into the AT Command task 43 which analyzes the same to decode the status message into messages readable by the communication application 21.

TABLE 3

TAPI RESULT CODE MESSAGES FROM TAPI TO THE DAEMON APPLICATION

| TAPI Result Code Message | Description |
| --- | --- |
| TAPIERR_CONNECTED | The phone call was placed correctly. |
| TAPIERR_REQUESTQUEUEFULL | The Request Queue is full, try again later. |

TABLE 3-continued

TAPI RESULT CODE MESSAGES FROM TAPI TO THE DAEMON APPLICATION

| TAPI Result Code Message | Description |
| --- | --- |
| TAPIERR_NOREQUESTRECIPIENT | The Call Manager application is not running. |
| TAPIERR_INVALID ADDRESS | Invalid destination address. |

TABLE 4

STATUS MESSAGES FROM THE DAEMON APPLICATION TO THE AT COMMAND TASK

| Status Message | Description |
| --- | --- |
| HOST_CONNECT_OK | The Daemon Application was able to dial successfully and answer. |
| HOST_CONNECT_FAIL | The Daemon Application was unable to dial. |
| HOST_PHONE_RING | The phone range once. |
| HOST_ANSWER_OK | Answer of incoming call was successful. |
| HOST_ANSWER_FAIL | Answer of incoming call failed. |
| HOST_ONHOOK | The line is on-hook. |

Figure 6:
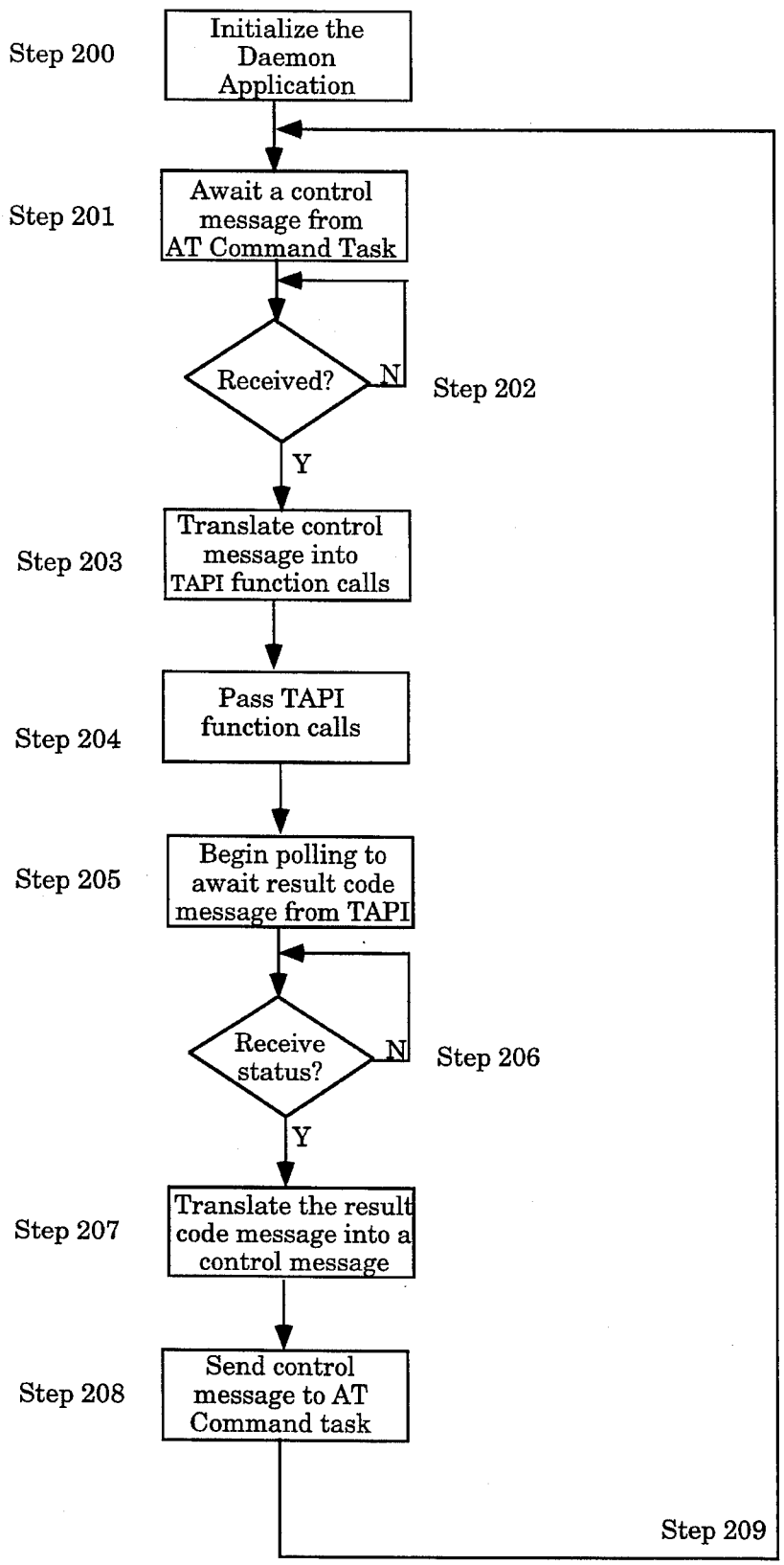
FIG. 6 is a flowchart of the execution process by the Daemon application.

The following is a detailed description of the operations of the communication Manager and AT Command task which is shown in FIG. 6. In step 100, the computer system is initialized so as to initialize the AT Command task and Communication Manager. After initialization, the computer system is in "command" mode until a connection is established with a remote modem. If the computer system is in "data" mode, it will remain in this mode until the connection is disconnected or upon detection of an escape sequence. Thereafter, the computer system will remain in the "command" mode until the connection is established again through another AT command (e.g., "ATO" for re-establishing a connection after an escape sequence).

Next, steps 101–106 are accomplished by the Communication Manager which is illustrated as operating in the I/O board, but could be operational in the host if a virtual driver is employed in lieu of the communication port. In Step 101, a communication application inputs information into the communication port, or alternatively the virtual driver if chosen. In Step 102, the Communication Manager retrieves the information from the communication port (or virtual driver) and stores the information within a plurality of buffers. However, it is contemplated that the Communication Manager could be designed to retrieve the information upon receipt of an interrupt signal or periodically after a preselected time period. If the later, then such sampling would be necessary before retrieval of the information. Next, the Communication Manager determines whether the computer system is in "command mode" (Step 103) and if so, the Communication Manager processes the information retrieved from the communication port in search of the EOL character (step 104). Otherwise, in step 105, the Communication Manager places the information into internal queues and retrieves more information from the communication port or virtual driver. If the Communication Manager detects an EOL character during such processing, it passes the information (potentially having an AT command) to the AT Command task (step 106).

In step 107, the AT Command task parses the information to determine if the AT command exists, and if so, the nature of the AT command. Next, the AT Command task translates the AT command identifier into a control command readable by the Daemon application (step 108). Next, the AT Command task passes the control command followed by a corresponding data string into the Daemon application in order to request telephony services (step 109). Thereafter, the AT Command task enters into a polling scheme to await status information in the form of a TAPI result code message converted by the Daemon application into an AT Command task status message (step 110). Then, the AT Command task translates the status message into conventional modem result code readable by conventional communication applications (step 111). Thereafter the AT Command task sends the modem result code to the conventional communication application through the Communication Manager and the communication port (or virtual driver).

Furthermore, the operations of the Daemon application is illustrated in FIG. 7 in order to show, among other things, the translation from control message to TAPI function calls. First, the Daemon application is initialized upon initialization of the computer system (Step 200). The Daemon application remains in a polling state awaiting the control message from the AT Command task (Step 201–202). Upon receipt of the control message, the Daemon application translates the control message into an appropriate TAPI function call for operation with TAPI (Step 203) and passes the function call to TAPI (Step 204). In steps 205–206, the Daemon application waits for a result code message by TAPI in response to the function call. Upon receipt of the result code message, the Daemon application translates it into a corresponding status message to be transmitted to the AT Command task which, in effect, processes the status information throughout the computer system (steps 207 and 208). Thereafter, the Daemon application awaits a new control message from the AT Command task (step 209).

The present invention described herein may be designed using many different configurations or slightly different process steps. While the present invention has been described in terms of various embodiments, other embodiments may come to mind to those skilled in the art without departing from the spirit and scope of the present invention. The invention should, therefore, be measured in terms of the claims which follow.

APPENDIX B

```
/***************************************************************   ********
** FILE:    com_mgr.c
**
** TITLE:   Communications Port Manager Module
**
** DESCRIPTION:
**     Module which encapsulates the DSP side handling of the ASIC's 16550
**     UART facade SPOX driver.
**
** PUBLIC FUNCTIONS:   comMgrTask
**
** Copyright (c) 1993 Intel Corporation   All Rights Reserved
**
** $Header:
**
** $Workfile:   com_mgr.c $
**
** $Log:   O:/mik/dsp/src/at_build/com_mgr.c_v $
**
**
** Added handling of AT_CHARS message.  Reformatted some code for greater
** clarity.  Removed chevrons from around standard includes.
**
**
** Corrected bug with passing of XON/XOFF to remote modem.  Com manager
** sleep time is now 30msec (3 x 10msec ticks).
**
**
** Replaced repeated calls to getLineTermChar() and getBackspaceChar() with
** references to global variables.  The globals variables are currently
** hardwired.
**
**
** Corrected incomplete initialization of the SS_Attrs structure prior to
** calling SS_create().
**
**
** Now implements both hardware and software flow control including passing
** or not passing XON/XOFF through to the remote modem.
**
**
** Improved flow control handling.  Corrected bugs with getComDataSetup().
** Moved DRIVER_BFR_SZ definition to COM_MGR.H.
**
**
** Moved flow control handling code.  This allows turning flow on even when
** no characters are received from the host.
**
**
** Now has support for retrieving the UART facade's word length, stop bits,
** and parity setup.
**
**
** Now calls delRS232Handler() at task termination.  Now sleeps waiting for
** AT task to terminate the com manager.  Removed #ifdef DEBUG from around
** some exception cases.
**
**
** Moved local echo handling from data mode input processing to command mode
** input processing.
**
**
** This version corrects bug that caused resend of data when the DTE receive
** queue became full.  Also, RS232 functions are now in a separate module.
** Flow control is implemented but not fully debugged.
**
**
** No longer internally buffers characters when in data mode.  Instead, now
** ships data immediately to the queue manager's DTE receive queue.  Also,
** added processing of AT_ECHO message and implemented local echo.
**
**
** This version places the com port driver streams into the default memseg
** This corrects failure of the stream interface to the com port driver when
** the stream is placed in SRAM.
**
**
** This version corrects incorrect setting of the memseg attribute for
** creating streams.  The memseg is now SG_SRAM rather than SG_STATIC.
```

```
 80   **
 81   **
 82   **   Added function to get the current setting of DCD.
 83   **
 84.  **
 85   **   SPOX streams to/from the comm port are now triple buffered with a buffer
 86   **   size of 256.  Corrected bug with mailing AT task only "AT" rather than
 87   **   "ATH" upon receiving "+++ATH" (TIES escape) when in data mode.  No longer
 88   **   mails the AT task a "CM_CMD_MODE" message whenever a switch to command
 89   **   mode occurs.  SPOX streams and buffers are now in static RAM.  Made other
 90   **   minor header formatting changes.
 91   **
 92   **
 93   **   Added test for "already in cmd_mode" when flushing DTE_TX/RX queues
 94   **   in the code that besponds to AT_CMD_MODE.  The flush calls shouldn't
 95   **   be performed unless we're actually switching from data mode to command
 96   **   mode.
 97   **
 98   **
 99   **   Now looks at first argument accompanying the mailbox message AT_DATA_MODE.
100   **   If this argument is zero, then this task enters command mode.  Otherwise,
101   **   this task enters data mode.
102   **
103   **
104   **   Now sends CM_CMD_MODE message to the AT task upon switch to command mode.
105   **
106   **
107   **   Added support for setting RI bit and timing clear of the RI bit.
108   **
109   **
110   **   Added backspace editing of AT commands.
111   **
112   **
113   **   Now has new exit handling.
114   **
115   **
116   **   Now supports calls to get, clear, and set RS232 signals.
117   **
118   **
119   **   Initial revision.
120   **
121   **
122   **   Has changes to integrate with AT task.
123   */
124
125   #include "std.h"
126   #include "kg.h"
127   #include "sa.h"
128   #include "ss.h"
129   #include "dcm.h"
130   #include "app.h"
131   #include "com_mgr.h"
132   #include "acuif.h"
133   #include "mboxmgr.h"
134   #include "q_mgr.h"
135   #include "mkdomsgs.h"
136   #include "rs232.h"
137
138
139   /************************** Public Globals ******************************/
140
141   /*
142   ** Declare variables that hold the comm port driver input and output stream
143   ** handles.  These variables are not designed for public visibility outside
144   ** of the RS232 signal handler module.
145   */
146   SS_Stream inStream,
147            outStream;
148
149
150   /************************** Private Defines ******************************/
151
152   /*
153   ** Define the queue manager queue level at which flow should turn off.  Note
154   ** that this level may not work correctly if the queue manager creates queues
155   ** that are too small.
156   */
157   #define FLOW_OFF_LEVEL (512)
158
```

```
159      /* Define the amount of queue space required before turning flow  */
160      #define FLOW_ON_LEVEL     (768)
161
162
163      /* Define the maximum length of an AT command. */
164      #define MAX_AT_CMD_LEN    (128)
165
166      /*
167      ** Define the maximum size of the comm manager's buffers to be the driver
168      ** buffer size.
169      */
170      #define MAX_BFR_SZ   (DRIVER_BFR_SZ)
171
172      /* Define the number of internal buffers handled by the comm manager. */
173      #define N_BFRS    (4)
174
175      /*
176      ** Define the amount of time that the communications manager will sleep after
177      ** executing its task loop.
178      */
179      #define COM_MGR_SLEEP_TIME   (3)   /* 30msecs */
180
181      /*
182      ** Define a type which holds information about the buffers in use by this
183      ** module.
184      */
185      typedef struct
186      {
187          unsigned bfr[MAX_BFR_SZ];   /* The buffer itself. */
188          int curIdx;                 /* The current buffer location. */
189          Bool available;             /* Whether this buffer is available.  It is not
190                                       * available when mailed to the AT task. */
191      } BfrInfoType;
192
193      /* Define a type which indicates the current comm manager state. */
194      typedef enum
195      {
196          CMD_MODE,
197          DATA_MODE
198      } ModeType;
199
200      /*
201      ** Define masks for extracting bit fields from the modem line control settings
202      ** as retrieved from the com port driver.
203      */
204      #define WORD_LEN_MASK        (0x03000000)
205      #define PARITY_MODE_MASK     (0x30000000)
206      #define PARITY_ENABLE_MASK   (0x08000000)
207      #define STOP_BITS_MASK       (0x04000000)
208
209      /*
210      ** Define the amount to shift the modem line control bit fields to move the
211      ** bit fields to bit 0.
212      */
213      #define WORD_LEN_SHIFT       (24)
214      #define PARITY_MODE_SHIFT    (28)
215      #define PARITY_ENABLE_SHIFT  (27)
216      #define STOP_BITS_SHIFT      (26)
217
218      /* Define the XON & XOFF flow control characters. */
219      #define XON    (17)
220      #define XOFF   (19)
221
222
223      /************************ Private Globals ****************************/
224
225      /* Define a flag which says whether local echo is on or off. */
226      static Bool echoFlag;
227
228      /*
229      ** Define the state variable which determines whether the communications port
230      ** manager is in data or command mode.
231      */
232      static ModeType mode;
233
234      /* Declare array of buffers and associated information. */
235      static BfrInfoType bfrInfo[N_BFRS] =
236      {
237          {
```

```
238             {0,},   /* The buffer. */
239             0,      /* The current buffer location.  (Always starts at zero.) */
240             TRUE    /* Buffer initially available. */
241         },
242         {
243             {0,},   /* The buffer. */
244             0,      /* The current buffer location.  (Always starts at zero.) */
245             TRUE    /* Buffer initially available. */
246         },
247         {
248             {0,},   /* The buffer. */
249             0,      /* The current buffer location.  (Always starts at zero.) */
250             TRUE    /* Buffer initially available. */
251         },
252         {
253             {0,},   /* The buffer. */
254             0,      /* The current buffer location.  (Always starts at zero.) */
255             TRUE    /* Buffer initially available. */
256         }
257     };
258
259
260     /* Declare and initialize a pointer to the current buffer's information. */
261     static BfrInfoType *curInfoPtr = bfrInfo;
262
263     /*
264     ** Declare variables which hold the array handles for the arrays used for
265     ** comm port I/O.
266     */
267     static SA_Array hInArray,
268                     hOutArray;
269
270     /*
271     ** Declare a variable used to indicate whether XON/XOFF is passed through to
272     ** the remote modem.
273     */
274     static Bool passXonXoff = FALSE;
275
276     /*
277     ** Declare a variable that holds the current value of the backspace character
278     ** as defined in the ACU.
279     */
280     static unsigned backspaceChar;
281
282     /*
283     ** Declare a variable that holds the current value of the line termination
284     ** character as defined in the ACU.
285     */
286     static unsigned lineTermChar;
287
288
289     /********************** Private Function Prototypes **********************/
290
291     /***************************************************************************
292     ** initComMgr - initialize the communications port manager
293     **
294     ** DESCRIPTION:
295     **    Intialize the communication port manager by creating the necessary
296     **    data structures, opening the comm port driver, and creating the
297     **    necessary timers.
298     **
299     ** GLOBALS ACCESSED:  none
300     **
301     ** ASSUMPTIONS:  none
302     */
303     static int initComMgr   /* output: 1 on success.  0 on error. */
304     (
305         void
306     );
307
308
309     /***************************************************************************
310     ** openDriver - open the communications port driver
311     **
312     ** DESCRIPTION:
313     **    Open the comm port driver for reading and writing in non-blocking mode.
314     **
315     ** PUBLIC GLOBALS ACCESSED:  none
316     **
```

```
**    PRIVATE GLOBALS ACCESSED:  inStream    (write)
**                               outStream   (write)
**
**    ASSUMPTIONS:   none
**
**    RETURN VALUE:  Returns 1 on success.  Returns 0 on error.
*/
static int openDriver    /* output: 1 on success.  0 on error. */
(
    void
);

/*****************************************************************
**    createArrays  -  create SPOX arrays for driver communication
**
**    DESCRIPTION:
**        Create the arrays required for passing buffers to and from the comm
**        port driver.
**
**    PUBLIC GLOBALS ACCESSED:   none
**
**    PRIVATE GLOBALS ACCESSED:  hInArray    (write)
**                               hOutArray   (write)
**                               inStream    (read)
**                               outStream   (read)
**                               BFR_SZ      (read)
**
**    ASSUMPTIONS:
**        The input and output streams have been successfully created.
**        The memory segment to use is the stream's memory segment.
*/
static void createArrays
(
    void
);

/*****************************************************************
**    processMsg  -  process a mailbox message
**
**    DESCRIPTION:
**        Perform action appropriate for the message pointed to by the argument
**        "msgPtr".
**
**    PUBLIC GLOBALS ACCESSED:   AT_DATA_MODE   (read)
**                               AT_CMD         (read)
**
**    PRIVATE GLOBALS ACCESSED:  none
**
**    ASSUMPTIONS:   The message TMB_EXIT has already been processed.
*/
static void processMsg
(
    TMB_Msg *msgPtr   /* input: pointer to the message to process. */
);

/*****************************************************************
**    processData  -  perform data mode data handling
**
**    DESCRIPTION:
**        Call routine to process data received from the DTE and the routine to
**        process data to transmit to the DTE.
**
**    GLOBALS ACCESSED:   none
**
**    ASSUMPTIONS:        none
*/
static void processData
(
    void
);

/*****************************************************************
**    processCmdData  -  perform command mode data handling
**
**    DESCRIPTION:
```

```
**      Call routine to process data received from the DTE and tl  outine to
**      process data to transmit to the DTE.
**
** GLOBALS ACCESSED:   none
**
** ASSUMPTIONS:        none
*/
static void processCmdData
(
   void
);

/*************************************************************************
** processInput    -  get and process characters from the comm port driver
**
** DESCRIPTION:
**      Process data received from the DTE by getting the data from the comm
**      port driver and then calling a routine to perform character processing.
**
** PUBLIC GLOBALS ACCESSED:    none
**
** PRIVATE GLOBALS ACCESSED:   inStream        (read)
**                             hInArray        (read)
**                             curInfoPtr      (read)
**
** ASSUMPTIONS: The input stream and array handles are both valid.
*/
static void processInput
(
   void
);

/*************************************************************************
** processOutput   -  get and process characters from DTE transmit queue
**
** DESCRIPTION:
**      Process data from the DTE transmit queue by getting the data from the
**      queue and sending the data to the comm port driver.
**
** PUBLIC GLOBALS ACCESSED:    DTE_TX_Q        (read)
**
** PRIVATE GLOBALS ACCESSED:   hOutArray       (read)
**                             outStream       (read)
**                             BFR_SZ          (read)
**
** ASSUMPTIONS: The output stream and array handles are both valid.
*/
static void processOutput
(
   void
);

/*************************************************************************
** processChars    -  process data mode characters from comm port driver
**
** DESCRIPTION:
**      Scan data for TIES escape sequence. Then, pass data to the queue
**      manager's DTE receive queue.
**
** PUBLIC GLOBALS ACCESSED:    DTE_RX_Q        (read)
**
** PRIVATE GLOBALS ACCESSED:   CMD_MODE        (read)
**
** ASSUMPTIONS:
**      If there is not an internal buffer available, this routine does not
**      copy the characters from the indicated buffer.
*/
static void processChars
(
   unsigned *bfrPtr,  /* input: buffer pointer containing chars to process */
   int nChars         /* input: number of chars in the buffer */
);

/*************************************************************************
** processCmdChars -  process command mode characters from comm port driver
```

INTEL CONFIDENTIAL

```
**  DESCRIPTION:
**      Perform internal buffering of data pointed to by the argument "bfrPtr".
**
**  PUBLIC GLOBALS ACCESSED:   none
**
**  PRIVATE GLOBALS ACCESSED:  curInfoPtr    (read/write)
**                             MAX_BFR_SZ    (read)
**
**  ASSUMPTIONS:
**      If there is not an internal buffer available, this routine does not
**      copy the characters from the indicated buffer.
*/
static void processCmdChars
(
   unsigned *bfrPtr,  /* input: buffer pointer containing chars to process */
   int nChars         /* input: number of chars in the buffer */
);

/*****************************************************************************
**  scanData  -  scan data for TIES escape
**
**  DESCRIPTION:
**      Run the TIES escape sequence lexical analyzer state machine. Return
**      the com manager's mode (either command mode or data mode) after the
**      scan.
**
**  PUBLIC GLOBALS ACCESSED:   CM_CMD_MODE    (read)
**                             AT_TASK        (read)
**                             CM_AT_CMD      (read)
**
**  PRIVATE GLOBALS ACCESSED:  CMD_MODE       (read)
**                             DATA_MODE      (read)
**
**  ASSUMPTIONS:
**      If there is not an internal buffer available, this routine does not
**      copy the characters from the indicated buffer.
*/
static ModeType scanData
(
   unsigned *bfrPtr,    /* input: the buffer from which to copy */
   int       nChars,    /* input: the number of characters to copy */
   int      *endLocPtr  /* output: location which gets index to next character
                        *         after escape sequence */
);

/*****************************************************************************
**  doCmdInCopy  -  do command mode input data copy
**
**  DESCRIPTION:
**      Perform copy of data input from the DTE to the current buffer. When
**      appropriate, strip linefeeds. Pass pointer to the buffer of data to
**      copy with "bfrPtr". If a line terminator is found, then call routine
**      to mail the current buffer to the AT task.
**
**  PUBLIC GLOBALS ACCESSED:   none
**
**  PRIVATE GLOBALS ACCESSED:  curInfoPtr    (write)
**
**  ASSUMPTIONS:  The current mode is command mode.
*/
static void doCmdInCopy
(
   unsigned *bfrPtr,  /* input: the buffer from which to copy */
   int       nChars   /* input: the number of characters to copy */
);

/*****************************************************************************
**  sendData  -  send data to AT task or to DTE receive queue
**
**  DESCRIPTION:
**      This routine determines the current mode (either data or command) and
**      then either mails the current data buffer to the AT task as an AT
**      command, or writes the current buffer to the DTE receive queue. If the
**      mode is command mode, this routine also null and line terminates the
**      current buffer.
```

```
554    **
555    **  PUBLIC GLOBALS ACCESSED:   AT_CMD       (read)
556    **                             AT_TASK      (read)
557    **                             DTE_RX_Q     (read)
558    **
559    **  PRIVATE GLOBALS ACCESSED:  CMD_MODE     (read)
560    **                             curInfoPtr   (read/write)
561    **
562    **  ASSUMPTIONS:
563    **     If there is not an internal buffer available, this routine does not
564    **     copy the characters from the indicated buffer.
565    */
566    static void sendData
567    (
568       void
569    );
570
571
572    /******************************************************************
573    **  setDataMode  -  set the communication port manager's state to data mode
574    **
575    **  DESCRIPTION:
576    **     Set the private global state variable that determines the current mode
577    **     to indicate that the mode is data mode.
578    **
579    **  PUBLIC GLOBALS ACCESSED:   none
580    **
581    **  PRIVATE GLOBALS ACCESSED:  mode   (write)
582    **
583    **  ASSUMPTIONS:   none
584    */
585    static void setDataMode
586    (
587       void
588    );
589
590
591    /******************************************************************
592    **  setCmdMode  -  set the communication port manager's state to command mode
593    **
594    **  DESCRIPTION:
595    **     Set the private global state variable that determines the current mode
596    **     to indicate that the mode is command mode.
597    **
598    **  PUBLIC GLOBALS ACCESSED:   none
599    **
600    **  PRIVATE GLOBALS ACCESSED:  mode   (write)
601    **
602    **  ASSUMPTIONS:   none
603    */
604    static void setCmdMode
605    (
606       void
607    );
608
609
610    /******************************************************************
611    **  nextBfr  -  setup new current buffer
612    **
613    **  DESCRIPTION:
614    **     Setup a new internal buffer as the current buffer.  Mark the current
615    **     buffer as unavailable.
616    **
617    **  PUBLIC GLOBALS ACCESSED:   none
618    **
619    **  PRIVATE GLOBALS ACCESSED:  curInfoPtr   (read/write)
620    **                             bfrInfo[]    (read)
621    **
622    **  ASSUMPTIONS:   none
623    */
624    static void nextBfr
625    (
626       void
627    );
628
629
630    /******************************************************************
631    **  recycleBfr  -  make the indicated buffer available for reuse
632    **
```

```
** DESCRIPTION:  Mark the buffer pointed to by *bfrPtr* as available.
**
** PUBLIC GLOBALS ACCESSED:   none
**
** PRIVATE GLOBALS ACCESSED:  bfrInfo[]    (read/write)
**                            N_BFRS       (read)
**
** ASSUMPTIONS:  none
*/
static void recycleBfr
(
   unsigned *bfrPtr  /* input: the buffer to recycle */
);

/****************************************************************************
** getLineTermChar  -  get line terminator character
**
** DESCRIPTION:
**    Return the value of the character which is the current S-register
**    definition of the line terminator character.
**
** PUBLIC GLOBALS ACCESSED:   acu_info_rec   (read)
**
** PRIVATE GLOBALS ACCESSED:  none
**
** ASSUMPTIONS:  none
*/
static unsigned getLineTermChar
(
   void
);

/****************************************************************************
** getBackspaceChar  -  get backspace character
**
** DESCRIPTION:
**    Return the value of the character which is the current S-register
**    definition of the backspace character.
**
** PUBLIC GLOBALS ACCESSED:   acu_info_rec   (read)
**
** PRIVATE GLOBALS ACCESSED:  none
**
** ASSUMPTIONS:  none
*/
static unsigned getBackspaceChar
(
   void
);

/****************************************************************************
** cleanUp  -  perform cleanup at task exit
**
** DESCRIPTION:
**    Call routines to delete all the allocated data structures and close all
**    the drivers that the communications port manager used.  Then, send a
**    message to the AT task that says the communications port manager is
**    done.
**
** PUBLIC GLOBALS ACCESSED:   CM_DONE   (read)
**
** PRIVATE GLOBALS ACCESSED:  none
**
** ASSUMPTIONS:  none
*/
static void cleanUp
(
   void
);

/****************************************************************************
** closeDriver  -  close the communications port driver
**
** DESCRIPTION:
**    Close the comm port driver and delete the associated streams.
```

```
712    **
713    **  PUBLIC GLOBALS ACCESSED:   none
714    **
715    **  PRIVATE GLOBALS ACCESSED:  inStream    (read)
716    **                             outStream   (read)
717    **
718    **  ASSUMPTIONS: The input and output streams have already been created.
719    */
720    static void closeDriver
721    (
722       void
723    );
724
725
726    /**********************************************************************
727    **  deleteArrays  -  delete communications port manager's arrays
728    **
729    **  DESCRIPTION:
730    **     Delete and free the SPOX arrays used for communication with the comm
731    **     port driver.
732    **
733    **  PUBLIC GLOBALS ACCESSED:   none
734    **
735    **  PRIVATE GLOBALS ACCESSED:  hInArray    (read)
736    **                             hOutArray   (read)
737    **
738    **  ASSUMPTIONS: The arrays have already been created.
739    */
740    static void deleteArrays
741    (
742       void
743    );
744
745
746    /**********************************************************************
747    **  deleteTimers  -  delete the communications port manager's timers
748    **
749    */
750    static void deleteTimers
751    (
752       void
753    );
754
755
756    /**********************************************************************
757    **  decodeParity  -  decode the parity bit field
758    **
759    */
760    static ParityType decodeParity
761    (
762       Long parityInfo   /* input: parity info as retrieved with SS_ctrl from com
763                          *        port driver */
764    );
765
766
767    /**********************************************************************
768    **  decodeWordLen  -  decode the word length bit field
769    **
770    */
771    static unsigned decodeWordLen
772    (
773       Long wordLenInfo
774    );
775
776
777    /**********************************************************************
778    **  decodeNStopBits  -  decode the number of stop bits bit field
779    **
780    */
781    static unsigned decodeNStopBits
782    (
783       Long stopBitsInfo
784    );
785
786
787    /**********************************************************************
788    **  decodeParityEnable  -  decode the parity enable bit field
789    **
790    */
```

```
791    static Bool decodeParity_enable
792    (
793        Long parityEnableInfo
794    );
795
796
797    /******************************************************************
798    **   initChars   -  initialize special character values
799    **
800    **   DESCRIPTION:
801    **      Setup the global variables that hold the backspace and end of line
802    **      character values.
803    **
804    **   PUBLIC GLOBALS ACCESSED:    acu_info_rec    (read)
805    **
806    **   PRIVATE GLOBALS ACCESSED:   backspaceChar   (write)
807    **                               lineTermChar    (write)
808    */
809    static void initChars
810    (
811        void
812    );
813
814
815    /*********************** Public Functions ***********************/
816
817    /******************************************************************
818    **   comMgrTask  -  main communications port manager task loop
819    **
820    **   ADDITIONAL DESCRIPTION:
821    **      Call function to perform comm manager initialization.
822    **      If initialization is successful,
823    **          Forever,
824    **              Call routine to get a message from the mailbox.
825    **              If a message was available,
826    **                  If the message is EXIT,
827    **                      Break out of Forever loop.
828    **                  EndIf.
829    **                  Else,
830    **                      Call routine to process the message.
831    **                  EndElse.
832    **              EndIf.
833    **              Call routine to process any tx or rx data.
834    **              Sleep a while.
835    **          EndForever.
836    **      EndIf.
837    **      Perform any pre-exit clean-up.
838    */
839    void comMgrTask
840    (
841        void
842    )
843    {
844        Bool done = FALSE;
845        TMB_Msg msg;
846
847        if ( initComMgr() )
848        {
849            /* Successful initialization. */
850    #ifdef DEBUG
851            GS_printf( "Comm Mgr: Successful initialization.\n" );
852    #endif
853
854            while ( !done )
855            {
856                if ( getMessage( COMM_MGR, &msg ) )
857                {
858                    /* A message is available. */
859                    if ( msg.msg == TMB_EXIT )
860                        cleanUp();
861                    else
862                        processMsg( &msg );
863                }
864
865                if ( mode == DATA_MODE )
866                    processData();
867                else
868                    processCmdData();
869
```

```
870            KT_sleep( COM_MGR_SLEEP_TIME );
871        }
872    }
873    else
874        GS_printf( "Comm Mgr: Initialization failure in comMgrTask()!\n" );
875 }
876
877
878 void getComDataSetup
879 (
880    ComSetupType *setupPtr
881 )
882 {
883    Long info;
884
885    SS_ctrl( inStream, DCM_CGETCONTROL, (Arg)&info );
886
887    setupPtr->wordLen = decodeWordLen( info );
888    setupPtr->nStopBits = decodeNStopBits( info );
889    setupPtr->parityEnable = decodeParityEnable( info );
890    setupPtr->parity = decodeParity( info );
891 )
892
893
894 void setkent
895 (
896    void
897 )
898 {}
899
900
901 /*************************** Private Functions ****************************/
902
903 /*****************************************************************************
904 **  initComMgr  -  initialize the communications port manager
905 **
906 **  ADDITIONAL DESCRIPTION:
907 **      Call routine to open the comm port driver.
908 **      If an error occurs,
909 **          Return an error code.
910 **      EndIf.
911 **      Call routine to setup the necessary timers.
912 **      If an error occurs,
913 **          Return an error code.
914 **      EndIf.
915 **      Call routine to create the necessary SPOX arrays.
916 **      Call routine to initialize handling of the RS232 signals.
917 **      Set mode to command mode.
918 **      Return success code.
919 */
920 static int initComMgr  /* output: 1 on success.  0 on error. */
921 (
922    void
923 )
924 {
925    if ( !openDriver() )
926    {
927        GS_printf( "Comm Mgr: Error opening driver!\n" );
928        return 0;
929    }
930
931    createArrays();
932
933    initRS232Handling();
934
935    setCmdMode();
936
937    initChars();
938
939    return 1;
940 }
941
942
943 /*****************************************************************************
944 **  openDriver  -  open the communications port driver
945 **
946 **  ADDITIONAL DESCRIPTION:
947 **      Create the necessary input and output streams.
948 **      Open the driver for input.
```

```
949      **      If an error occurs opening the driver,
950      **          Delete the streams.
951      **          Return error code.
952      **      EndIf.
953      **      Open the driver for output.
954      **      If an error occurs opening the driver,
955      **          Close the driver for input.
956      **          If an error occurs closing the driver,
957      **              Report the error to the trace buffer.
958      **          EndIf.
959      **          Delete the streams.
960      **          Return error code.
961      **      EndIf.
962      **      Return success code.
963      */
964      static int openDriver   /* output: 1 on success.  0 on error. */
965      (
966         void
967      )
968      {
969         char strmName[8];
970         SS_Attrs attrs = SS_ATTRS;
971
972         attrs.nbufs = 3;   /* Triple buffered. */
973         attrs.memseg = SG_SRAM;
974
975         inStream  = SS_create( SS_NULL, NULL, DRIVER_BFR_SZ, &attrs );
976         outStream = SS_create( SS_NULL, NULL, DRIVER_BFR_SZ, &attrs );
977
978         strcpy( strmName, "/commNB" );
979
980         if ( SS_open( inStream, strmName, SS_READ ) )
981         {
982            /* Error opening driver. */
983            GS_printf( "Comm Mgr: Error opening driver for input!\n" );
984            SS_delete( inStream );
985            SS_delete( outStream );
986            return 0;
987         }
988
989         if ( SS_open( outStream, strmName, SS_WRITE ) )
990         {
991            /* Error opening driver. */
992            GS_printf( "Comm Mgr: Error opening driver for output!\n" );
993            if ( SS_close( inStream ) )
994               GS_printf( "Comm Mgr: Can't close driver in openDriver()!\n" );
995            SS_delete( inStream );
996            SS_delete( outStream );
997            return 0;
998         }
999
1000     #ifdef DEBUG
1001        GS_printf( "COM_MGR: Driver opened and streams created.\n" );
1002     #endif
1003
1004        return 1;
1005     }
1006
1007
1008     /***************************************************************
1009     ** createArrays  -  create SPOX arrays for driver communication
1010     **
1011     ** ADDITIONAL DESCRIPTION:
1012     **     Create the input and output arrays and store the array handles in
1013     **     global variables.
1014     */
1015     static void createArrays
1016     (
1017        void
1018     )
1019     {
1020        hInArray  = SA_create( SS_memseg( inStream ),  DRIVER_BFR_SZ, NULL );
1021        hOutArray = SA_create( SS_memseg( outStream ), DRIVER_BFR_SZ, NULL );
1022     }
1023
1024
1025     /***************************************************************
1026     ** processMsg  -  process a mailbox message
1027     **
```

```
1028    **    ADDITIONAL DESCRIPTION:
1029    **       Determine the message.
1030    **       If the message is not recognized,
1031    **          Report message to the trace buffer.
1032    **       EndIf.
1033    **       Else,
1034    **          Perform action corresponding to the message.
1035    **       EndElse.
1036    */
1037    static void processMsg
1038    (
1039        TMB_Msg *msgPtr  /* input: pointer to the message to process. */
1040    )
1041    {
1042        switch ( msgPtr->msg )
1043        {
1044           case AT_DATA_MODE:
1045              if ( msgPtr->words[0] )
1046              {
1047                 /* This means change to data mode. */
1048                 #ifdef DEBUG
1049                 GS_printf( "Comm Mgr: rx'ed enter data mode\n" );
1050                 #endif
1051
1052                 setDataMode();
1053              }
1054              else
1055              {
1056                 if ( mode != CMD_MODE )
1057                 {
1058                    #ifdef DEBUG
1059                    GS_printf( "Comm Mgr: rx'ed enter command mode\n" );
1060                    #endif
1061
1062                    /*
1063                    ** AT task wants switch to command mode.  So, flush the DTE
1064                    ** queues (to prevent garbage from being transmitted to the
1065                    ** host and to prevent garbage from being transmitted to the
1066                    ** DCE later).  Then, change modes.
1067                    */
1068                    flushQ( DTE_RX_Q );
1069                    flushQ( DTE_TX_Q );
1070                    setCmdMode();
1071                 }
1072              }
1073              break;
1074
1075           case AT_ECHO:
1076              #ifdef DEBUG
1077              GS_printf( "Comm Mgr: rx'ed echo msg: turn echo %s.\n",
1078                         msgPtr->words[0] ? "ON" : "OFF" );
1079              #endif
1080              echoFlag = msgPtr->words[0];
1081              break;
1082
1083           case CM_AT_CMD:
1084              #ifdef DEBUG
1085              GS_printf( "Comm Mgr: rx'ed recycle buffer\n" );
1086              #endif
1087
1088              recycleBfr( (unsigned *)msgPtr->words[0] );
1089              break;
1090
1091           case AT_SW_FLOW:
1092              #ifdef DEBUG
1093              GS_printf( "Comm Mgr: rx'd AT_SW_FLOW message.\n" );
1094              #endif
1095              enableSWFlowCtrl();
1096              break;
1097
1098           case AT_HW_FLOW:
1099              #ifdef DEBUG
1100              GS_printf( "Comm Mgr: rx'd \"turn %s HW flow ctrl\" message.\n",
1101                         msgPtr->words[0] ? "ON" : "OFF" );
1102              #endif
1103
1104              if ( msgPtr->words[0])
1105                 enableBiHWFlowCtrl();
1106              else
```

```
1107              enableUniHW_xwCtrl();
1108           break;
1109
1110        case AT_FLOW_OFF:
1111           #ifdef DEBUG
1112              GS_printf( "Comm Mgr: rx'd AT_FLOW_OFF message.\n" );
1113           #endif
1114
1115           disableAllFlowCtrl();
1116           break;
1117
1118        case AT_PASS_XONXOFF:
1119           #ifdef DEBUG
1120              GS_printf( "Comm Mgr: rx'd AT_PASS_XONXOFF message: %s.\n",
1121                         msgPtr->words[0] ? "ON" : "OFF" );
1122           #endif
1123
1124           passXonXoff = msgPtr->words[0];
1125           break;
1126
1127        case AT_CHARS:
1128           #ifdef DEBUG
1129              GS_printf( "Comm Mgr: rx'd AT_CHARS message.\n" );
1130           #endif
1131
1132           initChars();
1133           break;
1134
1135        default:
1136           GS_printf( "Comm Mgr: unrecognized msg: %d (hex = %x)\n", msgPtr->msg, msgPtr->msg );
1137           break;
1138     }
1139   }
1140
1141
1142   /****************************************************************************
1143   ** processData  -  perform communications port manager data handling
1144   **
1145   ** ADDITIONAL DESCRIPTION:
1146   **    Call routine to process data input from the DTE.
1147   **    Call routine to process data output to the DTE.
1148   */
1149   static void processData
1150   (
1151      void
1152   )
1153   {
1154      processInput();
1155      processOutput();
1156   }
1157
1158
1159   /****************************************************************************
1160   ** processInput  -  get and process data mode characters from the comm
1161   **                  port driver
1162   **
1163   ** ADDITIONAL DESCRIPTION:
1164   **    Get a buffer from the comm port driver.
1165   **    If characters were received,
1166   **       Call routine to process the characters.
1167   **    EndIf.
1168   */
1169   static void processInput
1170   (
1171      void
1172   )
1173   {
1174      int len, val, nSlots;
1175      unsigned *bfrPtr;
1176   #ifdef DEBUG
1177      int i;
1178      char *tmpPtr;
1179   #endif
1180
1181      nSlots = nEmptySlots( DTE_RX_Q );
1182      if ( nSlots <= FLOW_OFF_LEVEL )
1183      {
1184         turnFlowOff();
1185      }
```

```
1186        else
1187        {
1188            if ( nSlots >= FLOW_ON_LEVEL )
1189            {
1190                turnFlowOn();
1191            }
1192        }
1193
1194        SS_get( inStream, hInArray );
1195
1196        if ( len = SA_getlength( hInArray ) )
1197        {
1198  #ifdef DEBUG
1199  #ifdef _Q
1200            GS_printf( "Comm Mgr: Rx'ed %d chars from host.\n  Chars are: ", len );
1201            tmpPtr = (char *)SA_getbuf( hInArray );
1202            for ( i = 0; i < len; i++ )
1203                GS_printf( "%c", tmpPtr[i] );
1204            GS_printf( "\n" );
1205  #endif
1206  #endif
1207  #ifdef DEBUG
1208            GS_printf( "COM_MGR: Q space = %d, chars rx'd = %d.\n", nSlots, len );
1209  #endif
1210            /* Some characters came in from the host. */
1211            processChars( (unsigned *)SA_getbuf( hInArray ), len );
1212        }
1213    }
1214
1215
1216    /***************************************************************************
1217    ** processCmdData   -  process command mode data
1218    **
1219    ** ADDITIONAL DESCRIPTION:
1220    **      Call routine to process data input from the DTE.
1221    **      Call routine to process data output to the DTE.
1222    */
1223    static void processCmdData
1224    (
1225        void
1226    )
1227    {
1228        processCmdInput();
1229        processOutput();
1230    }
1231
1232
1233    /***************************************************************************
1234    ** processCmdInput  -  get and process command mode characters from the comm
1235    **                     port driver
1236    **
1237    ** ADDITIONAL DESCRIPTION:
1238    **      Get a buffer from the comm port driver.
1239    **      If characters were received,
1240    **          Reset the "no chars rx'ed" timer.
1241    **          Call routine to process the characters.
1242    **      EndIf.
1243    **      Else,
1244    **          If the "no chars rx'ed" timer has expired,
1245    **              If the are characters waiting for write to the DTE queues,
1246    **                  Call routine to write the data to the queues.
1247    **              EndIf.
1248    **              Reset the "no chars rx'ed" timer.
1249    **          EndIf.
1250    **      EndElse.
1251    */
1252    static void processCmdInput
1253    (
1254        void
1255    )
1256    {
1257        int len, val;
1258  #ifdef DEBUG
1259        static int count;
1260        int i;
1261        char *tmpPtr;
1262  #endif
1263
1264        SS_get( inStream, hInArray );
```

```
            if ( len = SA_getlength( hInArray ) )
            {
#ifdef DEBUG
#ifdef _O
            GS_printf( "Comm Mgr: Rx'ed %d chars from host.\n  Chars are: ", len );
            tmpPtr = (char *)SA_getbuf( hInArray );
            for ( i = 0; i < len; i++ )
                GS_printf( "%c", tmpPtr[i] );
            GS_printf( "\n" );
#endif
            count = 0;
#endif
            processCmdChars( (unsigned *)SA_getbuf( hInArray ), len );

if ( echoFlag )
                /* Local echo is on.  Output what was just received to the host. */
                SS_put( outStream, hInArray );
            }
#ifdef DEBUG
         else
         {
            count++;
            if ( !(count % 1000) )
                GS_printf( "COM_MGR: no chars rx'd for ~10 seconds!\n" );
         }
#endif
    }

/****************************************************************************
** processOutput - get and process characters from DTE transmit queue
**
** ADDITIONAL DESCRIPTION:
**     Call routine to get characters from the DTE tx queue.
**     If some characters were available,
**         Set the output array length to the number of characters received.
**         Write the buffer to the driver.
**         Set the output array length back to the buffer size.
**     EndIf.
*/
static void processOutput
(
    void
)
{
    int len;

if ( getFlow2HostState() == FLOW_ON )
    {
        if ( len = getBfrFromQ( (unsigned *)SA_getbuf( hOutArray ),
                                SA_getlength( hOutArray ),
                                DTE_TX_Q ) )
        {
#ifdef DEBUG
            GS_printf( "Comm Mgr: processOutput: len16 = %x.\n", len );
#endif
            /* Some characters are ready to send to the host. */

/*
            ** Mark the array with the number of characters just added from the
            ** DTE transmit queue.
            */
            SA_setlength( hOutArray, len );
            SS_put( outStream, hOutArray );  /* Send array to the host. */

/* Reset the array to its physical size for the next time around. */
            SA_setlength( hOutArray, DRIVER_BFR_SZ );
        }
    }
}

/****************************************************************************
** processChars - process data mode characters from comm port driver
**
** ADDITIONAL DESCRIPTION:
**     Call routine to scan for TIES escape sequence.
**     If the TIES escape sequence was found,
```

```
**              Call routine   process the remaining buffer in command mode.
**          EndIf.
**      Else,
**          If XON/XOFF is passed through to the remote modem,
**              Call routine to add the buffer to the DTE receive queue.
**              If the entire buffer was not added,
**                  Sleep a while and keep trying to add the remaining buffer.
**              EndIf.
**          EndIf.
**          Else,
**              Add the characters to the DTS receive queue one by one removing
**              any XON and XOFF characters.
**          EndElse.
*/
static void processChars
(
    unsigned *bfrPtr,   /* input: buffer pointer containing chars to process */
    int nChars          /* input: number of chars in the buffer */
)
{
    int nAdded, endLoc;

if ( scanData( bfrPtr, nChars, &endLoc ) == CMD_MODE )
    /*
    ** We switched to command mode.  So, pass the remainder of the buffer
    ** to the command mode character processing routine.
    */
        processCmdChars( bfrPtr + endLoc, nChars - endLoc );
    else
    {
        /* We're still in data mode. */
        switch ( getFlowCtrl() )
        {
            case BI_HW_FLOW_CTRL:
            case NO_FLOW_CTRL:
            case UNI_HW_FLOW_CTRL:
            case PASS_SW_CTRL:
                /* Pass any XON/XOFF characters to the remote modem. */
                nAdded = addBfr2Q( bfrPtr, nChars, DTE_RX_Q );
                if ( nAdded != nChars )
                {
                    /* There was not enough space in the queue. */
                    do
                    {
                        KT_sleep( COM_MGR_SLEEP_TIME );
                        nChars -= nAdded;
                        nAdded = addBfr2Q( bfrPtr += nAdded, nChars, DTE_RX_Q );
                    } while ( nAdded < nChars );
                }
                break;

case NO_PASS_SW_CTRL:
                /* Strip XON/XOFF. */
                while ( nChars )
                {
                    if ( *bfrPtr != XON && *bfrPtr != XOFF )
                    {
                        /* The current character is neither XON nor XOFF. */
                        while ( !addChar2Q( *bfrPtr, DTE_RX_Q ) )
                            /* No space in the queue. */
                            KT_sleep( COM_MGR_SLEEP_TIME );   /* Sleep and try again. */
                    }
                    nChars--;
                    bfrPtr++;
                }
                break;

default:
                GS_printf( "COM_MGR: Bad flow ctrl in processChars()!\n" );
                break;
        }
    }
}

/*****************************************************************************
** processCmdChars - process command mode characters from comm port driver
**
** ADDITIONAL DESCRIPTION:
```

```
1423       **      If there is a buffer available for holding the characters
1424       **          If there are more characters than will fit in the buffer,
1425       **              Call routine to write the data to the DTE receive queue.
1426       **          EndIf.
1427       **          Copy the characters to the current buffer.
1428       **      EndIf.
1429       **      Call routine to scan the buffer for escape sequence or line terminator.
1430       */
1431       static void processCmdChars
1432       (
1433           unsigned *bfrPtr,   /* input: buffer pointer containing chars to process */
1434           int nChars          /* input: number of chars in the buffer */
1435       )
1436       {
1437           if ( curInfoPtr )  /* buffer available */
1438           {
1439               /* There is a current buffer.  So, copy the input characters. */
1440               if ( (curInfoPtr->curLoc + nChars) >= MAX_AT_CMD_LEN ) /* exceeds length of buffer */
1441                   /* There are too many chars to fit in current buffer. */
1442                   sendData();  /* send to the task */
1443               doCmdInCopy( bfrPtr, nChars );
1444           }
1445           else
1446               GS_printf( "Comm Mgr: No current buffer in processChars()!\n" );
1447       }
1448
1449
1450       /*****************************************************************************
1451       **   scanData   -   scan data for TIES escape
1452       **
1453       **   ADDITIONAL DESCRIPTION:
1454       **       For each character in the indicated buffer,
1455       **           Run state machine which scans for TIES escape sequence.
1456       **           If the escape sequence is found,
1457       **               Call routine to send the data.
1458       **               Call routine to setup for mailing the AT command to the AT task.
1459       **           EndIf.
1460       **       EndFor.
1461       */
1462       static ModeType scanData
1463       (
1464           unsigned *bfrPtr,    /* input: the buffer from which to copy */
1465           int      nChars,     /* input: the number of characters to copy */
1466           int      *endLocPtr  /* output: location which gets index to next character
1467                                 *         after escape sequence */
1468       )
1469       {
1470           static enum
1471           {
1472               START_STATE,    /* The initial state. */
1473               FIRST_PLUS,     /* Found the first plus. */
1474               SECOND_PLUS,    /* Found the second plus. */
1475               THIRD_PLUS,     /* Found the third plus. */
1476               A_FOUND,        /* Found the 'A' of the AT following the third plus. */
1477               T_FOUND,        /* Found the 'T' of the AT following the third plus. */
1478               H_FOUND         /* Found an 'H' following the AT after the third plus */
1479           } TIES_state = START_STATE;
1480           int i;
1481           unsigned atBfr[4], nATChars;
1482           TMB_Msg msg;
1483           ModeType result = DATA_MODE;
1484
1485           for ( i = 0; i < nChars; i++, bfrPtr++ )
1486           {
1487               switch ( TIES_state )
1488               {
1489                   case START_STATE:
1490                       if ( *bfrPtr == '+' )
1491                           TIES_state = FIRST_PLUS;
1492                       break;
1493
1494                   case FIRST_PLUS:
1495                       if ( *bfrPtr == '+' )
1496                           TIES_state = SECOND_PLUS;
1497                       else
1498                           TIES_state = START_STATE;
1499                       break;
1500
1501                   case SECOND_PLUS:
```

```
              *bfrPtr == =
        if ( *bfrPtr == '+' )
            TIES_state = THIRD_PLUS;
        else
            TIES_state = START_STATE;
        break;

case THIRD_PLUS:
        if ( *bfrPtr == 'a' || *bfrPtr == 'A' )
            TIES_state = A_FOUND;
        else
            TIES_state = START_STATE;
        break;

case A_FOUND:
        if ( *bfrPtr == 't' || *bfrPtr == 'T' )
            TIES_state = T_FOUND;
        else
            TIES_state = START_STATE;
        break;

case T_FOUND:
    case H_FOUND:
        if ( *bfrPtr == lineTermChar )
        {
            /* We have found the complete escape sequence. */
            #ifdef DEBUG
            GS_printf( "COM_MGR: Escape sequence found!\n" );
            #endif
            result = CMD_MODE;
            *endLocPtr = i + 1;
            setCmdMode();
            msg.msg = CM_CMD_MODE;
            msg.words[0] = 1;
            if ( !sendMessage( &msg, AT_TASK ) )
                GS_printf( "Error sending message in scanData()!\n" );
            msg.msg = CM_AT_CMD;
            atBfr[0] = 'A';
            atBfr[1] = 'T';
            if ( TIES_state == H_FOUND )
            {
                atBfr[2] = 'H';
                atBfr[3] = *bfrPtr;
                nATChars = 4u;
            }
            else
            {
                atBfr[2] = *bfrPtr;
                nATChars = 3u;
            }
            doCmdInCopy( atBfr, nATChars );
        }
        else
        {
            if ( *bfrPtr == 'H' || *bfrPtr == 'h' )
                TIES_state = H_FOUND;
            else
                TIES_state = START_STATE;
        }
        break;

default:
        GS_printf( "Comm Mgr: Bad state %d in scanData()!\n",
                   TIES_state );
        TIES_state = START_STATE;
        break;
    }
} return result;
}

/*****************************************************************************
** doCmdInCopy  -  do command mode input data copy
**
** ADDITIONAL DESCRIPTION:
**     For each character in the indicated buffer,
**         If we are to strip the next linefeed,
**             If the current character is a linefeed,
```

```
**              Set the "strip linefeed" flag to FALSE.
**              Continue with next loop interation.
**          EndIf.
**       EndIf.
**       If the current character is a backspace,
**          Perform command-line editing.
**          Continue with next loop interation.
**       EndIf.
**       Copy the current character to the current command-line buffer.
**       If the current character is the line termination character,
**          Call routine to send the current AT command to the AT task.
**          If the termination character is a carriage return,
**             Flag that we must strip any following line-feed.
**          EndIf.
**       EndIf.
**    EndFor.
*/
static void doCmdInCopy
(
   unsigned *bfrPtr,  /* input: the buffer from which to copy */
   int      nChars    /* input: the number of characters to copy */
)
{
   int i;
   static Bool stripLF = FALSE;

for ( i = 0; i < nChars; i++, bfrPtr++ )
   {
      if ( stripLF )
      {
         /* We need to strip any LF. */
         stripLF = FALSE;
         if ( *bfrPtr == '\n' )
            continue;
      }

/* Check for editing characters. */
      if ( *bfrPtr == backspaceChar )
      {
         /* Perform command-line editing. */
         if ( curInfoPtr->curLoc )
         {
            /*
            ** This is not the beginning of the line.  So, backup one
            ** character in the buffer.
            */
            curInfoPtr->curLoc--;
            continue;
         }
         else
            /*
            ** This is the beginning of the line.  Since we cannot backup,
            ** simply ignore the backspace.
            */
            continue;
      }

/* Copy the character to the internal buffer. */
      curInfoPtr->bfr[curInfoPtr->curLoc++] = *bfrPtr;

if ( *bfrPtr == lineTermChar )
      {
         /* This is a complete AT command. */
         sendData();
         if ( lineTermChar == '\r' )
            /* Flag that we must strip a line feed which follows this <CR>. */
            stripLF = TRUE;
      }
   }
}

/***************************************************************************
** sendData  -  send data to AT task or to DTE receive queue
**
** ADDITIONAL DESCRIPTION:
**    Terminate the current buffer with line terminator and a null.
**    Send a message to the AT task containing the current buffer.
**    Call routine to get a new current buffer.
```

```
1660      */
1661      static void sendData
1662      (
1663         void
1664      )
1665      {
1666         int nAdded;
1667         TMB_Msg msg;
1668
1669         /* Add null and line terminator. */
1670         curInfoPtr->bfr[curInfoPtr->curLoc++] = lineTermChar;
1671         curInfoPtr->bfr[curInfoPtr->curLoc] = 0;
1672         msg.msg = CM_AT_CMD;
1673         msg.words[0] = (Uns)curInfoPtr->bfr;
1674         msg.words[1] = (Uns)curInfoPtr->curLoc;
1675         if ( !sendMessage( &msg, AT_TASK ) )
1676            GS_printf( "COMM MGR: Error sending CM_AT_CMD\n" );
1677         nextBfr();
1678      }
1679
1680
1681      /****************************************************************
1682      ** setDataMode  -  set the communication port manager's state to data mode
1683      **
1684      ** ADDITIONAL DESCRIPTION:
1685      **    Set the private global state variable to indicate data mode.
1686      */
1687      static void setDataMode
1688      (
1689         void
1690      )
1691      {
1692         mode = DATA_MODE;
1693      }
1694
1695
1696      /****************************************************************
1697      ** setCmdMode  -  set the communication port manager's state to command mode
1698      **
1699      ** ADDITIONAL DESCRIPTION:
1700      **    Set the private global state variable to indicate command mode.
1701      */
1702      static void setCmdMode
1703      (
1704         void
1705      )
1706      {
1707         mode = CMD_MODE;
1708
1709      #ifdef DEBUG
1710         GS_printf( "Comm Mgr: Entering command mode.\n" );
1711      #endif
1712      }
1713
1714
1715      /****************************************************************
1716      ** nextBfr  -  setup new current buffer
1717      **
1718      ** ADDITIONAL DESCRIPTION:
1719      **    Mark the current buffer as unavailable.
1720      **    For each of the potential buffers,
1721      **       If the buffer is available,
1722      **          Make the buffer into the current buffer.
1723      **       EndIf.
1724      **    EndFor.
1725      */
1726      static void nextBfr
1727      (
1728         void
1729      )
1730      {
1731         int i;
1732
1733         curInfoPtr->available = FALSE;
1734         curInfoPtr->curLoc = 0;
1735         for ( i = 0; i < N_BFRS; i++ )
1736         {
1737            if ( bfrInfo[i].available )
1738            {
```

```
1739            curInfoPtr = bfrInfo + 1;
1740            return;
1741          }
1742        }
1743
1744        GS_printf( "Comm Mgr: No buffers available in nextBfr()!\n" );
1745     }
1746
1747
1748     /**************************************************************************
1749     ** recycleBfr  -  make the indicated buffer available for reuse
1750     **
1751     ** ADDITIONAL DESCRIPTION:
1752     **     For each of the potential buffers,
1753     **         If the buffer is the indicated buffer,
1754     **             Mark the buffer as available.
1755     **             Return.
1756     **         EndIf.
1757     **     EndFor.
1758     */
1759     static void recycleBfr
1760     (
1761        unsigned *bfrPtr  /* input: the buffer to recycle */
1762     )
1763     {
1764        int i;
1765
1766        for ( i = 0; i < N_BFRS; i++ )
1767        {
1768           if ( bfrInfo[i].bfr == bfrPtr )
1769           {
1770              /* This is the buffer's information. */
1771              bfrInfo[i].available = TRUE;
1772              return;
1773           }
1774        }
1775
1776        GS_printf( "Comm Mgr: Can't recycle buffer in recycleBfr()!\n" );
1777     }
1778
1779
1780     /**************************************************************************
1781     ** getLineTermChar  -  get line terminator character
1782     **
1783     ** ADDITIONAL DESCRIPTION:
1784     **     Call routine to get the current acu information on the S-register
1785     **     character definitions.
1786     **     Return the value of the line terminator character from the information
1787     **     retrieved.
1788     */
1789     static unsigned getLineTermChar
1790     (
1791        void
1792     )
1793     {
1794        struct acu_info_rec info;
1795
1796        acuif_get_acu_info( &info );
1797
1798        return info.line_term_val;
1799     }
1800
1801
1802     /**************************************************************************
1803     ** getBackspaceChar  -  get backspace character
1804     **
1805     ** ADDITIONAL DESCRIPTION:
1806     **     Call routine to get the current acu information on the S-register
1807     **     character definitions.
1808     **     Return the value of the backspace character from the information
1809     **     retrieved.
1810     */
1811     static unsigned getBackspaceChar
1812     (
1813        void
1814     )
1815     {
1816        struct acu_info_rec info;
1817
```

```
1818        acuif_get_acu_info( , &info );
1819
1820        return info.bs_val;
1821    }
1822
1823
1824    /****************************************************************
1825    ** cleanUp   -  perform cleanup at task exit
1826    **
1827    ** ADDITIONAL DESCRIPTION:
1828    **     Call routine to close the comm port driver.
1829    **     Call routine to delete the "no chars rx'ed" timer.
1830    **     Call routine to delete the SPOX arrays used for driver communication.
1831    **     Send an "I'm done" message to the AT task.
1832    */
1833    static void cleanUp
1834    (
1835        void
1836    )
1837    {
1838        TMB_Msg msg;
1839
1840    #ifdef DEBUG
1841        GS_printf( "COM_MGR: cleaning up...\n" );
1842    #endif
1843        delRS232Handler();
1844        closeDriver();
1845        deleteArrays();
1846
1847    #ifdef DEBUG
1848        GS_printf( "COM_MGR: Sending CM_DONE...\n" );
1849    #endif
1850        msg.msg = CM_DONE;
1851        if ( !sendMessage( &msg, AT_TASK ) )
1852            GS_printf( "Comm Mgr: Error sending done message!\n" );
1853
1854    #ifdef DEBUG
1855        GS_printf( "COM_MGR: Cleanup done.\n" );
1856    #endif
1857
1858        /* Wait for AT task to delete the com manager task. */
1859        while ( 1 )
1860            KT_sleep( 100000 );  /* A VERY long time. */
1861    #ifdef _Q
1862        KT_exit();
1863    #endif
1864    }
1865
1866
1867    /****************************************************************
1868    ** closeDriver  -  close the communications port driver
1869    **
1870    ** ADDITIONAL DESCRIPTION:
1871    **     Close the input stream.
1872    **     If an error occurs closing the stream,
1873    **         Write an error message the trace buffer.
1874    **     EndIf.
1875    **     Close the output stream.
1876    **     If an error occurs closing the stream,
1877    **         Write an error message the trace buffer.
1878    **     EndIf.
1879    **     Delete the input stream.
1880    **     Delete the output stream.
1881    */
1882    static void closeDriver
1883    (
1884        void
1885    )
1886    {
1887    #ifdef DEBUG
1888        GS_printf( "COM_MGR: Closing driver...\n" );
1889
1890    #endif
1891        if ( SS_close( inStream ) )
1892            GS_printf("Comm Mgr: Error closing input stream!\n" );
1893
1894        if ( SS_close( outStream ) )
1895            GS_printf("Comm Mgr: Error closing output stream!\n" );
1896
```

```
#ifdef DEBUG
    GS_printf( "COM_MGR: Driver closed. Deleting streams...\n" );
endif SS_delete( inStream );
    SS_delete( outStream );

#ifdef DEBUG
    GS_printf( "COM_MGR: Streams deleted.\n" );
#endif
}

/******************************************************************
** deleteArrays  -  delete communications port manager's arrays
**
** ADDITIONAL DESCRIPTION:
**     Free the input array.
**     Delete the input array.
**     Free the output array.
**     Delete the output array.
*/
static void deleteArrays
(
    void
)
{
#ifdef DEBUG
    GS_printf( "COM_MGR: Deleting arrays...\n" );
#endif
    SA_free( hInArray );
    SA_delete( hInArray );

SA_free( hOutArray );
    SA_delete( hOutArray );
#ifdef DEBUG
    GS_printf( "COM_MGR: Arrays deleted.\n" );
#endif
}

/******************************************************************
** decodeParity  -  decode the parity bit field
**
*/
static ParityType decodeParity
(
    Long parityInfo  /* input: parity info as retrieved with SS_ctrl from com
                     *        port driver */
)
{
    return (ParityType)((parityInfo & PARITY_MODE_MASK) >> PARITY_MODE_SHIFT);
}

/******************************************************************
** decodeWordLen  -  decode the word length bit field
**
*/
static unsigned decodeWordLen
(
    Long wordLenInfo  /* input: word length info as retrieved with SS_ctrl from
                      *        com port driver */
)
{
    return (unsigned)(((wordLenInfo & WORD_LEN_MASK) >> WORD_LEN_SHIFT) + 5);
}

/******************************************************************
** decodeNStopBits  -  decode the number of stop bits bit field
**
*/
static unsigned decodeNStopBits
(
    Long stopBitsInfo  /* input: stop bits info as retrieved with SS_ctrl from
                       *        com port driver */
)
{
```

```
1976       return (unsigned)(((stopBitsInfo & STOP_BITS_MASK) >> STOP_BIT_SHIFT) + 1);
1977   }
1978
1979
1980   /*****************************************************************
1981   ** decodeParityEnable - decode the parity enable bit field
1982   **
1983   */
1984   static Bool decodeParityEnable
1985   (
1986       Long parityEnableInfo
1987   )
1988   {
1989       if ( parityEnableInfo & PARITY_ENABLE_MASK )
1990          return TRUE;
1991       else
1992          return FALSE;
1993   }
1994
1995
1996
1997   /*****************************************************************
1998   ** initChars - initialize special character values
1999   **
2000   ** ADDITIONAL DESCRIPTION:
2001   **     Call ACU function to get the character values.
2002   **     Set the global variables that hold the character values.
2003   */
2004   static void initChars
2005   (
2006       void
2007   )
2008   {
2009       struct acu_info_rec charInfo;
2010
2011       acuif_get_acu_info( &charInfo );
2012
2013       backspaceChar = charInfo.bs_val;
2014       lineTermChar  = charInfo.line_term_val;
2015
2016   GS_printf( "COM_MGR: BS=%d, EOL=%d.\n", backspaceChar, lineTermChar );
2017   GS_printf( "COM_MGR: Hardcoding backspace and EOL.\n" );
2018   backspaceChar = 8;
2019   lineTermChar = '\r';
2020   }
```

APPENDIX C

```
/*********************    *****************************   ************
 *
 *     Title:       Modem Task Hardware Routines
 *
 *     Copyright:   Copyright, 1991. Intel Corp.
 *                  All Rights Reserved
 *
 *     Product:     RC144DP Modem Task
 *
 *     File Name:   MT1HWUTL.C
 *
 *     Author:
 *
 *     Version:     V1.1
 *
 *     History:     V1.0  8/16/90
 *
 *           Created:
 *
 *           Changes:    Changed procedure Headers for different compiler
 *                       Rockwell bug 39.8 is on chip 0
 *                       Need to set up LPGAIN for bell tone detection
 *                       No need to debounce 1800 Hz detector - LPGAIN changed
 *                       Added get_rseq() & get_sdet() procedure
 *                       Changed LPGAIN for toneB detetctor
 *                       Now change LPFBK for toneB detector - REMOVED
 *                       Disabled AGC and Re-enabled
 *                       Remove EARC bits from SET_ARCS
 *                       Change init routine - may be giving DSP RAM problem
 *                       Added Rockwell fix 39.32 to check_rtdet
 *
 *
 *     Files Included: MT1.H
 *
 *     Last Modified:
 *
 *     Function:    All hardware manipulation routines
 *
 *******************************************************************/ include "mt1.h"
/*#include "dspram.h"*/    /*   include declarations for dsp ram accesses    */
#include "acu.edf"
#include "mkdomsgs.h"
#include "mboxmgr.h"
#include "at_task.edf"
static TMB_Msg mikado_message;

unsigned echo_state;

/*************************************
 *
 *   CHECK TM
 *
 *   update the modemeia bit test mode
 *
 *************************************/ void check_tm()
{
   modemeia_cntrlblk.test_mode=0;
}

/*************************************
 *
 *   INIT LOOP 3
 *
 *   Light off local analogue loopback
 *
 *************************************/ void init_loop3(ubyte c_mode)
{
    register ubyte tmp_byte;
#ifndef MIKADO
    mode_code=c_mode;
    tmp_byte=mode_code_table[mode_code];
```

```
                case FORWARD:
                    switch(mode_code)
                    {
                       case V32_4800_CODE:
                          if(remote_is_v32bis)
                              write_byte(CONFIG_OFFSET, V32_7200_CODE);
                          else
                              write_byte(CONFIG_OFFSET, V32_9600_CODE);
                          break;

case V32_7200_CODE:
                          write_byte(CONFIG_OFFSET, V32_9600_CODE);
                          break;

case V32_9600_NO_TCM_CODE:
                       case V32_9600_CODE:
                          if(remote_is_v32bis)
                              write_byte(CONFIG_OFFSET, V32_12K_CODE);
                          break;

case V32_12K_CODE:
                          write_byte(CONFIG_OFFSET, V32_144K_CODE);
                          break;

}
                    break;
              }
         else if((mode_code == 0x84) && (rtrn_mode == FALLBACK))
            write_byte(CONFIG_OFFSET, 0x82);        /*     1200 V22bis   */ else if((mode_code == 0x82) && (rtrn_mode == FORWARD))
            write_byte(CONFIG_OFFSET, 0x84);        /*     2400 V22bis   */ or_byte(RTSET_OFFSET, RTSET_BIT);     /*    start the retrain    */
endif
}

/*********************************************************************
 *
 *    CHECK RETRAIN REQUEST DETECT
 *
 *            This implements Rockwell bug fix 39.32, the final response
 *            to bug 17, first mentioned in 39.20.  In V.32 the Rockwell
 *            module may mistake noise for a retrain and start one of
 *            its DSPs into retrain while the others are online.  This fix
 *            adds hysteresis to the detect in V.32
 *
 *            ***** Fixes not needed for /14 **********
 *
 *********************************************************************/ void check_rtdet()
{
ifndef MIKADO
    /*     report using global report bit   */
    if(read_byte(RTDET_OFFSET) & RTDET_BIT)
        modem_cntrlblk.rtdet = 1;
    else
        modem_cntrlblk.rtdet = 0;

/* Check that RLSD is active */
    /*     if(((read_byte(DCD_OFFSET) & DCD_BIT) != 0) &&   */
    /*          ((mode_code & V32_MASK) == V32_CODES))                    */
    /*     {
                                                            */
    /*          if(read_byte(RTDET_OFFSET) & RTDET_BIT)     */
    /*               modem_cntrlblk.rtdet = 1;                            */
    /*     }
                                                            */
#endif
}

/***************************************
 *
 *    CHECK RDL RECEIVED
 *
```

```
void check_rdldet()
{
    ubyte tmp_byte;
ifndef MIKADO

/* Either a V54 pattern or TM bit */ if ((mode_code & V32_MASK)!=V32_CODES)
    {
        /* Not V.32 mode */

/* If in V.22bis, do bug fix 147.0 */
        if(((mode_code == V22BIS_CODE) || (mode_code == V22BIS_1200_CODE)) &&     &&
            (modem_status!=LOCAL_TEST)&&(modem_status!=REMOTE_TEST)
            (read_byte(L2ACT_OFFSET) & L2ACT_BIT))
        {
            write_dsp_ram(1,0x039,0x00);
            write_dsp_ram(1,0x039,0x00);
        } if((read_byte(TM_OFFSET) & TM_BIT)!=0)
        {
            if ((modem_status!=LOCAL_TEST)&&(modem_status!=REMOTE_TEST))
            {
                modem_status=REMOTE_TEST;
                return ;
            }
        }
        else
        {
            if (modem_status==REMOTE_TEST)
            {
                modem_status=CONNECTED;
                return ;
            }
        }
    }
    else    /* V.32 */
    {
        /* Now look for V.54 prep patterns */ if ((read_byte(V54DT_OFFSET) & V54DT_BIT)!=0)
        {
            if (modem_status!=REMOTE_TEST)
            {
                /* Prep detected */

/* Save state of prep detector for later */
                tmp_v54pe_byte = read_byte(V54PE_OFFSET);
                tmp_v54pe_byte &= V54PE_BIT;

/* Set up for termination -detection */
                and_byte(V54PE_OFFSET, V54PE_MASK);
                and_byte(V54AE_OFFSET, V54AE_MASK);
                and_byte(V54DT_OFFSET, V54DT_MASK);
                or_byte(V54TE_OFFSET, V54TE_BIT);

/* Send Ack */
                set_rts(OFF);            /* do this to prevent async->sync hang */
                while (read_byte(CTS_OFFSET) & CTS_BIT)
                    {}                   /* wait for cts off */ tmp_byte=read_byte(ASYNC_OFFSET);
                tmp_byte &= ASYNC_BIT;
                and_byte(ASYNC_OFFSET, ASYNC_MASK);

set_rts(ON);
                while (!(read_byte(CTS_OFFSET) & CTS_BIT))
                    {}                   /* wait for cts on */

/* Send pattern and wait till end of transmission */
                or_byte(V54A_OFFSET, V54A_BIT);
                while((read_byte(V54A_OFFSET) & V54A_BIT)!=0)
                {
                }
```

```
80       set_dtr(OFF);
81
82       or_byte(L3ACT_OFFSET, L3ACT_BIT);
83
84       /** only turn off CEQ if not V.32/bis, Bug 129.2 **/
85       if((tmp_byte & V32_MASK) != V32_CODES)
86       and_byte(CEQ_OFFSET, CEQ_MASK);
87
88       /* Set receiver threshold to  -43 dBm (clear rth bits) */
89       and_byte(RXLEVEL_OFFSET, RXLEVEL_MASK);
90
91       module_configure(tmp_byte);
92
93       set_dtr(ON);
94       set_rts(ON);
95
96       /* Wait for Rockwell card */
97
98       while
99        (
100       ((read_byte(DCD_OFFSET) & DCD_BIT)==0)
101       || ((read_byte(CTS_OFFSET) & CTS_BIT)==0)
102       || ((read_byte(DSR_OFFSET) & DSR_BIT)==0)
103        )
104        {
105         /* Keep watchdog going */
106         modem_watchdog();
107        }
108
109       modem_status=CONNECTED;
110       modem_state=CON1;
111       modemeia_cntrlblk.timer_dcd=1;
112       mode_code=read_byte(CONFIG_OFFSET);
113   #endif
114   }
115
116
117
118   /*************************************
119    *
120    *   ISSUE A RETRAIN REQUEST
121    *
122    *************************************/
123
124   void issue_rtrn()
125   {
126   #ifndef MIKADO
127       /* Clear retrain detect bit */
128       and_byte(RTDET_OFFSET, RTDET_MASK);
129
130       if( (mode_code & 0xf0)== 0x70 )          /* only for V.32   */
131       {
132         switch(rtrn_mode)
133         {
134           case FALLBACK:
135             switch(mode_code)
136             {
137                case V32_144K_CODE:
138                    write_byte(CONFIG_OFFSET, V32_12K_CODE);
139                    break;
140
141                case V32_9600_NO_TCM_CODE:
142                case V32_9600_CODE:
143
144                    if(remote_is_v32bis)
145                        write_byte(CONFIG_OFFSET, V32_7200_CODE);
146                    else
147                        write_byte(CONFIG_OFFSET, V32_4800_CODE);
148                    break;
149
150                case V32_12K_CODE:
151                    write_byte(CONFIG_OFFSET, V32_9600_CODE);
152                    break;
153
154                case V32_7200_CODE:
155                    write_byte(CONFIG_OFFSET, V32_4800_CODE);
156                    break;
157             }
158             break;
```

```
                        Async
            /* Restore . me to Sync converter */
315         or_byte(ASYNC_OFFSET, tmp_byte);
316
317         modem_digital_loopback(ON);
318         modem_status = REMOTE_TEST;
319         return;
320       }
321       else
322       {
323         /* Termination detected                           */
324         /* Restore prep detector                          */
325         and_byte(V54AE_OFFSET, V54AE_MASK);
326         and_byte(V54TE_OFFSET, V54TE_MASK);
327         and_byte(V54DT_OFFSET, V54DT_MASK);
328         or_byte(V54PE_OFFSET, tmp_v54pe_byte);
329
330         modem_digital_loopback(OFF);
331         modem_status = CONNECTED;
332         return;
333       }
334     }
335   }
336
337 #endif
338 }
339
340 /*****************************************************
341  *
342  *    SAMPLE QUALITY
343  *
344  *    Return the rockwell module signal quality word
345  *
346  *****************************************************/
347
348 uword sample_quality()
349 {
350 #ifndef MIKADO
351 /*     return(0x0000);*****************************DEBUG */
352     read_dsp_ram(EQM_METHOD, EQM_ADDR);
353     return(read_byte(MSB_OFFSET) * 0x100 + read_byte(LSB_OFFSET));
354 #endif
355 }
356
357 /*****************************************************
358  *
359  *    sample AGC gain word
360  *
361  *    Return the rockwell module AGC gain word
362  *
363  *****************************************************/
364
365 uword sample_agc_gain()
366 {
367 #ifndef MIKADO
368 /*     return(0x0000); /*************************DEBUG */
369     read_dsp_ram( AGC_GAIN_METHOD, AGC_GAIN_ADDR);
370     return(read_byte(MSB_OFFSET) * 0x100 + read_byte(LSB_OFFSET));
371 #endif
372 }
373
374
375 /*****************************************************/
376 /*                                                    */
377 /*    Setup the EQM test levels for the EQM monitor. */
378 /*    These values are different for some modes.     */
379 /*    Also setup the settle timer for EQM            */
380 /*                                                    */
381 /*****************************************************/
382 void set_eqm_test_levels(unsigned char mode)
383 {
384 #ifndef MIKADO
385     /*   At beginning of call do initial fall forward wait   */
386     if (eqm_fall_timer == BYTE_FOX)
387        eqm_fall_timer = get_sectimer();
388     if(remote_is_v32bis)
389        set_timer(eqm_fall_timer, 5);  /*don't try rate change for 5 sec.*/
390     else
391
```

```
392        set_timer(eqm_sal_imer, 30);  /*don't try rate change fc  /2 min.*/
393
394     /*    Initialize agc_span_timer                                         */
395     if (agc_span_timer != BYTE_FOX)
396        release_timer(agc_span_timer);
397
398     agc_span_timer = get_mstimer();
399     set_timer(agc_span_timer, 2000);      /*     wait 2 seconds */
400
401     /*    reestablish AGC values also                                        */
402     agc_reference = eqm_avg = agc_avg = agc_trouble = 0;
403     fforward_threshold_count = 0;
404     working_threshold_count = 0;
405     hangup_threshold_count = 0;
406
407     if (eqm_settle_timer == BYTE_FOX)
408        eqm_settle_timer = get_mstimer();
409
410     if((mode & V32_MASK) == V32_CODES)
411        set_timer(eqm_settle_timer, EQM_SETTLE_FOR_2400_BAUD);
412     else
413        set_timer(eqm_settle_timer, EQM_SETTLE_FOR_600_BAUD);
414
415     if (!modem_cntrlblk.originate)
416        working_threshold_register = 0x01;
417     else
418        working_threshold_register = 0x00;
419
420     switch(mode)
421     {
422     case V32_144K_CODE:
423        working_threshold_register += qual_thrshld_14400;
424        working_forward_threshold = qual_forward_threshold_v32bis;
425        break;
426
427     case V32_12K_CODE:
428        working_threshold_register += qual_thrshld_12000;
429        working_forward_threshold = qual_forward_threshold_v32bis;
430        break;
431
432     case V32_9600_CODE:
433        working_threshold_register += qual_thrshld_9600;
434        if(remote_is_v32bis)
435           working_forward_threshold = qual_forward_threshold_v32bis;
436        else
437           working_forward_threshold = QUAL_FORWARD_THRESHOLD_NOFF;
438        break;
439
440     case V32_7200_CODE:
441        working_threshold_register += qual_thrshld_7200;
442        working_forward_threshold = qual_forward_threshold_v32bis;
443        break;
444
445     case V32_4800_CODE:
446        working_threshold_register += QUAL_THRSHLD_4800;
447        if(remote_is_v32bis)
448           working_forward_threshold = qual_forward_threshold_v32bis;
449        else
450           working_forward_threshold = qual_forward_threshold_v32;
451        break;
452
453     case V22BIS_CODE:
454        working_threshold_register = qual_thrshld_v22bis;
455        working_forward_threshold = QUAL_FORWARD_THRESHOLD_NOFF;
456        break;
457
458     case V22BIS_1200_CODE:
459        working_forward_threshold = qual_forward_threshold_v22bis;
460        working_threshold_register = QUAL_THRSHLD_NO_RETRAIN;
461        break;
462
463     case V22_CODE:
464     case BELL_212_CODE:
465     default:
466        working_threshold_register = QUAL_THRSHLD_NO_RETRAIN;
467        working_forward_threshold = QUAL_FORWARD_THRESHOLD_NOFF;
468        break;
469     }
470
```

```
#endif
}

/*****************************************
 *
 *    CHECK DSR
 *
 *    Check the modem eia lines and update
 *    the bits in the controlblock.
 *
 *****************************************/ void check_dsr()
{
ifndef MIKADO
    if((read_byte(DSR_OFFSET) & DSR_BIT) !=0)
    modemeia_cntrlblk.dsr=1;
    else
        modemeia_cntrlblk.dsr=0;
#endif
}

/*****************************************
 *
 *    CHECK DCD
 *
 *    Check the modem eia lines and update
 *    the bits in the controlblock.
 *
 *****************************************/ void check_dcd()
{
    if (isSetDCD())
        modemeia_cntrlblk.dcd = 1;
    else
        modemeia_cntrlblk.dcd = 0;
}

/*****************************************
 *
 *    CHECK CTS
 *
 *    Check the modem eia lines and update
 *    the bits in the controlblock.
 *
 *****************************************/ void check_cts()
{
ifndef MIKADO
    if((read_byte(CTS_OFFSET) & CTS_BIT) !=0)
        modemeia_cntrlblk.cts=1;
    else
        modemeia_cntrlblk.cts=0;
#endif
}

/*****************************************
 *
 *    CHECK SCRAMBLED ONES DETECTOR BIT
 *
 *    Return the state of the scrambled ones detector
 *
 *****************************************/ ubyte check_scrm1s_det()
{
ifndef MIKADO if((read_byte(SCRM1S_OFFSET) & SCRM1S_BIT)!=0)
    return(ON);
    else
    return(OFF);
#endif
}

/*****************************************
 *
```

```
*       CHECK S1 DETECTOR
*
*       Returns the state of the s1 bit
*
**************************************/ ubyte check_s1_det()
{
ifndef MIKADO
    if((read_byte(S1_OFFSET) & S1_BIT)!=0)
      return(ON);
    else
        return(OFF);
#endif
}
/**************************************
*
*       CHECK HKAB
*
*       Returns the state of the HKAB bit
*
**************************************/ ubyte check_hkab()
{
ifndef MIKADO
    if((read_byte(HKAB_OFFSET) & HKAB_BIT)!=0)
      return(ON);
    else
        return(OFF);
#endif
}
/**************************************
*
*       CHECK UNSCRAMBLED ONES DETECTOR BIT
*
*       Return the state of the scrambled ones detector
*
**************************************/ ubyte check_usb1_det()
{
ifndef MIKADO
    if((read_byte(USB1_OFFSET) & USB1_BIT)!=0)
        return(ON);
    else
        return(OFF);
#endif
}

/**************************************
*
*       CHECK BELL 103 DETECT
*
*       Return the state of the scrambled ones detector
*
**************************************/

/*      ubyte check_103_det()
        */
/*      {
                                */
/*              if((read_byte(BELL_103_OFFSET) & BELL_103_BIT)!=0)       */
/*                      return(ON);
                        */
/*              else
                */
/*                      return(OFF);
        */
/*      }
                        */

/**************************************
*
*       CHECK V21 TONE
*
*       Return the state of the V21 tone detector
*
**************************************/
```

```
ubyte check_V21_tone()
{
ifndef MIKADO
    if((read_byte(V21_TONE_OFFSET) & V21_TONE_BIT)!=0)
        return(ON);
    else
        return(OFF);
#endif
}

/************************************
*
*    GET AA DETECT
*
*    Return the state of the module
*    aa sequence detect bit (not for
*        use during handshake!).
*
************************************/ ubyte get_aa_det()
{
ifndef MIKADO
    if((read_byte(AA_SEQ_OFFSET) & AA_SEQ_BIT)!=0)
        return(ON);
    else
        return(OFF);
#endif
}

/************************************
*
*    GET CC DETECT
*
*    Return the state of the module
*    cc sequence detect bit
*
************************************/ ubyte get_cc_det()
{
ifndef MIKADO
    if((read_byte(CC_SEQ_OFFSET) & CC_SEQ_BIT)!=0)
        return(ON);
    else
        return(OFF);
#endif
}

/************************************
*
*    GET AA SEQUENCE
*
*    Return the state of the module 1800hz
*    aa sequence detector
*
************************************/ ubyte get_aa_sequence()
{
ifndef MIKADO
    if((read_byte(TONE_B_OFFSET) & TONE_B_BIT)!=0)
        return(ON);
    else
        return(OFF);
#endif
}

/************************************
*
*    GET TONE B
*
*    Return the state of the module
*    tone B detector
*
************************************/ ubyte get_tone_b()
```

```
702     {
703     #ifndef MIKADO
704         if((read_byte(TONE_B_OFFSET) & TONE_B_BIT)!=0)
705            return(ON);
706        else
707        return(OFF);
708     #endif
709     }
710
711     /***************************************
712      *
713      *    GET V32 AC SEQUENCE DETECTOR BIT
714      *
715      ***************************************/
716
717     ubyte get_ac_seq()
718     {
719     #ifndef MIKADO
720         if((read_byte(AC_DET_OFFSET) & AC_DET_BIT) !=0)
721            return(ON);
722        else
723            return(OFF);
724     #endif
725     }
726
727     /***************************************
728      *
729      *    GET V32 CA SEQUENCE DETECTOR BIT
730      *
731      ***************************************/
732
733     ubyte get_ca_seq()
734     {
735     #ifndef MIKADO
736         if((read_byte(CA_DET_OFFSET) & CA_DET_BIT) !=0)
737          return(ON);
738        else
739            return(OFF);
740     #endif
741     }
742
743     /***************************************
744      *
745      *    GET RATE SEQUENCE DETECTOR BIT
746      *
747      ***************************************/
748
749     ubyte get_rseq()
750     {
751     #ifndef MIKADO
752
753         if((read_byte(RSEQ_OFFSET) & RSEQ_BIT) !=0)
754        return(ON);
755        else
756            return(OFF);
757     #endif
758     }
759
760     /***************************************
761      *
762      *    CLEAR RATE SEQUENCE DETECTOR BIT
763      *
764      ***************************************/
765
766     void clear_rseq()
767     {
768     #ifndef MIKADO
769        and_byte(RSEQ_OFFSET,RSEQ_MASK);
770        return;
771     #endif
772     }
773
774     /***************************************
775      *
776      *    GET S SEQUENCE DETECTOR BIT
777      *
778      ***************************************/
779
780     ubyte get_sdet()
```

```
781     {
782     #ifndef MIKADO
783
784         if((read_byte(SDET_OFFSET) & SDET_BIT) !=0)
785         return(ON);
786         else
787             return(OFF);
788     #endif
789     }
790
791     /*****************************************
792      *
793      *      SET TONE B TO DETECT USB1, TONE C
794      *
795      *      TO DETECT BELL TONE
796      *
797      *****************************************/
798
799     void tone_b_usb1_bell()
800     {
801     #ifndef MIKADO
802         /** set tone B up for 2250 Hz (UBS1)   **/
803         write_dsp_ram(3, 0xAA7, 0x0119);    /*    1,0x2d,0x0,1,0x19,0x01);     old    */
804         write_dsp_ram(3, 0xAA8, 0xFE72);    /*    1,0x2e,0x0,1,0x72,0xfe);     old    */
805         write_dsp_ram(3, 0xAA9, 0x0130);    /*    1,0x2f,0x0,1,0x30,0x01);     old    */
806         write_dsp_ram(3, 0xAAA, 0xC063);    /*    1,0x30,0x0,1,0x63,0xc0);     old    */
807         write_dsp_ram(3, 0xAAB, 0x0C82);    /*    1,0x31,0x0,1,0x82,0x0c);     old    */
808         write_dsp_ram(3, 0xBA7, 0x02D9);    /*    1,0xad,0x0,1,0xd9,0x02);     old    */
809         write_dsp_ram(3, 0xBA8, 0xFEE3);    /*    1,0xae,0x0,1,0xe3,0xfe);     old    */
810         write_dsp_ram(3, 0xBA9, 0x02D9);    /*    1,0xaf,0x0,1,0xd9,0x02);     old    */
811         write_dsp_ram(3, 0xBAA, 0xC063);    /*    1,0xb0,0x0,1,0x63,0xc0);     old    */
812         write_dsp_ram(3, 0xBAB, 0x0C82);    /*    1,0xb1,0x0,1,0x82,0x0c);     old    */
813
814         /** set tone C up for 2225 Hz Bell tone **/
815         write_dsp_ram(3, 0xAAD, 0x0119);    /*    1,0x33,0x0,1,0x19,0x01);     old    */
816         write_dsp_ram(3, 0xAAE, 0xFE72);    /*    1,0x34,0x0,1,0x72,0xfe);     old    */
817         write_dsp_ram(3, 0xAAF, 0x0130);    /*    1,0x35,0x0,1,0x30,0x01);     old    */
818         write_dsp_ram(3, 0xAB0, 0xC063);    /*    1,0x36,0x0,1,0x63,0xc0);     old    */
819         write_dsp_ram(3, 0xAB1, 0x0E96);    /*    1,0x37,0x0,1,0x96,0x0e);     old    */
820
821         write_dsp_ram(3, 0xBAD, 0x02D9);    /*    1,0xb3,0x0,1,0xd9,0x02);     old    */
822         write_dsp_ram(3, 0xBAE, 0xFEE3);    /*    1,0xb4,0x0,1,0xe3,0xfe);     old    */
823         write_dsp_ram(3, 0xBAF, 0x02D9);    /*    1,0xb5,0x0,1,0xd9,0x02);     old    */
824         write_dsp_ram(3, 0xBB0, 0xC063);    /*    1,0xb6,0x0,1,0x63,0xc0);     old    */
825         write_dsp_ram(3, 0xBB1, 0x0E96);    /*    1,0xb7,0x0,1,0x96,0x0e);     old    */
826
827         /** set prefilter up for unity gain **/
828         write_dsp_ram(3, 0xAB2, 0x0000);    /*    1,0x38,0x0,1,0x00,0x00);     old    */
829         write_dsp_ram(3, 0xAB3, 0x0000);    /*    1,0x39,0x0,1,0x00,0x00);     old    */
830         write_dsp_ram(3, 0xAB4, 0x4000);    /*    1,0x3a,0x0,1,0x00,0x40);     old    */
831         write_dsp_ram(3, 0xAB5, 0x0000);    /*    1,0x3b,0x0,1,0x00,0x00);     old    */
832         write_dsp_ram(3, 0xAB6, 0x0000);    /*    1,0x3c,0x0,1,0x00,0x00);     old    */
833         write_dsp_ram(3, 0xBB2, 0x0000);    /*    1,0xb8,0x0,1,0x00,0x00);     old    */
834         write_dsp_ram(3, 0xBB3, 0x0000);    /*    1,0xb9,0x0,1,0x00,0x00);     old    */
835         write_dsp_ram(3, 0xBB4, 0x4000);    /*    1,0xba,0x0,1,0x00,0x40);     old    */
836         write_dsp_ram(3, 0xBB5, 0x0000);    /*    1,0xbb,0x0,1,0x00,0x00);     old    */
837         write_dsp_ram(3, 0xBB6, 0x0000);    /*    1,0xbc,0x0,1,0x00,0x00);     old    */
838
839         /** disable Tone C squarer **/
840         or_byte(SQDIS_OFFSET, SQDIS_BIT);
841
842         return;
843     #endif
844     }
845
846     /*****************************************
847      *
848      *      SET TONE B TO DETECT 3000 HZ
849      *
850      *      (MAKE SURE AC DETECTOR DIDN'T
851      *
852      *      FALSE ON A BUSY SIGNAL
853      *
854      *****************************************/
855
856     /** set poles at 3 KHz, zeroes at 2100 Hz, Q = 300 **/
857
858     void tone_b_3000_hz()
859     {
```

```
860   #ifndef MIKADO
861       write_dsp_ram(3, 0xAA7, 0x0159);        /*     1,0x2d,0x0,1,0x59,0x01);       old    */
862       write_dsp_ram(3, 0xAA8, 0xFF7A);        /*     1,0x2e,0x0,1,0x7a,0xff);       old    */
863       write_dsp_ram(3, 0xAA9, 0x0159);        /*     1,0x2f,0x0,1,0x59,0x01);       old    */
864       write_dsp_ram(3, 0xAAA, 0xC0C4);        /*     1,0x30,0x0,1,0xc4,0xc0);       old    */
865       write_dsp_ram(3, 0xAAB, 0xCF50);        /*     1,0x31,0x0,1,0x50,0xcf);       old    */
866
867       write_dsp_ram(3, 0xBA7, 0x0159);        /*     1,0xad,0x0,1,0x59,0x01);       old    */
868       write_dsp_ram(3, 0xBA8, 0xFF7A);        /*     1,0xae,0x0,1,0x7a,0xff);       old    */
869       write_dsp_ram(3, 0xBA9, 0x0159);        /*     1,0xaf,0x0,1,0x59,0x01);       old    */
870       write_dsp_ram(3, 0xBAA, 0xC0C4);        /*     1,0xb0,0x0,1,0xc4,0xc0);       old    */
871       write_dsp_ram(3, 0xBAB, 0xCF50);        /*     1,0xb1,0x0,1,0x50,0xcf);       old    */
872
873       return;
874   #endif
875   }
876
877   /********************************
878    *
879    *    SET TONE B TO DETECT 1800 HZ
880    *
881    *    TO DETECT AA SIGNAL
882    *
883    ********************************/
884
885   void tone_b_1800_hz()
886   {
887   #ifndef MIKADO
888       write_dsp_ram(3, 0xAA7, 0x0372);        /*     1,0x2d,0x0,1,0x72,0x03);       old    */
889       write_dsp_ram(3, 0xAA8, 0xFEA6);        /*     1,0x2e,0x0,1,0xa6,0xfe);       old    */
890       write_dsp_ram(3, 0xAA9, 0x0372);        /*     1,0x2f,0x0,1,0x72,0x03);       old    */
891       write_dsp_ram(3, 0xAAA, 0xC063);        /*     1,0x30,0x0,1,0x63,0xc0);       old    */
892       write_dsp_ram(3, 0xAAB, 0x30D6);        /*     1,0x31,0x0,1,0xd6,0x30);       old    */
893
894       write_dsp_ram(3, 0xBA7, 0x00C4);        /*     1,0xad,0x0,1,0xc4,0x00);       old    */
895       write_dsp_ram(3, 0xBA8, 0xFFDA);        /*     1,0xae,0x0,1,0xda,0xff);       old    */
896       write_dsp_ram(3, 0xBA9, 0x00C4);        /*     1,0xaf,0x0,1,0xc4,0x00);       old    */
897       write_dsp_ram(3, 0xBAA, 0xC063);        /*     1,0xb0,0x0,1,0x63,0xc0);       old    */
898       write_dsp_ram(3, 0xBAB, 0x30D6);        /*     1,0xb1,0x0,1,0xd6,0x30);       old    */
899
900       return;
901   #endif
902   }
903
904   /********************************
905    *
906    *    SET TONE A TO DETECT 1270 HZ
907    *
908    *    TO DETECT 103 ORIG. MARK
909    *
910    ********************************/
911
912   void tone_a_1270_hz()
913   {
914   #ifndef MIKADO
915       write_dsp_ram(3, 0xAA1, 0x0123);        /*     1,0x27,0x0,1,0x23,0x01);       old    */
916       write_dsp_ram(3, 0xAA2, 0xFDBA);        /*     1,0x28,0x0,1,0xba,0xfd);       old    */
917       write_dsp_ram(3, 0xAA3, 0x0123);        /*     1,0x29,0x0,1,0x23,0x01);       old    */
918       write_dsp_ram(3, 0xAA4, 0xC147);        /*     1,0x2a,0x0,1,0x47,0xc1);       old    */
919       write_dsp_ram(3, 0xAA5, 0x55B6);        /*     1,0x2b,0x0,1,0xb6,0x55);       old    */
920
921       write_dsp_ram(3, 0xBA1, 0x0123);        /*     1,0xa7,0x0,1,0x23,0x01);       old    */
922       write_dsp_ram(3, 0xBA2, 0x00DF);        /*     1,0xa8,0x0,1,0xdf,0x00);       old    */
923       write_dsp_ram(3, 0xBA3, 0x0123);        /*     1,0xa9,0x0,1,0x23,0x01);       old    */
924       write_dsp_ram(3, 0xBA4, 0xC147);        /*     1,0xaa,0x0,1,0x47,0xc1);       old    */
925       write_dsp_ram(3, 0xBA5, 0x5596);        /*     1,0xab,0x0,1,0x96,0x55);       old    */
926
927       return;
928   #endif
929   }
930
931
932   /********************************
933    *
934    *    SET TONE A TO DETECT 1650 HZ
935    *
936    *    TO DETECT V21 ANS. MARK
937    *
938    ********************************/
```

INTEL CONFIDENTIAL

```
void tone_a_1650_hz()
{
ifndef MIKADO
    write_dsp_ram(3, 0xAA1, 0x0284);
    write_dsp_ram(3, 0xAA2, 0xfaef);
    write_dsp_ram(3, 0xAA3, 0x028c);
    write_dsp_ram(3, 0xAA4, 0xc3c9);
    write_dsp_ram(3, 0xAA5, 0x39cf);

write_dsp_ram(3, 0xBA1, 0x0284);
    write_dsp_ram(3, 0xBA2, 0x01f0);
    write_dsp_ram(3, 0xBA3, 0x028c);
    write_dsp_ram(3, 0xBA4, 0xc3c9);
    write_dsp_ram(3, 0xBA5, 0x39cf);

return;
endif
}

/*****************************************
 *
 *     SET TONE A TO DETECT CALL PROGRESS
 *
 *     TONES: RESET TO POWERUP DEFAULT (245-650 Hz)
 *
 *****************************************/ void tone_a_call_progress()
{
ifndef MIKADO
    write_dsp_ram(3, 0xAA1, 0xF8EA);    /*   1,0x27,0x0,1,0xea,0xf8);      old   */
    write_dsp_ram(3, 0xAA2, 0x0000);    /*   1,0x28,0x0,1,0x00,0x00);      old   */
    write_dsp_ram(3, 0xAA3, 0x0716);    /*   1,0x29,0x0,1,0x16,0x07);      old   */
    write_dsp_ram(3, 0xAA4, 0xC63E);    /*   1,0x2a,0x0,1,0x3e,0xc6);      old   */
    write_dsp_ram(3, 0xAA5, 0x6FE1);    /*   1,0x2b,0x0,1,0xe1,0x6f);      old   */ write_dsp_ram(3, 0xBA1, 0x0716);    /*   1,0xa7,0x0,1,0x16,0x07);      old   */
    write_dsp_ram(3, 0xBA2, 0xF5FB);    /*   1,0xa8,0x0,1,0xfb,0xf5);      old   */
    write_dsp_ram(3, 0xBA3, 0x0716);    /*   1,0xa9,0x0,1,0x16,0x07);      old   */
    write_dsp_ram(3, 0xBA4, 0xC774);    /*   1,0xaa,0x0,1,0x74,0xc7);      old   */
    write_dsp_ram(3, 0xBA5, 0x7601);    /*   1,0xab,0x0,1,0x01,0x76);      old   */ return;
endif
}
/*****************************************
 *
 *     SET TONE A TO DETECT 2250 HZ
 *
 *     TO DETECT V.22bis USB1
 *
 *****************************************/ void tone_a_usb1()
{
ifndef MIKADO
    /** set tone A up for 2250 Hz (USB1)   **/
    write_dsp_ram(3, 0xAA1, 0x0119);    /*   1,0x27,0x0,1,0x19,0x01);      old   */
    write_dsp_ram(3, 0xAA2, 0xFE72);    /*   1,0x28,0x0,1,0x72,0xfe);      old   */
    write_dsp_ram(3, 0xAA3, 0x0130);    /*   1,0x29,0x0,1,0x30,0x01);      old   */
    write_dsp_ram(3, 0xAA4, 0xC063);    /*   1,0x2a,0x0,1,0x63,0xc0);      old   */
    write_dsp_ram(3, 0xAA5, 0x0C82);    /*   1,0x2b,0x0,1,0x82,0x0c);      old   */ write_dsp_ram(3, 0xBA1, 0x02D9);    /*   1,0xa7,0x0,1,0xd9,0x02);      old   */
    write_dsp_ram(3, 0xBA2, 0xFEE3);    /*   1,0xa8,0x0,1,0xe3,0xfa);      old   */
    write_dsp_ram(3, 0xBA3, 0x02D9);    /*   1,0xa9,0x0,1,0xd9,0x02);      old   */
    write_dsp_ram(3, 0xBA4, 0xC063);    /*   1,0xaa,0x0,1,0x63,0xc0);      old   */
    write_dsp_ram(3, 0xBA5, 0x0C82);    -/*  1,0xab,0x0,1,0x82,0x0c);      old   */ return;
endif
}
/*****************************************
 *
 *     SET TONE B TO DETECT 1270 HZ
 *
 *     TO DETECT 103 ORIG. MARK
 *
```

```
void tone_b_1270_hz()
{
ifndef MIKADO
    write_dsp_ram(3, 0xAA7, 0x0123);    /*    1,0x2d,0x0,1,0x23,0x01);    old    */
    write_dsp_ram(3, 0xAA8, 0xFDBA);    /*    1,0x2e,0x0,1,0xba,0xfd);    old    */
    write_dsp_ram(3, 0xAA9, 0x0123);    /*    1,0x2f,0x0,1,0x23,0x01);    old    */
    write_dsp_ram(3, 0xAAA, 0xC147);    /*    1,0x30,0x0,1,0x47,0xc1);    old    */
    write_dsp_ram(3, 0xAAB, 0x55B6);    /*    1,0x31,0x0,1,0xb6,0x55);    old    */ write_dsp_ram(3, 0xBA7, 0x0123);    /*    1,0xad,0x0,1,0x23,0x01);    old    */
    write_dsp_ram(3, 0xBA8, 0x00DF);    /*    1,0xae,0x0,1,0xdf,0x00);    old    */
    write_dsp_ram(3, 0xBA9, 0x0123);    /*    1,0xaf,0x0,1,0x23,0x01);    old    */
    write_dsp_ram(3, 0xBAA, 0xC147);    /*    1,0xb0,0x0,1,0x47,0xc1);    old    */
    write_dsp_ram(3, 0xBAB, 0x5596);    /*    1,0xb1,0x0,1,0x96,0x55);    old    */ return;
endif
}

/***************************************/
/*                                     */
/*    CONFIGURE TO ORIGINATE           */
/*                                     */
/*    Set the originate bit            */
/*                                     */
/***************************************/ void configure_to_originate()
{
ifndef MIKADO
    /*BAO*/
    /* Do it strictly according to Rockwell          */                                    */
    /*                                               */
    /* reset data2, set org, reset data(n),          */
    /* set newc's                                    */

/*    Restore default RLSD levels even though they get restored by NEWC    */
    /*    write_dsp_ram(RING_THRESH_METHOD, RING_THRESH_ON_ADDR, V32_THRESH_ON);    */
    /*    write_dsp_ram(RING_THRESH_METHOD, RING_THRESH_OFF_ADDR, V32_THRESH_OFF);                */

/*    This will need to change for Fred, DMA uses RI pin    */
    and_byte(RION_OFFSET, RION_MASK);    /* Ring Detector Says OFF    */
    or_byte(RIEN_OFFSET, RIEN_BIT);      /* Show RION at RI pin       */ and_byte(DATA_OFFSET, DATA_MASK);    /* data0 off    */ or_byte(ORG_OFFSET, ORG_BIT);        /* org on       */ and_byte(RXLEVEL_OFFSET, RXLEVEL_MASK); /*    Set RTH to -43 dBm    */ set_newc();

/* Set up Tone detector B for 2250 Hz USB1 Tone, or 2225 Bell tone */ tone_b_usb1_bell();

or_byte(TDAE_OFFSET, TDAE_BIT);    /* enable tone detectors    */

/* Now set tone detector thresholds    */
    set_thresh();

return ;
#endif
}

/***************************************
*
*    CONFIGURE TO ANSWER
*
*    Clear the originate bit
*
***************************************/ void configure_to_answer()
{
ifndef MIKADO
    /*    Restore default RLSD levels    */
```

```
1097      /*      write_dsp_r    RNG_THRESH_METHOD, RING_THRESH_ON,ADD   V32_THRESH_ON);           */
1098      /*      write_dsp_ram(RING_THRESH_METHOD, RING_THRESH_OFF,ADL  V32_THRESH_OFF);          */
1099
1100       /* Disable data mode */
1101       and_byte(DATA_OFFSET, DATA_MASK);
1102
1103       and_byte(ORG_OFFSET, ORG_MASK);
1104
1105       and_byte(RXLEVEL_OFFSET, RXLEVEL_MASK);
1106
1107       set_newc();
1108
1109       /* Set up Tone detector B to detect 1800Hz aa sequence - for threshold */
1110
1111       tone_b_1800_hz();
1112
1113       /** Set up tone A for 1270 Hz Bell 103 tone **/
1114
1115       tone_a_1270_hz();
1116
1117       or_byte(TDAE_OFFSET, TDAE_BIT);  /* enable detectors    */
1118
1119       /*      Disable Ring Detect
1120                                                                                                 */
           /*      Set RI output to OFF and disable Ring Indication
1121       and_byte(RION_OFFSET, RION_MASK);         /* Ring Detector Says OFF     */
1122       or_byte(RIEN_OFFSET, RIEN_BIT);           /* Show RION at RI pin        */
1123
1124       /* Now set detector thresholds */
1125       set_thresh();
1126  #endif
1127  }
1128
1129  /*******************************
1130   *
1131   *    MODULE INIT
1132   *
1133   *    Reprograms the rockwell module
1134   *    to power-up default states.
1135   *
1136   *******************************/
1137
1138  void module_init()
1139  {
1140  }
1141
1142  /*******************************
1143   *
1144   *    SET ANSWER TONE TRANSMISSION
1145   *    ON OR OFF
1146   *
1147   *******************************/
1148
1149  void set_anstone
1150  (
1151     ubyte state
1152  )
1153  {
1154  #ifndef MIKADO
1155      if(state==OFF)
1156         or_byte(NV25_OFFSET, NV25_BIT);
1157      else
1158         and_byte(NV25_OFFSET, NV25_MASK);
1159  #endif
1160  }
1161
1162
1163  /*******************************
1164   *
1165   *    CHECK RING
1166   *
1167   *    Returns on or off to reflect the ring indicator
1168   *
1169   *******************************/
1170
1171  ubyte check_ring()
1172  {
1173  #ifndef MIKADO
1174  #ifdef JAKE
```

INTEL CONFIDENTIAL

```
1175        extern ubyte check_r_   status(void);
1176   /*      changed for Jake /*checks for ring status on 186 instead .. datapump */
1177        if (check_ring_status() != 0)
1178          {
1179           return(ON);
1180          }
1181        return(OFF);
1182   #else
1183        if((read_byte(RING_OFFSET) & RING_BIT)!=0)
1184          return(ON);
1185        else
1186          return(OFF);
1187   #endif
1188   #endif
1189   }
1190
1191   #ifdef JAKE
1192   /*****************************************/
1193   /*
1194   /*    CALL CHECK ENERGY
1195   /*
1196   /*
1197   /*
1198   /*****************************************/
1199
1200   _far call_check_energy()
1201   {
1202      if(check_energy() != 0)
1203        {
1204         return(ON);
1205        }
1206      return(OFF);
1207   }
1208   #endif
1209
1210   /*************************************
1211    *
1212    *    CHECK ENERGY
1213    *
1214    *    Returns the status of the tone A bit (call progress tones)
1215    *
1216    *************************************/
1217
1218   ubyte check_energy()
1219   {
1220   #ifdef MIKADO_HELPME_SPOCK
1221   helm....what to do...
1222
1223   this is sampling the RC144DP TONEA interface memory location that
1224   indicates that tenergy is present on the line within the tone
1225   detector for A passband, and above its threshold.  The bandpass filter
1226   coefficients are host programmable in DSP RAM.
1227   #endif
1228
1229   #ifndef MIKADO
1230        if((read_byte(TONE_A_OFFSET) & TONE_A_BIT)!=0)
1231      return(ON);
1232      else
1233      return(OFF);
1234   #endif
1235   }
1236
1237   /*********************************************
1238    *
1239    *    CHECK TONE A
1240    *
1241    *    Returns the status of the tone A bit
1242    *
1243    *********************************************/
1244
1245   ubyte check_tone_a()
1246   {
1247   #ifndef MIKADO
1248        if((read_byte(TONE_A_OFFSET) & TONE_A_BIT)!=0)
1249      return(ON);
1250      else
1251      return(OFF);
1252   #endif
1253   }
```

```
/***********************************
 *
 *    SET DTR
 *
 *    Turn Data Terminal Ready status ON or OFF
 *
 ***********************************/ void set_dtr(ubyte state)
{
ifndef MIKADO
    if (state==ON)
        or_byte(DTR_OFFSET, DTR_BIT);
    else
        and_byte(DTR_OFFSET, DTR_MASK);
#endif
}

/***********************************
 *
 *    SET RTS
 *
 *    Turn the module rts on or off
 *
 ***********************************/ void set_rts(ubyte state)
{
ifndef MIKADO
    if(state==ON)
        or_byte(RTS_OFFSET,RTS_BIT);
    else
        and_byte(RTS_OFFSET,RTS_MASK);
#endif
}

/***********************************
 *
 *    GET ANSWER TONE
 *        Revised 07/15/91 BAO
 *
 *    Returns bit-mapped byte for answer tones detected.
 *        D0 set if V.22 USB1 detected.
 *        D1 set if 2225 Hz Bell tone detected.
 *        D2 set if V.25 answer tone detected.
 *
 ***********************************/ ubyte get_answer_tone()
{
    ubyte tmp_byte;
ifndef MIKADO tmp_byte = 0;

if((read_byte(CCITT_ANSTONE_OFFSET) & CCITT_ANSTONE_BIT) !=0)
    tmp_byte |= 4;

if((read_byte(TONE_B_OFFSET) & TONE_B_BIT) !=0)
    tmp_byte |= 1;

if((read_byte(TONE_C_OFFSET) & TONE_C_BIT) !=0)
    tmp_byte |= 2;

return(tmp_byte);
#endif
}

/***********************************
 *
 *    DIAL DIGIT
 *
 *    Loads a dtmf digit
 *
 ***********************************/ void dial_digit
```

```
1333    (
1334        ubyte digit_to_dial
1335    )
1336    {
1337    #ifndef MIKADO
1338
1339    #define N697    4758
1340    #define N770    5256
1341    #define N852    5816
1342    #define N941    6424
1343
1344    #define N1209   8253
1345    #define N1336   9120
1346    #define N1477   10083
1347    #define N1633   11148
1348
1349    const uword TONE1_FREQ_TABLE[]=
1350    {N941,N697,N697,N697,N770,N770,N770,N852,
1351     N852,N852,N941,N941,N697,N770,N852,N941};
1352
1353    const uword TONE2_FREQ_TABLE[]=
1354    {N1336,N1209,N1336,N1477,N1209,N1336,N1477,N1209,
1355     N1336,N1477,N1209,N1477,N1633,N1633,N1633,N1633};
1356
1357
1358        write_dsp_ram(2, TONE1_FREQ_ADDR, TONE1_FREQ_TABLE[digit_to_dial]);
1359        write_dsp_ram(2, TONE2_FREQ_ADDR, TONE2_FREQ_TABLE[digit_to_dial]);
1360        set_rts(ON);
1361    #endif
1362    }
1363
1364    /************************************
1365     *
1366     *   SET DTMF PARAMS
1367     *
1368     *   Write the dtmf tone duration and interdigit
1369     *   delay to the module dsp ram.
1370     *
1371     ************************************/
1372
1373    void set_dtmf_params()
1374    {
1375    #ifndef MIKADO
1376        and_byte(TXLEVEL_OFFSET, TXLEVEL_MASK);   /* set power to -0.5 dBm */
1377        write_dsp_ram(2, TONE1_PWR_ADDR, TONE1_PWR_LVL);
1378        write_dsp_ram(2, TONE2_PWR_ADDR, TONE2_PWR_LVL);
1379
1380        return ;
1381    #endif
1382    }
1383
1384    /************************************
1385     *
1386     *   MODULE CONFIGURE
1387     *
1388     *   Loads the passed configuration into the module.
1389     *
1390     ************************************/
1391
1392    void module_configure
1393    (
1394        ubyte config
1395    )
1396    {
1397    #ifndef MIKADO
1398        write_byte(CONFIG_OFFSET, config);
1399        set_newcx();
1400        or_byte(DATA_OFFSET, DATA_BIT);
1401
1402    #ifdef JAKE
1403    // This is needed for Jake since fax/SLA can set rts off, and FRED
1404    // assumes RTS is always on.  RTS is set here in old Mustafa code.
1405
1406        set_rts(ON);
1407    #endif
1408    #endif
1409    }
1410
1411    /****************************************************
```

```
1412     *
1413     *       SET THRESHOLDS FOR TONE DETECTORS
1414     *
1415     **********************************************/
1416     void set_thresh()
1417     {
1418     #ifndef MIKADO
1419         /* Set up Tone detectors thresholds */
1420
1421         write_dsp_ram(COEFFICIENT_METHOD, 0xAB8, 0x029b);    /*   1,0x23,0x0,1,0x1d,0x00);
          */      /* threshu - A */
1422        write_dsp_ram(COEFFICIENT_METHOD, 0xBB8, 0x0142);    /*   1,0xa3,0x0,1,0x0e,0x00);
          */      /* threshl - A */
1423
1424        write_dsp_ram(COEFFICIENT_METHOD, 0xAA0, 0x0148);    /*   1,0x26,0x0,1,0x48,0x01);
          */      /*lp gain - A*/
1425        write_dsp_ram(COEFFICIENT_METHOD, 0xBA0, 0x7e67);    /*   1,0xa6,0x0,1,0x67,0x7e);
          */      /*lpfbk - A*/
1426
1427        write_dsp_ram(COEFFICIENT_METHOD, 0xAB9, 0x015c);    /*   1,0x24,0x0,1,0x1d,0x00);
          */      /* threshu - B */
1428        write_dsp_ram(COEFFICIENT_METHOD, 0xBB9, 0x00ae);    /*   1,0xa4,0x0,1,0x0e,0x00);
          */      /* threshl - B */
1429
1430        write_dsp_ram(COEFFICIENT_METHOD, 0xAA6, 0x0148);    /*   1,0x2c,0x0,1,0x48,0x01);
          */      /*lp gain - B*/
1431        write_dsp_ram(COEFFICIENT_METHOD, 0xBA6, 0x7a00);    /*   1,0xac,0x0,1,0x00,0x7a);
          */      /*lpfbk - B*/
1432
1433        write_dsp_ram(COEFFICIENT_METHOD, 0xABA, 0x015c);    /*   1,0x25,0x0,1,0x1d,0x00);
          */      /* threshu - C */
1434        write_dsp_ram(COEFFICIENT_METHOD, 0xBBA, 0x00ae);    /*   1,0xa5,0x0,1,0x0e,0x00);
          */      /* threshl - C */
1435
1436        write_dsp_ram(COEFFICIENT_METHOD, 0xAAC, 0x0148);    /*   1,0x32,0x0,1,0x48,0x01);
          */      /*lp gain - C*/
1437        write_dsp_ram(COEFFICIENT_METHOD, 0xBAC, 0x7a00);    /*   1,0xb2,0x0,1,0x00,0x7a);
          */      /*lpfbk - C*/
1438
1439        /* Disable AGC */                                                                    */
1440        /*      Not required for the RC144DP
1441        /*      write_dsp_ram();         **   1,0xbf,0x0,1,0x00,0x00);         */
1442        /*      write_dsp_ram();         **   1,0x23,0x0,0,0xff,0x07);         */
1443
1444        return;
1445     #endif
1446     }
1447
1448     /*************************************
1449     *
1450     *    SET SI DTE OUTPUT
1451     *
1452     *    Turns ON or OFF the SI Output
1453     *
1454     **************************************/
1455
1456     void set_si_dte(state)
1457     ubyte(state);
1458     {
1459     #ifndef MIKADO
1460     #ifndef JAKE
1461        if(state!=OFF)
1462          switch(state)
1463          {
1464
1465            case 6:
1466            out_byte(SI_DTE_PORT_ADDR, OFF);
1467              break;
1468
1469            case 7:
1470              out_byte(SI_DTE_PORT_ADDR, OFF);
1471            break;
1472
1473            case 8:
1474            case 9:
1475            case 10:
1476            case 11:
1477            out_byte(SI_DTE_PORT_ADDR, ON);
1478              break;
```

```
            }
         else
            out_byte(SI_DTE_PORT_ADDR, OFF);
#endif
#endif
}

/******************************************
 *
 *    SET DTE CTS
 *
 *    Turns ON or OFF dte CTS pin
 *
 ******************************************/
void set_dte_cts(ubyte state)
{
#ifdef TESTING
   if (state == ON)
      setCTS();
   else
      clearCTS();
#endif
}

/******************************************
 *
 *    SET DTE DSR
 *
 *    Turns ON or OFF dte dsr pin
 *
 ******************************************/
void set_dte_dsr(ubyte state)
{
   if (state == ON)
      GS_printf("MT1HWUTL.C:set_dte_dsr: ON\n");
   else
      GS_printf("MT1HWUTL.C:set_dte_dsr: OFF\n");

#ifdef TESTING
   if (state == ON)
      setDSR();
   else
      clearDSR();
#endif
}

/******************************************
 *
 *    SET DTE RLSD
 *
 *    Turns ON or OFF dte rlsd pin
 *
 ******************************************/ void set_dte_rlsd(ubyte state)
{
    ubyte temp;
ifndef MIKADO ifdef JAKE
   output_msr_bit(state,dte_rlsd_bit);
#else
   if(state!=OFF)
      out_byte(RLSD_DTE_PORT_ADDR, ON);
   else
      out_byte(RLSD_DTE_PORT_ADDR, OFF);
#endif
#endif
}

/******************************************
 *
 *    SET SPEAKER
 *
 *    Turns ON or OFF the speaker.
 *
 ******************************************/
```

```
1558   void set_speaker(ubyte newstate)
1559   {
1560       modem_cntrlblk.spk = newstate;
1561
1562       /*
1563        * Send a message to TAPI to alter the state of the speaker
1564        */
1565       mikado_message.msg = AT_SPEAKER;
1566       mikado_message.words[0] = newstate;   /* OFF = 0 = RESOURCE_DISABLE */
1567
1568       sendMessage(&mikado_message, HOST);
1569
1570   }  /* set_speaker */
1571
1572   /******************************************
1573    *
1574    *   SET VOLUME
1575    *
1576    *   Sets speaker volume to 1, 2, or 3.
1577    *   Initialized with volume 2 parameter.
1578    *
1579    ******************************************/
1580
1581   void set_volume(ubyte vol_level)
1582   {
1583       /*
1584        * Send a message to TAPI to alter the vol_level of the speaker
1585        */
1586       mikado_message.msg = AT_SPEAKER_VOL;
1587       mikado_message.words[0] = vol_level;
1588       sendMessage(&mikado_message, HOST);
1589   }
1590
1591   /******************************************
1592    *
1593    *   SET HOOK RELAY
1594    *
1595    *   Sets the offhook relay on or off.
1596    *   0=hang up.
1597    *
1598    ******************************************/
1599   void set_hook_relay(ubyte newstate)
1600   {
1601       modemeia_cntrlblk.offhook = newstate;
1602       /*
1603        * Send a message to TAPI to hang up the phone.
1604        */
1605       if (newstate == OFF)
1606           mikado_message.msg = AT_ONHOOK;
1607       else
1608       {
1609   #ifdef DEBUG
1610           GS_printf("\nMT1HWUTL.c:set_hook_relay:  I CAN't take phone offhook!\n");
1611   #endif
1612           return;
1613       }
1614
1615       if (!sendMessage(&mikado_message, HOST))
1616           GS_printf("MT1HWUTL.C:off_hook:  Error sending AT_ONHOOK to HOST\n");
1617
1618       if (newstate == OFF)
1619       {
1620           /*
1621            * Insure that the Data Pump is OFFLINE as well
1622            */
1623   #ifdef DEBUG
1624           GS_printf("\nMT1HWUTL.c:set_hook_relay:  Sending DP_MGR OFFLINE msg.\n");
1625   #endif
1626
1627           mikado_message.msg = AT_FLUSH;
1628           if (!sendMessage(&mikado_message, DATA_PUMP_MGR))
1629               GS_printf("MT1HWUTL.C:set_hook_relay: Error sending AT_FLUSH msg.\n");
1630
1631   #ifdef DEBUG
1632           GS_printf("\nMT1HWUTL.c:set_hook_relay:  Sending DP_MGR OFFLINE msg.\n");
1633   #endif
1634
1635           mikado_message.msg = AT_GO_ONLINE;
1636           mikado_message.words[0] = RESOURCE_DISABLE;
```

```
            mikado_message.xc   [1] = (unsigned) modem_daemon_stream;
            if (!sendMessage(&mikado_message, DATA_PUMP_MGR))
                GS_printf("MT1HWUTL.C:set_hook_relay: Error sending DP_MGR OFFLINE msg.\n");

/*
             *  Insure that the COMM_MGR exits DATA MODE.
             */
            #ifdef DEBUG
                GS_printf("\nMT1HWUTL.c:set_hook_relay:  Sending COMM_MGR OFFLINE msg.\n");
            #endif flushAllQs();
            mikado_message.msg = AT_DATA_MODE;
            mikado_message.words[0] = RESOURCE_DISABLE;
            if (!sendMessage(&mikado_message, COMM_MGR))
                GS_printf("MT1HWUTL.C:set_hook_relay: Error sending COMM_MGR DATA_MODE msg.\n");

modem_status = IDLE;
            modem_state = IDLE;
        }
    }

/*****************************************
     *
     *    TURN SYNC CLOCKS
     *
     *  enable/disable clock lines on
     *  '232 port
     *****************************************/ void turn_sync_clocks(ubyte state)
    {
    #ifndef MIKADO
    #ifndef JAKE
        if(state==ON)
            out_byte(DTE_CLK_EN_PORT_ADDR, ON);
        else
            out_byte(DTE_CLK_EN_PORT_ADDR, OFF);
    #endif
    #endif

}

/*****************************************
     *
     *    SET ECHO
     *
     *****************************************/
    void set_echo(ubyte new_state)
    { if (new_state == echo_state)
            return;

echo_state = new_state;

/*
         * Send a message to the COMM_MGR task to alter the state of ECHO
         */
        mikado_message.msg = AT_ECHO;

if (new_state == OFF)
            mikado_message.words[0] = RESOURCE_DISABLE;
        else
            mikado_message.words[0] = RESOURCE_ENABLE;

if (!sendMessage(&mikado_message, COMM_MGR))
            GS_printf("MT1HWUTL.C:set_echo:  failure sending MBOX message to COM_MGR\n");
    }  /* set_echo */

/*****************************************
     *
     *    SET LINE LEVELS
     *
     *    Set the transmit and receive power levels if
     *    leased line.
     *
     *****************************************/
```

```
void set_line_levels()
{
ifndef MIKADO
    and_byte(TXLEVEL_OFFSET, TXLEVEL_MASK);
    and_byte(RXLEVEL_OFFSET, RXLEVEL_MASK);

if(modem_cntrlblk.leased==0)
    {
        or_byte(TXLEVEL_OFFSET, DIAL_TXLEVEL_CODE);
        or_byte(RXLEVEL_OFFSET, DIAL_RXLEVEL_CODE);
    }
    else
    {
        or_byte(TXLEVEL_OFFSET, LEASED_TXLEVEL_CODE);
        or_byte(RXLEVEL_OFFSET, LEASED_RXLEVEL_CODE);
    }
#endif
}

/***************************************
 *
 *    SET_ARCS
 *
 *    Set the auto rate change bits to
 *    the passed state.
 *
 ***************************************/ void set_arcs(state)
ubyte state;
{
ifndef MIKADO
    if(state==OFF)
        and_byte(ARC_OFFSET, ARC_MASK);
    else
        or_byte(ARC_OFFSET, ARC_BIT);
#endif
}

/***************************************
 *
 *    SET_EARCS
 *
 *    Set the extended auto rate change bits to
 *    the passed state.
 *
 ***************************************/ void set_earcs(state)
ubyte state;
{
ifndef MIKADO
    if(state==OFF)
        and_byte(EARC_OFFSET, EARC_MASK);
    else
        or_byte(EARC_OFFSET, EARC_BIT);
#endif
}

/***************************************
 *
 *    SET_V32BS
 *
 *    Set the V.32bis enable bits to
 *    the passed state.
 *
 ***************************************/ void set_v32bs(ubyte state)
{
ifndef MIKADO
    if(state==OFF)
        and_byte(V32BS_OFFSET, V32BS_MASK);
    else
        or_byte(V32BS_OFFSET, V32BS_BIT);
#endif
}
```

```
/*******************. /************
 *
 *   SET_RESET_WATCHDOG
 *
 *   Set the auto rate change bits to
 *   the passed state.
 *
 *****************************************/ void set_reset_watchdog()
{
    /* Toggle watchdog timer output*/
#ifndef MIKADO
#ifndef JAKE
    out_byte(WATCHDOG_PORT_ADDR, ON);
    out_byte(WATCHDOG_PORT_ADDR, OFF);
#endif
#endif
}

/*****************************************
 *
 *   FIX BUG 39.8
 *
 *   Fixes the Async to sync converter problem
 *
 *****************************************/ void fix_bug_39_8()
{
    /*    Not needed for the RC144DP    */
    return;

/*    read_dsp_ram(0x0,0x00,0x016,0x2);    */

/* Data now in Y data MSB and LSB */

/* Now clear bit 5 of Y data MSB */
    /*    and_byte(MSB_OFFSET,0xdf);    */

/*    write_dsp_ram(0,0x00,0x016,2,    */
    /*    read_byte(LSB_OFFSET),    */
    /*    read_byte(MSB_OFFSET));    */

}

/*****************************************/
/*
 */
/*    Rockwell Bug #39.4 (6) fix code invocation    */
/*    setup thresholds by mode    */
/*
 */
/*    Uses:  mode to show the mode setup    */
/*
 */
/*****************************************/
void    fix_bug_39_4(mode)
unsigned char mode;
{
    /** NOT NEEDED FOR /14 or Fred **/
    return;
}

/*****************************************/
/*
/*  GET BULK DELAY
/*
/* RETURNS BULK DELAY (APPROX. EQUAL TO    */
/* PROP. DELAY) FOR V32 CONNECTION.    */
/* RETURNED VALUE IN MILLISECONDS    */
/*
/*****************************************/ uword get_bulk_delay()
{
ifndef MIKADO
    read_dsp_ram(BULK_DELAY_METHOD, BULK_DELAY_ADDR);
```

```
1871
1872            return((read_byte(MSB_OFFSET)*2560 +
1873                 read_byte(LSB_OFFSET)*10)/24); /** divide by 2.4 **/
1874        #endif
1875        }
1876
1877     /*****************************************************************/
1878     /*                                                               /
1879     /        GET_SNDET                                               /
1880     /                                                               /
1881     /        RETURNS STATE OF DATA PUMP SNDET BIT; WHICH GOES ACTIVE /
1882     /        WHEN S-bar SEQUENCE IS RECEIVED DURING V.32 OR V.32bis  /
1883     /        HANDSHAKE.                                             /
1884     /*****************************************************************/
1885
1886        ubyte get_sndet()
1887        {
1888        #ifndef MIKADO
1889            if(read_byte(SNDET_OFFSET)& SNDET_BIT)  /* check status of sndet bit */
1890                return(ON);
1891            else
1892                return(OFF);
1893        #endif
1894        }
1895     /*****************************************************************/
1896     /*                                                               /
1897     /*       GET_HIGHEST_RATE                                        /
1898     /*                                                               /
1899     /*       RETURNS MODE CODE FOR HIGHEST RATE IN THE PASSED        /
1900     /*       RATE SEQUENCE.                                          /
1901     /*****************************************************************/
1902
1903        ubyte get_highest_rate(uword rate_sequence)
1904        {
1905        #ifndef MIKADO
1906            if(rate_sequence & RATE_BIT_144K)
1907                return(V32_144K_CODE);
1908
1909            else if(rate_sequence & RATE_BIT_12K)
1910                return(V32_12K_CODE);
1911
1912            else if(rate_sequence & RATE_BIT_9600)
1913            {
1914                if(rate_sequence & RATE_TRELLIS_BIT)
1915                    return(V32_9600_CODE);
1916                else
1917                    return(V32_9600_NO_TCM_CODE);
1918            }
1919            else if(rate_sequence & RATE_BIT_7200)
1920                return(V32_7200_CODE);
1921
1922            else if(rate_sequence & RATE_BIT_4800)
1923                return(V32_4800_CODE);
1924
1925            else
1926                return(0x00);
1927        #endif
1928        }
```

INTEL CONFIDENTIAL

APPENDIX D

```
//////////////////////////////////////////////////////////
//********************************************************
//                    MODEMDMN.C
//
//        Copyright (c) 1992 Intel Corporation  All Rights Reserved
//--------------------------------------------------------
// This module contains the main backbone of the modem daemon.
// The modem daemon processes requests for TAPI services. It
// has no user interface or visible window (except in debug mode).
// The modem daemon receives messages from the AT_TASK and translates
// those messages into TAPI function calls. Then it returns status
// information, when necessary, to the AT_TASK.
//********************************************************
////////////////////////////////////////////////////////// include <windows.h>
include <memory.h> include "modemdmn.h"
include "_mdmn.h"

#ifdef TAPIlp0
#include "miktapl.h"             // to make TAPI 1.0 calls
#include "tapiq.h"               // to get our tapi messages
#else
#include "phone.h"
endif include "debug.h"               // Debug info/macros
include "inimgt.h"              // FAXMODEM.INI management routines include "resource.h"            // Menu IDs, etc
include "cmacros.h"             // PUBLIC, PRIVATE, etc
include "drvmesg.h"             // Interface to faxmodem.drv include "drvntfc.h"             // Interface to *.C
include "tapigen.h"
#include "dial.h"
#include "config.h"
#include "dispatch.h"
#include "tnotify.h"
#include "errormsg.h"
#include "eye.h"

//////////////////////////////////////////////////////////
//                    Private Literals
//////////////////////////////////////////////////////////
``` modemdmn.c

```
#define DMN_CLASSNAME        "ModemDaemonClass"
#define DMN_WINTITLE         "Modem Daemon"

//---------------------------------------------
//              Debugging Information
//---------------------------------------------
#ifdef DEBUG
    PUBLIC char    szProgName[] = "MODEMDMN:";    // Used by DebugOutput() macro
    PUBLIC char    szBuffer[128];                  // Used throughout application
endif ifdef ASSERTON
    PUBLIC char    szAssert[128];                  // Used by ASSERT() macro
endif //---------------------------------------------
//              Private Global Variables
//---------------------------------------------
PRIVATE HWND       ghAppWnd  = NULL;    // Application window
PRIVATE HINSTANCE  ghAppInst = NULL;    // First application instance //*********************************************************//
//                       appGetWindow                      //
//*********************************************************//
// Purpose   : Return our application window handle for general use
//*********************************************************//
PUBLIC
HWND appGetWindow( void )
{
    return(ghAppWnd);
}

//*********************************************************//
//                       appSetWindow                      //
//*********************************************************//
// Purpose   : Set our application window handle
//*********************************************************//
``` modemdmi.c

```
100   PRIVATE
      void appSetWindow( HWND hWnd )
      {
          ghAppWnd = hWnd;
      }

105   //*********************************************************//
      //*********************************************************//
      //                        appGetInstance                    //
      //*********************************************************//

110   //   Purpose    : Return our application instance handle
      //*********************************************************//

115   PUBLIC
      HWND appGetInstance( void )
      {
          return(ghAppInst);
      }

120   //*********************************************************//
      //*********************************************************//
      //                        appSetInstance                    //
      //*********************************************************//

125   //   Purpose    : Set our application instance handle
      //*********************************************************//

130   PRIVATE
      void appSetInstance( HINSTANCE hinst )
      {
135       ghAppInst = hinst;
      }

//*********************************************************//
      //*********************************************************//
      //                           WinMain                        //
140   //*********************************************************//
      //*********************************************************//

//   Purpose    :
145   //   This function is called by windows when our program is invoked.
      //   Here the necessary window classes are registered and the main window
      //   is created. The main message loop is also instantiated. This loop
``` modemwinm.c

```
150     //   performs background processing by using the PeekMessage call instead
        //   of the GetMessage call to retrieve messages bound for our Window.
        //   PeekMessage will return false if there aren't any messages in our
        //   application queue, the system queue, or a WM_PAINT or WM_TIMER message.
        //   At this time we will check the cache to see if the next event should
        //   be sent.
155     //*****************************************************************************//
        //*****************************************************************************//
        PUBLIC
        int PASCAL WinMain( HANDLE hInstance, HANDLE hPrevInstance,
                            LPSTR lpszCmdParam, int nCmdShow )
160     {
            int iAppOutcome = 0;

//------------------------------------------------------------
            // Initialize each instance of our application
165         //------------------------------------------------------------
            if( !InitInstance(hPrevInstance, hInstance) ) {
                DebugOutput("Failed to initialize instance");
                return(NULL);
            }
170         //------------------------------------------------------------
            // Check for previous instances, we only allow one instance of our app
            // to execute
            //------------------------------------------------------------
175         if( !hPrevInstance ) {

// This is the first instance, let's load up and go
                HWND hWnd;

180             //------------------------------------------------------------
                // Register our window class
                //------------------------------------------------------------
                if( RegisterClasses(hInstance) ) {
185             // Create our application window
                //------------------------------------------------------------
                hWnd =
                    CreateWindow(
190                     DMN_CLASSNAME,         // window class name
                        DMN_WINTITLE,          // window caption
                        WS_OVERLAPPEDWINDOW,   // window style
                        0,                     // initial x position
                        0,                     // initial y position
195                     450,                   // initial x size
                        100,                   // initial y size
```

```
                                                         modemdmn.c

200              NULL,                              // parent window handle
                 LoadMenu(hInstance, MAKEINTRESOURCE(DEBUGMENU)),
                 hInstance,                         // program instance handle
                 0L                                 // creation parameters
             );

//----------------------------------------------------------------
205          // Check our success and abort if we failed
             //----------------------------------------------------------------
             if( !hWnd ) {
                 ErrorMsg(IDS_ERRCREATEWINDOW);
                 return(FALSE);
             }

//----------------------------------------------------------------
210          // If we're in debugging, put up our window
             //----------------------------------------------------------------
             DEBUGCODE
             (
215              ShowWindow(hWnd, nCmdShow);
                 UpdateWindow(hWnd);
             )

//----------------------------------------------------------------
220          // Launch main application message processing code, and return
             // the final results (when the app exits)
             //----------------------------------------------------------------
             iAppOutcome = MainMessageLoop(hWnd);

//----------------------------------------------------------------
225          // Unregister our application class
             //----------------------------------------------------------------
             UnregisterClasses(hInstance);

230          return(iAppOutcome);

}
         else {
             //----------------------------------------------------------------
235          // Failed to register our class
             //----------------------------------------------------------------
             ErrorMsg(IDS_ERRREGISTERCLASS);
             return(FALSE);
240      }
         }
         else {
             //----------------------------------------------------------------
245          // Our app is already running, if we're in debug mode, just bring
             // the app window to the top
``` modemdmn.c

```
     //----------------------------------------------------------
     DEBUGCODE
     (
         HWND hPrevWnd;

250      hPrevWnd = FindWindow(DMN_CLASSNAME, NULL);
         if( hPrevWnd ) {
             SetFocus(hPrevWnd);
255          ShowWindow(hPrevWnd, SW_RESTORE);
         }
     )
260      return(FALSE);
     }

//*********************************************************//
     //*********************************************************//
265  //                       ModemDMWndProc                     //
     //*********************************************************//
     /// Purpose      : Handle main window message processing
270  //*********************************************************//
     //*********************************************************//
     PUBLIC
275  long FAR PASCAL _export ModemDMWndProc( HWND hWnd,
                                              UINT wMsg,
                                              UINT wParam,
                                              LONG lParam )
     {
280      switch( wMsg ) {
         //----------------------------------------------------------
         // Window/application creation - initialize everything
         //----------------------------------------------------------
         case WM_CREATE:
285          wmCreate(hWnd, wParam, lParam);
             break;

//----------------------------------------------------------
         // Window needs to be repainted
         //----------------------------------------------------------
290      case WM_PAINT:
             if( eyePaint() ) {
                 // We processed the paint
                 return(0L);
``` modemdmn.c

```
295             break;
                //----------------------------------------
                // Window was resized
300             //----------------------------------------
                case WM_SIZE:
                    if( wParam != SIZE_MINIMIZED ) {
                        // Window was not minimized, so we're visible and need
                        // to recalc the eye patter display coordinates
305                     if( !eyeResize() ) {
                            DebugOutput("Resizing eye pattern queue failed");
                        }
                    }
                    break;
                //----------------------------------------
310             // Command/menu processing
                //----------------------------------------
                case WM_COMMAND:
315                 if( HandleCommands(hWnd, wParam, lParam) ) {
                        // We handled command
                        return(0L);
                    }
                    break;
                //----------------------------------------
320             // Modem command/message handling
                //----------------------------------------
                case DMN_MODEM_NOTIFYING:
325                 dispatchRegisterModemCmd(wParam, lParam);
                    return(0L);
                //----------------------------------------
                // Fatal error notification from driver
                //----------------------------------------
330             case DMN_FATAL_ERROR:
                    DEBUGCODE
                    (
                        wsprintf(
335                         szBuffer,
                            "DMN_FATAL_ERROR, Error Code %d, SubCode %ld",
                            wParam,
                            lParam
                        );
                        DebugOutput(szBuffer);
340                 )
                    return(0L);
```

```
                                                        Modemdmn.c

//-------------------------------------------------------------
        // FaxModem driver is notifying us that the configuration
        // has changed
345     case DMN_CONFIG_CHANGED:
            DebugOutput("DMN_CONFIG_CHANGED");
            configUpdate();
350         return(0L);

//-------------------------------------------------------------
        // Application/window destruction, shutdown, and cleanup
355     //-------------------------------------------------------------
        case WM_DESTROY:
            wmDestroy(hWnd, wParam, lParam);
            return(0L);

360     //-------------------------------------------------------------
        // Application close notification
        //-------------------------------------------------------------
        case WM_CLOSE:
365         // Destroy ourselves, and our app
            //
            DestroyWindow(hWnd);
            return(0L);

370     //-------------------------------------------------------------
        // Default message processing
        //-------------------------------------------------------------
        default:
375         break;
        } return DefWindowProc(hWnd, wMsg, wParam, lParam);
    }

380 //***********************************************************//
    //***********************************************************//
    //***********************************************************//
    //                      RegisterClasses
    //***********************************************************//
385 // Purpose    : Register the window class for ModemDMN windows.
    //***********************************************************//
    //***********************************************************//
    PRIVATE
390 BOOL RegisterClasses( HINSTANCE hInstance )
``` modemdmn.c

```
395      WNDCLASS     wndClass;

//-----------------------------
         // Define our window class
         //-----------------------------
400      wndClass.style           = CS_HREDRAW | CS_VREDRAW;
         wndClass.lpfnWndProc     = ModemDMNWndProc;
         wndClass.cbClsExtra      = 0;
         wndClass.cbWndExtra      = 0;
         wndClass.hInstance       = hInstance;
405      wndClass.hIcon           = LoadIcon(NULL, IDI_APPLICATION);
         wndClass.hCursor         = LoadCursor(NULL, IDC_ARROW);
         wndClass.hbrBackground   = CreateSolidBrush(eyeGetBkColor()); // GetStockObject(WHITE_BRUSH);
         wndClass.lpszMenuName    = NULL;
         wndClass.lpszClassName   = DMN_CLASSNAME;

410      //-----------------------------
         // Try to register it for our use...
         //-----------------------------
         if ( RegisterClass(&wndClass) ) {
             return(TRUE);
         }
415      return(FALSE);
     }

420  //*********************************************************//
     //*********************************************************//
     //***                UnregisterClasses                  ***//
     //*********************************************************//
425  //*** Purpose   : Unregister the window class for ModemDMN windows.
     //*********************************************************//
     //*********************************************************//
     PRIVATE
430  BOOL UnregisterClasses( HINSTANCE hInstance )
     {
         return UnregisterClass(DMN_CLASSNAME, hInstance);
     }

435  //*********************************************************//
     //*********************************************************//
     //***                 MainMessageLoop                   ***//
440  //*********************************************************//
``` modemdmn.c

```
//****************************************************************//
// Purpose
//     Main message loop for the modem daemon.  Performs normal
//     message processing.  When no messages are present, the tapi and
//     modem command queues are checked for pending notifications and
//     events.
//****************************************************************//
PRIVATE
int MainMessageLoop( HWND hWnd )
{
    MSG Msg;

while( TRUE ) {
        //
        // Look for messages; if we get one, chew on it...
        //
        if( PeekMessage(&Msg, NULL, 0, 0, PM_REMOVE) ) {
            // Time to quit?
            //
            if( Msg.message == WM_QUIT ) {
                // Time to quit
                break;
            }

//
            // Anonymous window?  This is from PostAppMessage, so we'll
            // assume it was meant for us.
            //
            if( Msg.hwnd == NULL ) {
                Msg.hwnd = hWnd;
            }

//
            // Translate and dispatch message...
            //
            TranslateMessage(&Msg);
            DispatchMessage(&Msg);
        }

//
        // Check our modem queue for pending commands
        //
        dispatchCheckModemQueue(hWnd);

//
        // Check our TAPI notification queue for call/line status
        // information
```

```
                                                                        modemdmi.c
       //----------------------------------------------------------------------------
       tnotifyCheckTapiQueue(hWnd);
       }
495
       return(FALSE);
       }
       /*****************************************************************************//
                                                                  HandleCommands       //
500    /*****************************************************************************//
       /                                                                               //
       // Purpose    : Handle menu commands                                             //
       //-----------------------------------------------------------------------------//
505    PRIVATE
       BOOL HandleCommands(HWND hWnd, WPARAM wParam, LPARAM lParam)
       {
       switch(wParam) {
510        //-------------------------------------------------
           // Toggle state of "always on top" behavior
           //-------------------------------------------------
           case CMD_ONTOP:
               cmdOnTop(hWnd);
515        break;

//-------------------------------------------------
           // Clear the eye pattern display screen
           //-------------------------------------------------
           case CMD_CLRSCRN:
520            eyeClearScreen();
           break;

//-------------------------------------------------
           // Exit the application
525        //-------------------------------------------------
           case CMD_EXIT:
               DestroyWindow(hWnd);
530        break;

default:
               //-------------------------------------------------
               // Command not handled
               //-------------------------------------------------
535            return(FALSE);
       }
       //
``` modemdmi.c

```
         //  Command handled
         //  ---------------
         return(TRUE);
    }

//****************************************************************//
//                                                                //
//                         InitInstance                           //
//                                                                //
//****************************************************************//
// Purpose    : Initialize this instance of the application
//
//****************************************************************//
PRIVATE
BOOL InitInstance( HINSTANCE hPrevInst, HINSTANCE hInst )
{
    // Initialize per instance
    TAPIDIALPARAMS  DialParms;

if( !hPrevInst ) {
        appSetInstance(hInst);

DialParms.dwMediaMode       = LINEMEDIAMODE_DATAMODEM;
        DialParms.dwDialPause       = 2000;    // These values are
        DialParms.dwDialSpeed       = 70;      // the defaults as
        DialParms.dwDigitDuration   = 70;      // defined in the
        DialParms.dwWaitForDialtone = 2000;    // service provider dialSetDialParms(&DialParms);
    }
    return(TRUE);
}

//****************************************************************//
//                                                                //
//                         cmdOnTop                               //
//                                                                //
//****************************************************************//
// Purpose    : Toggle state of "always on top" behavior
//
//****************************************************************//
void cmdOnTop( HWND hWnd )
{
    static BOOL fOnTop = FALSE;       // Keeps track of current state
``` modemcmnt.c

```
590     //-----------------------------------------
        // Toggle menu check state internally
        //-----------------------------------------
        fOnTop = !fOnTop;

595     //-----------------------------------------
        // Toggle window's display attribute
        //-----------------------------------------
        SetWindowPos(
            hWnd,
600         (fOnTop ? HWND_TOPMOST : HWND_NOTOPMOST),
            0,
            0,
            0,
            0,
605         SWP_NOMOVE | SWP_NOSIZE
        );

//-----------------------------------------
        // Toggle menu item check state
610     //-----------------------------------------
        CheckMenuItem(
            GetMenu(hWnd),
            CMD_ONTOP,
            (fOnTop ? MF_CHECKED : MF_UNCHECKED)
615     );
    }

//*********************************************//
    //*********************************************//
620 //**                                         **//
    //**                 wmCreate                **//
    //**                                         **//
    //** Purpose   : Handler for WM_CREATE message**//
625 //**                                         **//
    //*********************************************//
    //*********************************************//
    LONG wmCreate( HWND hWnd, WORD wParam, LONG lParam )
    {
630     LONG Err = 0;

//-----------------------------------------
        // By default, let's go "always on top"
        //-----------------------------------------
        cmdOnTop(hWnd);
635     //-----------------------------------------
``` modemdmn.c

```
                // Retrieve initial configuration
                //--------------------------------------------------
640             configInit();

//--------------------------------------------------
                // Register our application window handle for others to use
                //--------------------------------------------------
645             appSetWindow(hWnd);

//--------------------------------------------------
                // Create and initialize our modem command queue
                //--------------------------------------------------
                if( !dispatchInitModemQueue() ) {
650                 ErrorMsg(IDS_ERRMODEMQCREATE);
                    return(-1L);
                }

//--------------------------------------------------
                // Initialize ourselves as a "TAPI app"
655             //--------------------------------------------------
                if( !tapiAppInit(hWnd) ) {
                    ErrorMsg(IDS_ERRTAPIREGISTER);
                    dispatchShutdownModemQueue();
660                 return(-1L);
                }

//--------------------------------------------------
                // Open the faxmodem device driver and register
                // ourselves as a modem daemon
665             //--------------------------------------------------
                if( drvInit(hWnd) ) {
                    ErrorMsg(IDS_ERRFMDRVOPEN);
670             }

//--------------------------------------------------
                // Initialize eye pattern display subsystem
                //--------------------------------------------------
675             eyeInit();

#if TEST_EYE_DISPLAY
                //--------------------------------------------------
                // Begin the eye pattern test
                //--------------------------------------------------
680             eyeBeginTest();
endif 685             return(Err);
            }
```

```
                                                                              modemdmn.c //*********************************************************//
      //*********************************************************//
      //                     wmDestroy                           //
690   //*********************************************************//
      //                                                         //
      //   Purpose   : Handler for WM_DESTROY                    //
      //                                                         //
695   //*********************************************************//

LONG wmDestroy( HWND hWnd, WORD wParam, LONG lParam )
      {
         LONG lErr = 0;

700      //----------------------------------------------
         // Shutdown ourselves with respect to TAPI
         //----------------------------------------------
         if( ltapiAppShutdown(hWnd) ) {
705         ErrorMsg(IDS_ERRTAPIUNREGISTER);
         }

//----------------------------------------------
         // Destroy our modem command queue
         //----------------------------------------------
710      if( !dispatchShutdownModemQueue() ) {
            DebugOutput("Modem queue destruction failed");
         }

//----------------------------------------------
715      // Close the faxmodem device driver and shutdown the
         // modem task
         //----------------------------------------------
         if( drvCleanup() ) {
720         ErrorMsg(IDS_ERRFMDRVCLOSE);
         } if TEST_EYE_DISPLAY
         //----------------------------------------------
725      // Shutdown the eye pattern test
         //----------------------------------------------
         eyeEndTest();
      #endif
         //----------------------------------------------
730      // Shutdown the eye pattern display subsystem
         //----------------------------------------------
         eyeShutdown();

735      //----------------------------------------------
```

```
                                                                    modemdmn.c
        // Clear our application window handle
        //
        appSetWindow(NULL);
740
        //
        // Quit!
        //
        PostQuitMessage(0);

745     return(Err);
    }
``` dial.c

```
//*****************************************************//
//*****************************************************//
//                                                     //
//                       DIAL.C                        //
//                                                     //
//      Copyright (c) 1992 Intel Corporation  All Rights Reserved
//      ---------------------------------------------- //
//                                                     //
// This module contains routines to perform outgoing call handling
//                                                     //
//*****************************************************//
//*****************************************************// include <windows.h>
include <memory.h> include "modemdmm.h"
include "miktapi.h"
include "tapiq.h"
#include "debug.h"
#include "cmacros.h"
#include "dial.h"
#include "tapigen.h"
#include "mkdomsgs.h"
#include "drvmesg.h"
#include "drvntfc.h"
#include "hangup.h"
#include "speakers.h"
#include "dispatch.h"
#include "tnotify.h"

//*****************************************************//
//*****************************************************//
//                    dialMakeCall                     //
//*****************************************************//
//*****************************************************//
//                                                     //
///    Purpose      : Handles dialing the phone in response to AT_DIAL
//                                                     //
///    Context      :                                  //
//                                                     //
///    Side Effects :                                  //
//                                                     //
///    Parameters   :                                  //
//                                                     //
///    Return Value :                                  //
//                                                     //
//*****************************************************//
``` dial.c

```
void dialMakeCall( HANDLE hDialstring, BOOL fWaitForConnect )
{
    TAPIDIALPARAMS  DialParms;
    LPSTR           lpDialstring;    // dial string as sent up by the modem task
    WORD            wDialoutcome;    // success indicator for dialing/connect operation
    MSG             Msg;             // for peek loop below
    BOOL            fOffHook;        // Flag we use...

//-----------------------------------------
    // Retrieve dial string from faxmodem driver
    //-----------------------------------------
    lpDialstring =
        (LPSTR)drvSendMessage(DRV_GETDATA, MAKELONG(hDialstring, 0), 0L);

DebugOutput(lpDialstring);

if( dialInProgress() ) {
        //-----------------------------------------------------------------
        // Release the dial string passed to us by the driver (it's
        // important to release/free this data before we enter a section
        // of code that could affect a return from this routine...)
        //-----------------------------------------------------------------
        DebugOutput("We're already attempting to dial, ignoring this one");
        drvSendMessage(DRV_FREEDATA, MAKELONG(hDialstring, 0), 0L);
        return;
    }

//-----------------------
    // Dial the phone (or try to)
    //-----------------------
    dialBegin();

// Assume failure
    wDialoutcome = HOST_CONNECT_FAIL;
    fOffHook     = FALSE;

//-------------------------
    // Take the phone off hook
    //-------------------------
    dialGetDialParms(&DialParms);

if( mIktapiOffHook(tapiGetID(), &DialParms) ) {
        //------------------------------------------------------------
        // Tells us we took the phone off hook, now would be the time
        // to hang out and wait for dialtone callstates, etc...
        //------------------------------------------------------------
        fOffHook = TRUE;

hookPickup();
``` dial.c

```
100     //-----------------------------------------------------------
        // Disconnect the phone terminal from Mikado so that we won't
        // bother the user (or be bothered while on-line)
        //-----------------------------------------------------------
        if( !miktapiDisconnectPhone(tapiGetID()) ) {
105         DebugOutput("Failed to disconnect the phone terminal");
        }

// Turn on the speaker
        //
110     if( speakerGetState() == SPEAKERSTATE_ON ) {
            DebugOutput("Turning speaker on after initiating call");
            if( miktapiSpeakerOn(tapiGetID()) ) {
                DebugOutput("Successfully turned speakers on");
115         }
            else {
                DebugOutput("Failed to turn speakers on");
            }
        }
120     if( !dialIsEmptyAddress(lpDialstring) ) {
            //
            // Dial out (or try to)
            //
            if( miktapiDial(tapiGetID(), lpDialstring) ) {
125             wDialOutcome = HOST_CONNECT_OK;
                DebugOutput("Dialed out okay");
            }
            else {
130             DebugOutput("Failed to dial");
            }
        }
        else {
            DebugOutput("Dial string is empty, skipping dial");
135         wDialOutcome = HOST_CONNECT_OK;
        }
        }
        else {
140         DebugOutput("Failed to take the phone off hook");
        }

//-----------------------------------------------------------
        // Release the dial string passed to us by the driver (it's
        // important to release/free this data before we enter a section
        // of code that could affect a return from this routine...)
        //-----------------------------------------------------------
145     drvSendMessage(DRV_FREEDATA, MAKELONG(hDialstring, 0), 0L);
``` dial.c

```
150     //------------------------------------------------------------
        // If we failed dialing, go ahead and stop now
        //------------------------------------------------------------
        if( wDialOutcome != HOST_CONNECT_OK ) {
            DebugOutput("Initial dial out setup failed, aborting...");

155         if( fOffHook ) {
                miktapiSpeakerOff(tapiGetID());
                miktapiConnectPhone(tapiGetID());
                miktapiDisconnect(tapiGetID());
                hookHangup();
            }
160         drvSendMessage(DRV_MODEM_REPLY, MAKELONG(wDialOutcome, 0), 0L);

// Done dialing
165         //
            dialEnd();
            return;
        }

170     if( fWaitForConnect ) {
            //------------------------------------------------------------
            // We've been instructed by our caller to wait for a valid
            // connect response from the remote unit.  We can fail this
175         // operation in a number of ways, including:
            //
            //      o We time out waiting for a response from TAPI
            //      o We recognize an error condition while waiting (busy, ...)
            //
            //------------------------------------------------------------

//------------------------------------------------------------
            // Tell ourselves that we're dialing, and that so far, we're in
180         // good shape
            //------------------------------------------------------------
            connectSetInProgress(TRUE);

185         //------------------------------------------------------------
            // The caller wants us to wait for connect, which tells us that
            // this shouldn't be a leased line connection...
            //------------------------------------------------------------
            connectSetLeased(FALSE);
190
#ifdef TIMER
            //------------------------------------------------------------
            // Now we wait until we get a connect message.  How long do we
195         // wait?  Set a timer... Note that this will only give us about
``` dial.c

```
200        // 30 seconds.
           //-----------------------------------------------------------------
           SetTimer(appGetWindow(), CONNECT_TIMERID, CONNECT_TIMEOUT, NULL);
   #endif //-----------------------------------------------------------------
205        // We need to register for tone answer tone detection so that
           // we can give the modem task a headstart on handshaking with
           // a remote unit (if one's present).
           //-----------------------------------------------------------------
           if( miktapiMonitorTone(
210              tapiGetID(),
                 TONE_REMOTEANS,           // Our tag for this tone
                 ANSTONE_DURATION,         // Tone duration (in ms)
                 ANSTONE_FREQ1,            // First tone frequency (Hz)
                 ANSTONE_FREQ2,            // no additional frequencies
                 ANSTONE_FREQ3             // no additional frequencies
                 )
215        {
                 DebugOutput("miktapiMonitorTone succeeded");
           }
           else
           {
220              DebugOutput("miktapiMonitorTone failed");
           }

//-----------------------------------------------------------------
           // Wait around for either a connect indication (answer tone
225        // or TAPI figures out we've connected) or an error indication
           // (usually busy, or something similar)
           //-----------------------------------------------------------------
           while( connectInProgress() )
           {
230              if( PeekMessage(&Msg, NULL, 0, 0, PM_REMOVE) ) {
                     // Got a message, handle message if( Msg.message == WM_QUIT )
235                      // Time to quit
                         break;

if( Msg.hwnd == NULL ) {         // if there is not window handle,
                         Msg.hwnd = appGetWindow();   // for now, just set to main window
240                  } ifdef TIMER
                     if (Msg.message == WM_TIMER))
                     {
245                      DebugOutput("GOT TIMER MESSAGE");
``` dial.c

```
            if ((Msg.wParam == CONNECT_TIMERID) && (Msg.hwnd == appGetWindow()))
            {
                connectSetError(CONNECTERR_TIMEOUT);
                break;
            }

250
            TranslateMessage(&Msg);
            DispatchMessage(&Msg);
255
        } // end if PeekMessage // This function will call HandleLineDevStates which will set
        // gfConnected appropriately.
        tnotifyCheckTapiQueue(appGetWindow());
260
        // Check modem command queue for disconnect, speaker stuff....
        dispatchCheckModemQueue(appGetWindow());
265
    } // end while connectInProgress()

// Terminate tone detection
    mlktapiDiscardTone(tapiGetID(), TONE_REMOTEANS);
270
} // end if( fWaitForConnect )
else
    // Assume a spherical pig....
    DebugOutput("Leased line connection assumed, auto succeeding connect");
    connectSetLeased(TRUE);
275
}

//----------------------------------------------------------------
// See if we succeeded or not....
//----------------------------------------------------------------
280 switch( connectGetError() ) { case CONNECTERR_NONE:
        DebugOutput("SENDING HOST_CONNECT_OK");
        wDialOutcome = HOST_CONNECT_OK;
285    break;

case CONNECTERR_BUSY:
        DebugOutput("CONNECTERR_BUSY");
        wDialOutcome = HOST_PHONE_BUSY;
290    break;

case CONNECTERR_DIALFAIL:
    case CONNECTERR_TIMEOUT:
``` dial.c

```
295         case CONNECTERR_INVCONNECTION:
            case CONNECTERR_USERABORT:
                //-----------------------------------
                // We failed to get a connection
                //-----------------------------------
300             wDialOutcome = HOST_CONNECT_FAIL;

DEBUGCODE
                (
                    switch( connectGetError() )
305                 {
                    case CONNECTERR_DIALFAIL:
                        DebugOutput("CONNECTERR_DIALFAIL");
                        break;

310                 case CONNECTERR_TIMEOUT:
                        DebugOutput("CONNECTERR_TIMEOUT");
                        break;

case CONNECTERR_INVCONNECTION:
315                     DebugOutput("CONNECTERR_INVCONNECTION");
                        break;

case CONNECTERR_USERABORT:
                        DebugOutput("CONNECTERR_USERABORT");
320                     break;
                    }
                )
                break;

default:
325         DebugOutput("UKNOWN CONNECT ERROR, SENDING HOST_CONNECT_FAIL");
            wDialOutcome = HOST_CONNECT_FAIL;
            break;
        }

//-----------------------------------------------------------------
330     // If we failed to connect, re-attached the phone terminal now
        //-----------------------------------------------------------------
        if( wDialOutcome != HOST_CONNECT_OK ) {
335         DebugOutput("Dialing failed, reconnecting phone terminal");
            miktapiConnectPhone(tapiGetID());
        }

//-----------------------------------------------------------------
        // Report our dialing success or failure to the modem task
340     //-----------------------------------------------------------------
        drvSendMessage(DRV_MODEM_REPLY, MAKELONG(wDialOutcome, 0), 0L);
``` dial.c

```
345     //---------------------------------
        // Done dialing
        //---------------------------------
        dialEnd();
        }

350     //---------------------------------------------------------------
        // Following are state variables and access routines that govern the
        // asynchronous nature of connecting to a remote unit during dial out...
        //---------------------------------------------------------------

355     PRIVATE BOOL            fConnecting     = FALSE;
        PRIVATE BOOL            fIsLeased       = FALSE;
        PRIVATE CONNECTERR      connectErr      = CONNECTERR_NONE;
        PRIVATE BOOL            fDialing        = FALSE;
        PRIVATE TAPIDIALPARAMS  DialParms;

360     BOOL connectInProgress( void )
        {
            return(fConnecting);
        }

365     BOOL connectSetInProgress( BOOL fConnectInProgress )
        {
            fConnecting = fConnectInProgress;

370         if( fConnecting ) {
                // We're starting with a new connection, so reset our error state
                connectErr = CONNECTERR_NONE;
            }

375         return(fConnecting);
        }

CONNECTERR connectGetError( void )
        {
380         return(connectErr);
        }

CONNECTERR connectSetError( CONNECTERR Err )
        {
385         connectErr = Err;           // Here's the error if( fConnecting && (connectErr != CONNECTERR_NONE) ) {
                fConnecting = FALSE;    // No longer connecting...
            }
390         return(connectErr);
        }
``` dial.c

```
395   BOOL connectIsLeased( void )
      {
          return(fIsLeased);
      }

400   BOOL connectSetLeased( BOOL fLeasedLine )
      {
          return(fIsLeased = fLeasedLine);
      }

405   BOOL dialInProgress( void )
      {
          return(fDialing);
      }

410   void dialBegin( void )
      {
          fDialing = TRUE;
      }

415   void dialEnd( void )
      {
          fDialing = FALSE;
      }

420   BOOL dialSetDialParms( LPTAPIDIALPARMS lpDialParms )
      {
          _fmemcpy(&DialParms, lpDialParms, sizeof(TAPIDIALPARMS));
          return(TRUE);
      }

425   BOOL dialGetDialParms( LPTAPIDIALPARMS lpDialParms )
      {
          _fmemcpy(lpDialParms, &DialParms, sizeof(TAPIDIALPARMS));
          return(TRUE);
      }

430   BOOL dialIsEmptyAddress( LPSTR lpszDialString )
      {
          return(lpszDialString[0] == 0);
      }

435
``` answer.c

```
///////////////////////////////////////////////////////////
//*********************************************************
                      ANSWER.C
         Copyright (c) 1992 Intel Corporation All Rights Reserved
---------------------------------------------------------
  This module contains routines to handle incoming calls
*********************************************************
/////////////////////////////////////////////////////////// include <windows.h>
include <memory.h> include "miktapi.h"
include "tapiq.h"
#include "debug.h"
#include "cmacros.h"
#include "answer.h"
#include "tapigen.h"
#include "mkdomsgs.h"
#include "drvmesg.h"
#include "drvntfc.h"
#include "hangup.h"

PRIVATE BOOL    fAnswering     = FALSE;
PRIVATE HCALL   hIncomingCall  = NULL;
PRIVATE WORD    wRingCount     = 0;       // Ring count on incoming call //*********************************************************
//                    answerAcceptCall
//*********************************************************
// Purpose    : Takes the phone off hook in response to AT_ANSWER
//*********************************************************
void answerAcceptCall( HCALL hCall )
{
  WORD wAnswerOutcome;

//-------------------------------------------------------
  // See if we're already trying to answer a call
  //-------------------------------------------------------
  if( answerInProgress() ) {
    DebugOutput("Already answering a call, ignoring this one");
    return;
  }
```

```
answer.c

}
//-----------------------------------------
/// Guard against re-entrancy
//-----------------------------------------
answerBegin();

// If the user passes a NULL call handle, we'll try to answer the
// call handle (if any) that we've already got registered
if( !hCall ) {
    hCall = answerGetCall();
}

//-----------------------------------------
/// Answer the phone
//-----------------------------------------
if( miktapiAnswer(tapiGetID(), hCall) ) {
    DebugOutput("Phone answered");

// Outcome to be sent to modem task
    wAnswerOutcome = HOST_ANSWER_OK;

// Set hook-switch state info
    hookPickup();

// Disconnect the phone terminal so we're not interrupted
    miktapiDisconnectPhone(tapiGetID());
}
else {
    DebugOutput("Damn, couldn't answer phone");
    wAnswerOutcome = HOST_ANSWER_FAIL;
    answerRegisterCall(NULL);
}

//-----------------------------------------
/// Report our success to the modem task
//-----------------------------------------
drvSendMessage(DRV_MODEM_REPLY, MAKELONG(wAnswerOutcome, 0), 0L);

answerEnd();
}

//*******************************************************//
//*******************************************************//
//                    AnswerLeasedPhone                  //
//*******************************************************//
//*******************************************************//
``` answer.c

```
100     //////////////////////////////////////////////////////////////////
        /// Purpose     : Takes the phone off hook in response to AT_ANSWER
        //////////////////////////////////////////////////////////////////
        void answerAcceptLeased( void )
        {
105         WORD wAnswerOutcome;

//----------------------------------------
            /// Guard against re-entrancy
            //----------------------------------------
110         if( answerInProgress() ) {
                DebugOutput("Already answering a call, ignoring this one");
                return;
            }

115         answerBegin();

//----------------------------------------
            /// Answer the phone, assuming a leased line connection (take the
            /// phone off-hook).
            //----------------------------------------
120         if( miktapiOffHook(tapiGetID(), NULL) ) {
                DebugOutput("Leased line phone answered okay");

// Outcome sent to modem task
125             wAnswerOutcome = HOST_ANSWER_OK;

// Keep our hook-switch state info updated
                hookPickup();

// Disconnect the phone terminal so we're not interrupted
130             miktapiDisconnectPhone(tapiGetID());
            }
            else {
                DebugOutput("Damn, couldn't answer leased line");
                wAnswerOutcome = HOST_ANSWER_FAIL;
135             answerRegisterCall(NULL);
            }

//----------------------------------------
            /// Report our success to the modem task
            //----------------------------------------
140         drvSendMessage(DRV_MODEM_REPLY, MAKELONG(wAnswerOutcome, 0), 0L);

//----------------------------------------
            /// Signal that we've completed this answer process
            //----------------------------------------
145         answerEnd();
        }
``` answer.c

```
150   BOOL answerInProgress( void )
      {
          return(fAnswering);
      }

155   WORD answerCountRing( void )
      {
          return(++wRingCount);           // Return new ring count
      }

160   WORD answerGetRingCount( void )
      {
          return(wRingCount);             // Return current ring count
      }

165   void answerClearRingCount( void )
      {
          wRingCount = 0;                 // Clear ring count
      }

170   BOOL answerRegisterCall( HCALL hNewCall )
      {
          BOOL fSuccess = TRUE;

DebugOutput("answerRegisterCall");

175       if( !hNewCall ) {
              //------------------------------------------------
              // User wants to clear our incoming call handle
              //------------------------------------------------
180           DebugOutput("Call cleared");
              hIncomingCall = NULL;
          }
          else if( !hIncomingCall ) {
              //------------------------------------------------
185           // We don't already have a call, accept this one
              //------------------------------------------------
              DebugOutput("New call registered");
              hIncomingCall = hNewCall;
          }
190       else {
              if( hNewCall != hIncomingCall ) {
                  DebugOutput("New call is different from old call");
                  fSuccess = FALSE;
              }
195           else {
                  DebugOutput("New call is already registered");
``` answer.c

```
        }
200     return(fSuccess);
        }

HCALL answerGetCall( void )
205     {
          return(hIncomingCall);
        } void answerBegin( void )
210     {
          fAnswering = TRUE;
        } void answerEnd( void )
215     {
          fAnswering = FALSE;
        }
```

```
dispatch.c

//****************************************************************//
//****************************************************************//
///                                                              ///
///                        DISPATCH.C                            ///
///                                                              ///
///          Copyright (c) 1992 Intel Corporation  All Rights Reserved ///
///                                                              ///
///--------------------------------------------------------------///
///                                                              ///
/// This module contains routines to queue modem commands as they arrive, ///
/// and dispatch them when required                              ///
///                                                              ///
//****************************************************************//
//****************************************************************// include <windows.h>
include <memory.h> include "miktapi.h"
include "tapiq.h"
#include "debug.h"
#include "cmacros.h"
#include "dispatch.h"
#include "modemq.h"
#include "dial.h"
#include "answer.h"
#include "hangup.h"
#include "mkdomsgs.h"
#include "config.h"
#include "speakers.h"
#include "eye.h"

PRIVATE HMODEMQ hModemQ = NULL;

void dispatchHandleModemCmd( WORD wTaskMsg, DWORD dwParam );

PUBLIC
BOOL dispatchInitModemQueue( void )
{
    hModemQ = modemqInit();

if( hModemQ != NULL ) {
        return(TRUE);
    }
    else {
        return(FALSE);
    }
}

PUBLIC
BOOL dispatchRegisterModemCmd( WORD wMsg, DWORD dwData )
``` dispatch.c

```
50      {
            MODEMCMD ModemCmd;
            BOOL      fSuccess = TRUE;

55          ModemCmd.wMsg   = wMsg;
            ModemCmd.dwData = dwData;

if( !modemqEnQ(hModemQ, &ModemCmd) ) { fSuccess = FALSE;
60              DEBUGCODE
                (
                    wsprintf(
                        szBuffer,
                        "Modem command lost due to full/destroyed command queue, "
65                      "wMsg = %04Xh, dwData = %08lXh",
                        wMsg,
                        dwData
                    );
                    DebugOutput(szBuffer);
70              )
            } return(fSuccess);
75      }

PUBLIC
        BOOL dispatchShutdownModemQueue( void )
        {
80          if( hModemQ ) {
                modemqDestroy(hModemQ);
            }

85          hModemQ = NULL;

return(TRUE);
        }

90      ///*********************************************************//
        ///*********************************************************//
        ///                   dispatchCheckModemQueue
        ///*********************************************************//
95      ///  Purpose    : Dequeues and dispatches modem command messages
        ///*********************************************************//
``` dispatch.c

```
100   PUBLIC
      void dispatchCheckModemQueue( HWND hWnd )
      {
          MODEMCMD ModemCmd;

105       if( modemqDeq(hModemQ, &ModemCmd) ) {
              dispatchHandleModemCmd(ModemCmd.wMsg, ModemCmd.dwData);
          }
      }

//*********************************************************************//
110   //*********************************************************************//
      //                       dispatchHandleModemCmd                        //
      //*********************************************************************//
      //                                                                     //
115   // Purpose    : Dispatches messages from the faxmodem driver (from the //
      //              modem task) to the appropriate handler                 //
      //                                                                     //
      //*********************************************************************//
      void dispatchHandleModemCmd( WORD wTaskMsg, DWORD dwParam )
120   {
          switch( wTaskMsg ) {

//-----------------------------------------
125       // Modem task wants to dial the phone
          //-----------------------------------------
          case AT_DIAL:
              DebugOutput("AT_DIAL");
              dialMakeCall(LOWORD(dwParam), TRUE);   // TRUE == wait for connect
130           break;

//-----------------------------------------
          // Modem task wants to dial the phone on a leased line
          //-----------------------------------------
135       case AT_DIAL_LEASED_LINE:
              DebugOutput("AT_DIAL_LEASED_LINE");
              dialMakeCall(LOWORD(dwParam), FALSE);  // FALSE -> don't wait for connect
              break;

//-----------------------------------------
140       // Modem task wants to answer the phone
          //-----------------------------------------
          case AT_ANSWER:

145           if( dwParam == ANSWER_CALL ) {
                  // Answer the incoming call (we should have a call
``` dispatch.c

```
                // appearance before this....)
150             // DebugOutput("AT_ANSWER (Incoming Call)");
                // answerAcceptCall(answerGetCall());
        }
        else {
                //----------------------------------------
155             // Answer the phone, assuming that we're on a leased
                // line connection
                //----------------------------------------
                DebugOutput("AT_ANSWER (Leased Line Connection)");
160             answerAcceptLeased();
        }
        break;
        //--------------------------------------------------
        // Modem task wants to hangup
165     //--------------------------------------------------
        case AT_ONHOOK:
                DebugOutput("AT_ONHOOK");
                hangupDisconnect();
        break;
170     //--------------------------------------------------
        // Modem task wants to change the way the phone is handled
        //--------------------------------------------------
        case AT_CONFIGURE_TAPI:
                DebugOutput("AT_CONFIGURE_TAPI");
175             configSetModemDialParms(LOWORD(dwParam));
        break;
        //--------------------------------------------------
        // Modem/data pump task wants is to display eye pattern data
180     //--------------------------------------------------
        case DP_DISPLAY_EYE:  — not from AT_TASK
                eyeDisplayConstellation(LOWORD(dwParam));
        break;
        //--------------------------------------------------
185     // The remaining messages don't require replies, just action
        //--------------------------------------------------
        case AT_ANSWER_RINGS:
                DebugOutput("AT_ANSWER_RINGS (unhandled)");
190     break;

case AT_COMMA_DELAY:
                DebugOutput("AT_COMMA_DELAY (unhandled)");
195     break;
``` dispatch.c

```
        case AT_DIAL_DELAY:
200         DebugOutput("AT_DIAL_DELAY (unhandled)");
            break;

case AT_DIAL_SPEED:
205         DebugOutput("AT_DIAL_SPEED (unhandled)");
            break;

case AT_MODEM_APP:
            DebugOutput("AT_MODEM_APP (unhandled)");
            break;

case AT_SPEAKER:
210         DebugOutput("AT_SPEAKER");
            speakerSetState(LOWORD(dwParam));
            break;

case AT_SPEAKER_VOL:
215         DebugOutput("AT_SPEAKER_VOL (unhandled)");
            break;

case AT_CLASS1_APP:
220         DebugOutput("AT_CLASS1_APP (unhandled)");
            break;

case AT_BLIND_DIAL:
            DebugOutput("AT_BLIND_DIAL (unhandled)");
            break;

default:
225         DEBUGCODE
            (
                wsprintf( szBuffer,
230                 "Unrecognized task message received: %d, lParam = %ld",
                    wTaskMsg, dwParam );
                DebugOutput(szBuffer);
            )
235         break;
        }
    }
```

What we claim is:

1. A method for establishing compatibility between a communication application transmitting an AT command to perform a specific telephony operation and a Telephony Application Programming Interface, the method comprising the steps of:

intercepting information transmitted from the communication application to a communication hardware device; and processing the intercepted information within the communication hardware device in order to ascertain whether the information includes the AT command, wherein if the intercepted information includes the AT command, translating the AT command into a Telephony Application Programming Interface function call corresponding to the AT command.

2. The method according to claim 1, wherein the intercepting step includes the steps of retrieving, by a communication task, the intercepted information transmitted from the communication application; and storing the intercepted information within a first storage buffer.

3. The method according to claim 2, wherein before the retrieving step, the intercepting step further includes the step of checking whether there exists information within the first storage buffer after a preselected period of time, wherein if there exists information within the first storage buffer, then processing the information within the first storage buffer, and if there does not exist information within the first storage buffer, then continuing with the retrieving step and re-checking the first storage buffer after another preselected time period has expired.

4. The method according to claim 2, wherein if the intercepted information includes the AT command, then prior to the translating step, the processing step includes the steps of:

copying the intercepted information from the first storage buffer into a second storage buffer; and scanning the intercepted information for a predetermined character, wherein if the predetermined character is detected, then transferring a portion of the intercepted information ending at the predetermined character to an AT command task, determining whether the AT command is within the intercepted information, and identifying an AT command identifier of the AT command to determine the type of AT command transmitted.

5. The method according to claim 4, wherein the translating step of the processing step includes the steps of:

translating, by the communication task, the AT command into a control message corresponding to the AT command;

transmitting the corresponding control message to a specific application;

translating, by the specific application, the corresponding control message into the corresponding Telephony Application Programming Interface function call enabling the Telephony Application Programming Interface to drive a hardware device which performs the specific telephony operation; and transferring the corresponding Telephony Application Programming Interface function call into the Telephony Application Programming Interface.

6. The method according to claim 5, wherein corresponding control message includes a control command corresponding to the AT command identifier within the AT command and a string of data supplied by the AT command which provides information necessary to perform the specific operation.

7. The method according to claim 6, wherein the control message includes a control command being one from a plurality of control commands including AT_DIAL, AT_ANSWER, AT_ONHOOK, AT_SPEAKER_VOL, AT_ANSWER_RINGS, AT_COMMA_DELAY, AT_DIAL_DELAY, AT_DIAL_SPEED and AT_SPEAKER.

8. The method according to claim 5, wherein after the transferring step, the method further comprises the step of:

polling, by the specific application, for a result code message from the Telephony Application Programming Interface.

9. The method according to claim 8, wherein after the polling step, the method further comprises the steps of:

receiving, by the specific application, the result code message from the Telephony Application Programming Interface;

translating, by the specific application, the result code message into a status message corresponding to the result code message, the corresponding status message is readable by the communication task;

transferring the corresponding status message to the communication task;

translating, by the communication task, the corresponding status message into a modem result code readable by the communication application; and transferring the modem result code to the communication application.

10. A method for establishing compatibility between a communication application program, running on a first source, transmitting an AT command to perform a specific telephony operation and a Telephony Application Programming Interface, the method comprising the steps of:

intercepting information transmitted from the communication application program to a communication hardware device for remote transmission to a second source and processing the intercepted information to ascertain whether the information includes the AT command, wherein if the intercepted information includes the AT command, translating, by the communication task, the AT command into a control message corresponding to the AT command, transmitting the control message to a specific application, translating, by the specific application, the corresponding control message into a Telephony Application Programming Interface function call corresponding to the control message, and transmitting the Telephony Application Programming Interface function call into the Telephony Application Programming Interface; and polling, by the specific application, for a result code message from the Telephony Application Programming Interface.

11. The method according to claim 10, wherein after the polling step, the method further comprises the steps of:

receiving, by the specific application, the result code message from the Telephony Application Programming Interface;

translating, by the specific application, the result code message into a status message corresponding to the result code message, the status message is readable by the communication task;

transferring the corresponding status message to the communication task;

translating, by the communication task, the status message into a modem result code readable by the communication application; and transferring the modem result code to the communication application.

12. In a computer system employing a Telephony Application Programming Interface and executing a communication application producing an AT command representing a specific telephony operation, a method comprising the steps of:

initializing the computer system so that the computer system is in command mode;

intercepting the information transmitted from the communication application to a communication hardware device;

processing the intercepted information in order to ascertain whether the information includes the AT command, wherein if the intercepted information includes the AT command, translating the AT command into a control message corresponding to the AT command, transmitting the control message to a specific application, translating, by the specific application, the control message into a Telephony Application Programming Interface function call corresponding to the control message and the AT command, and transmitting the Telephony Application Programming Interface function call into the Telephony Application Programming Interface; and polling, by the specific application, for a result code message from the Telephony Application Programming Interface.

13. In the computer system according to claim 12, wherein the processing step includes the steps of:

copying the intercepted information into a second storage buffer; and scanning the intercepted information for a predetermined character, and if the predetermined character is detected, transferring the information up to the predetermined character within the second storage buffer to a third storage buffer.

14. A communication interface for enabling a communication application, being executed in a first source and generating an AT command representing a specific telephony operation, to become compatible with a Telephony Application Programming Interface, the communication interface comprising:

first means for receiving the AT command from the communication application and for generating a control message corresponding to the AT command; and second means for receiving the control message from the first means and for generating a Telephony Application Programming Interface function call, corresponding to the AT command, to the Telephony Application Program Interface, 15. The communication interface according to claim 14, wherein the first means includes a communication task analyzing the characteristics of the AT command and transmitting the control message corresponding to the AT command into the second means.

16. The communication interface according to claim 15, wherein the control message includes a control command associated with an AT command identifier within the AT command, followed by data required to perform the specific telephony operation.

17. The communication interface according to claim 16, wherein the first means includes third means for storing information including the AT command being transmitted from the first source; and fourth means, electrically coupled the third means and the second means, for processing the information transmitted from the first source to determine whether the AT command is within the information.

18. A communication interface for enabling a communication application, being executed in a first source and generating an AT command representing a specific telephony operation, to become compatible with a Telephony Application Programming Interface, the communication interface comprising:

a device that is capable of outputting information being provided by the first source;

a first task that is capable of processing the information transmitted from the first source to determine whether the AT command is within the information;

a second task that is capable of the specific telephony operation represented by the AT command if the AT command is within the information, and for generating a control message corresponding to the AT command; and a specific application that is capable of receiving the control message, and in response, generating a Telephony Application Programming Interface function call, corresponding to the control message, to Telephony Application Program Interface requesting performance of the specific telephony operation.

19. The communication interface according to claim 18, wherein the outputting device is a virtual driver.

20. The communication interface according to claim 19, wherein the first and second tasks are operating in a host environment.

\* \* \* \* \*

UNITED STATES PATENT AND TRADEMARK OFFICE
CERTIFICATE OF CORRECTION

| | | |
|---|---|---|
| PATENT NO. | : | 5,574,888 |
| DATED | : | November 12, 1996 |
| INVENTOR(S) | : | Panditji et al. |

It is certified that error appears in the above-identified patent and that said Letters Patent is hereby corrected as shown below:

In column 6 at line 44 delete "entitled "mt1hwut1.c" translate" and insert --entitled "mt1hwutl.c" translate--

Signed and Sealed this

Fourth Day of March, 1997

Attest:

BRUCE LEHMAN

Attesting Officer

Commissioner of Patents and Trademarks